United States Patent
Kanzaki et al.

(10) Patent No.: US 8,392,077 B1
(45) Date of Patent: Mar. 5, 2013

(54) TRANSMISSION CONTROL APPARATUS

(75) Inventors: Shozo Kanzaki, Chiyoda-ku (JP);
Fumiaki Arimai, Chiyoda-ku (JP);
Hiroyoshi Nishizaki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/598,252

(22) Filed: Aug. 29, 2012

(30) Foreign Application Priority Data

Mar. 26, 2012 (JP) ................... 2012-068670

(51) Int. Cl.
*G06F 7/00* (2006.01)

(52) U.S. Cl. ............... 701/51; 701/61; 701/87; 701/95; 180/336; 180/337; 180/441; 192/3.51; 192/215; 192/220.4; 192/58.8; 192/85.63; 477/15; 477/31; 477/34; 477/45; 477/50; 477/95; 477/156

(58) Field of Classification Search ............ 701/51, 701/61, 87, 95; 180/336, 337, 441; 192/3.51, 192/215, 220.4, 58.8, 85.63, 85.38
See application file for complete search history.

(56) References Cited

U.S. PATENT DOCUMENTS

| 4,269,281 | A * | 5/1981 | Schneider et al. ............. 701/51 |
| 6,411,879 | B2 * | 6/2002 | Kupper et al. .................. 701/51 |
| 7,894,969 | B2 * | 2/2011 | Asami et al. .................... 701/84 |

FOREIGN PATENT DOCUMENTS

JP 2010-242806 A 10/2010

* cited by examiner

*Primary Examiner* — Redhwan k Mawari
(74) *Attorney, Agent, or Firm* — Sughrue Mion, PLLC

(57) ABSTRACT

A linear solenoid is configured with an electromagnetic coil and a label resistor that are integrated with each other; the label resistor has a resistance value corresponding to a correction coefficient based on the difference between the actual characteristic of the supply current vs. adjusted hydraulic pressure output of the electromagnetic coil and a standard characteristic; and data for correcting a characteristic variation in the command current vs. output current characteristic of an electromagnetic coil is preliminarily stored in a control module by use of an adjustment tool. When the operation is started, the resistance value of the label resistor is read and an output current corresponding to a utilized linear solenoid is supplied, so that a target adjusted hydraulic pressure is obtained.

19 Claims, 26 Drawing Sheets

FIG. 20
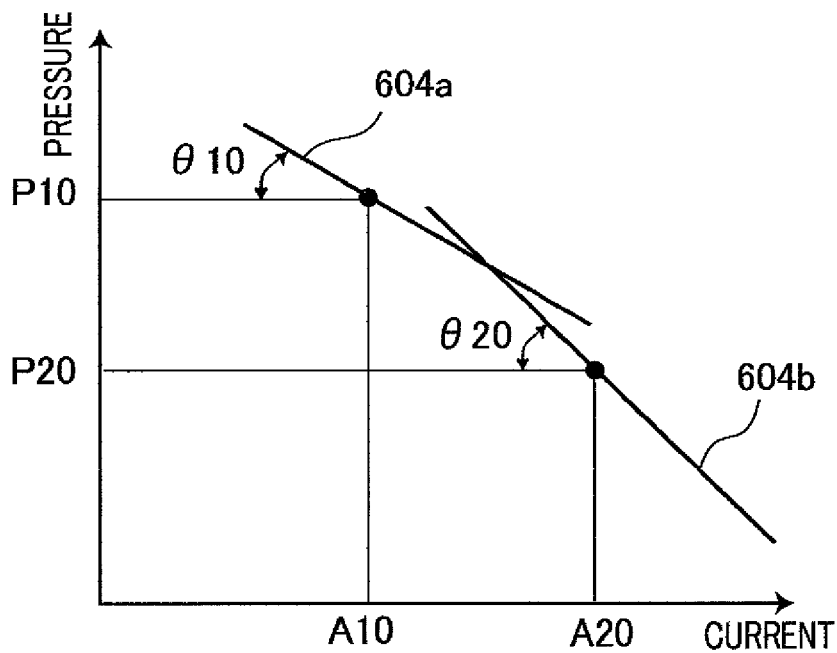
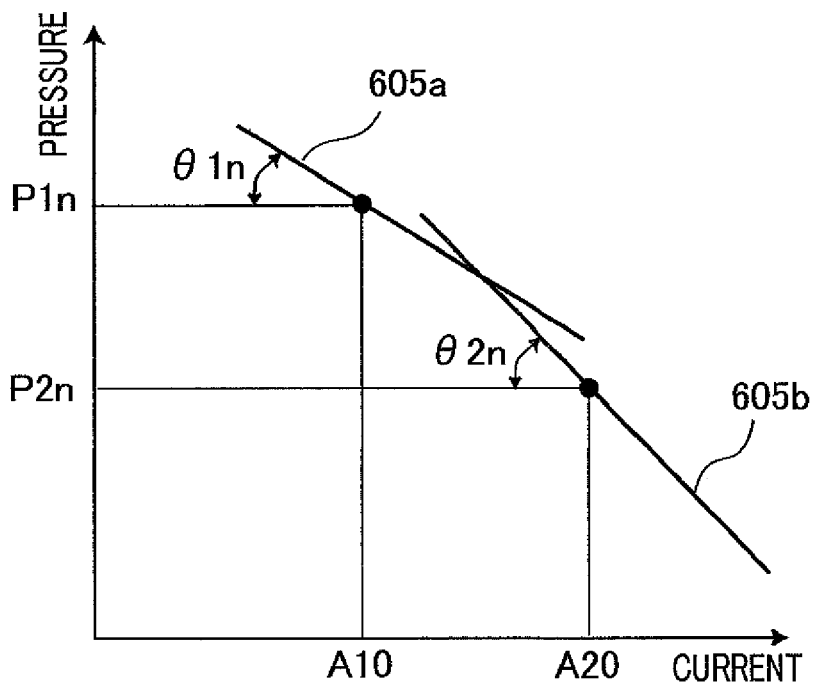

TRANSMISSION CONTROL APPARATUS

BACKGROUND OF THE INVENTION

1. Field of the Invention

The present invention relates to a transmission control apparatus that controls a transmission mounted in a vehicle and particularly to improvement of a plurality of linear solenoids that generate adjusted hydraulic pressure outputs corresponding to supply currents in a transmission control apparatus and improvement of a supply current control apparatus for the linear solenoid.

2. Description of the Related Art

As is well known, a transmission control apparatus for determining the transmission gear ratio of a transmission mounted in a vehicle includes a plurality of linear solenoids that is selectively supplied with a current in accordance with the selection position of the gearshift lever, the vehicle speed, and the accelerator-pedal depressing degree and generates an adjusted hydraulic pressure output corresponding to the supply current, for the purpose of determining the transmission gear ratio; and a supply current control apparatus that controls the supply current for the linear solenoid.

Because a transmission control apparatus needs to be adjusted in the combination with a plurality of linear solenoids incorporated in a transmission, it is configured as a system inseparably integrated with the transmission; i.e., there is established electromechanical integration in which the transmission control apparatus and the transmission are combined with each other. For example, Patent Document 1 describes that in a transmission control apparatus cited as an example of conventional apparatus and illustrated in FIGS. 16A and 16B, an electronic control unit 122, which is a centralized control apparatus for collectively controlling a plurality of linear solenoids 121, is configured with a microcomputer 123, a plurality of linear solenoids, and a plurality of drive control apparatuses 124 that correspond to the respective linear solenoids 121, and for the purpose of performing thermal correction for a linear solenoid 121 having temperature dependency, the characteristic parameters of the corresponding drive control apparatus 124 are adjusted in the production step for a transmission.

In FIG. 6 of Patent Document 1, there is provided a plurality of linear solenoid modules 1 that are each configured by integrating a linear solenoid 3 and a linear solenoid control circuit 4, and the linear solenoid control circuits 4, which are distributed control apparatuses in the respective linear solenoid modules 1, are connected with the respective output ports of a single microprocessor 63 in an electronic control unit 62. In each of the production steps for the linear solenoid modules 1, characteristic adjustment parameters at a time when the integrated linear solenoid 3 and linear solenoid control circuit 4 are combined with each other are written in a characteristic parameter storage device 6 (refer to FIG. 1 of Patent Document 1) in the linear solenoid control circuit 4. As a result, in the production step for the transmission, it is not required to adjust the characteristic parameters for each combination of the linear solenoid 3 and the linear solenoid control circuit 4.

PRIOR ART REFERENCE

Patent Document

[Patent Document 1] Japanese Patent Application Laid-Open No. 2010-242806

(1) Explanation for Problems in the Prior Art

The linear solenoid module 1 in a conventional transmission control apparatus described in Patent Document 1 is configured by integrating the linear solenoid 3 and the linear solenoid control circuit 4; because under this combination, adjustment for correcting the temperature dependency characteristic of the linear solenoid 3 is preliminarily performed, it is not required to perform adjustment work for a plurality of linear solenoids 4 when the combination in the entire transmission is made. However, in the case where an abnormality is caused in either the linear solenoid or the linear solenoid control circuit and it is tried to replace only one of them, it is required to perform combination adjustment for the linear solenoid module and to rewrite stored information in the characteristic parameter storage device; thus, there is posed a problem that expensive adjustment equipment and an engineer who can perform adjustment work are required in the maintenance and replacement site. Accordingly, in practice, the linear solenoid and the linear solenoid control circuit need to be concurrently replaced; thus, there is posed a problem that the replacement components cost much, resulting in diseconomy and going against resource conservation.

SUMMARY OF THE INVENTION (2) Explanation for the Objective of the Present Invention The first objective of the present invention is to provide a linear solenoid whose usability is improved in such a way that in the case where an abnormality is caused in either a linear solenoid or a supply current control apparatus and it is tried to replace any one of them by a non-defective one, it is not required to readjust the combination of them and a transmission control apparatus utilizing a supply current control apparatus suitable for the solenoid.

Moreover, the second objective of the present invention is to suppress as much as possible the cost hike caused by achieving the first objective so as to prevent the effect of improving the usability from being impaired.

Furthermore, the third objective of the present invention is to provide a transmission control apparatus having a subsidiary effect that makes it easier to add a protection function for preventing an abnormal situation from spreading when short-circuiting of a signal lead, a short-to-power fault, or a line-to-ground fault is caused.

A transmission control apparatus according to the present invention is provided with a plurality of linear solenoids, each of which acts on a hydraulic pressure adjustment valve incorporated in a vehicle transmission and generates an adjusted hydraulic pressure output corresponding to a supply current; and a supply current control apparatus that controls the supply current for the linear solenoid.

The linear solenoid is configured with a label resistor having a resistance value that serves as parameter data for correcting an inherent variation in the performance characteristic of the linear solenoid and an electromagnetic coil that are integrated with each other.

The supply current control apparatuses include a driving circuit that operates with a supply voltage, which is the output voltage of a power supply on/off device connected between a vehicle battery and all the plurality of linear solenoids or between the vehicle battery and each of the linear solenoids, and with a control voltage, which is the output voltage of a constant voltage power source that is supplied with electric power from the vehicle battery; a control module; and a control on/off device that is included in the driving circuit and is individually connected in series with the other terminal of the linear solenoid.

The driving circuit is provided with a measurement circuit for energizing the label resistor and measuring the resistance value of the label resistor.

The control module includes a microprocessor that generates a command signal for controlling the conduction state of the control on/off device, a program memory that collaborates with the microprocessor, a nonvolatile data memory that is provided in part of the region of the program memory or is provided in such a way as to be separated from the program memory, and a multi-channel A/D converter to which, as a reference voltage, the control voltage is applied.

The program memory is provided with control programs that function as a correction control constant storage means and a label resistor reading and conversion means.

The correction control constant storage means collaborates with an adjustment tool, which is externally connected, so as to measure a current control constant for the driving circuit, calculates a correction coefficient for obtaining a supply current that coincides with a target current even when there exists the inherent variation of a circuit component, and stores the correction coefficient in the program memory or the data memory.

The label resistor reading and conversion means operates in such a way as to calculate the resistance value of the label resistor based on the proportion of a measured current that flows from the measurement circuit to the label resistor to a measured voltage applied to the label resistor, in such a way as to calculate or selectively determine, based on the calculated resistance value, parameter data for correcting the inherent variation of the linear solenoid, and in such a way as to store the parameter data in the data memory or a RAM memory. The foregoing operation is implemented at an operation start timing when a power switch is turned on; and even when the linear solenoid is replaced for maintenance, the supply current can be controlled in accordance with the resistance value of the label resistor added to the replaced linear solenoid.

In a transmission control apparatus according to the present invention, when a supply current control apparatus is produced and shipped, adjustment work for the apparatus is performed by use of a linear solenoid that serves as a reference sample, and when a linear solenoid is produced and shipped, there is preliminarily performed the work in which a label resistor for correcting the inherent variation of the performance characteristic of the Linear solenoid is integrated with the linear solenoid, so that it is not required that at a vehicle production stage in which both a linear solenoid and a label resistor are assembled or when a linear solenoid or a supply current control apparatus is replaced for maintenance in the market, combination adjustment for both the linear solenoid and the label resistor is performed; thus, there is demonstrated an effect that a transmission control apparatus, assembly of which and maintenance replacement of which are easy, can be obtained.

In a transmission control apparatus according to the present invention, no IC memory for storing parameter data is included in a linear solenoid, and hence the inherent variation of the linear solenoid can simply be recognized by reading the resistance value of a label resistor; thus, there is demonstrated an effect that because the number of wiring leads between the linear solenoid and the supply current control apparatus is suppressed from increasing, the economical efficiency can be raised.

In a transmission control apparatus according to the present invention, because a microprocessor provided in the supply current control apparatus reads the label resistor while it does not perform supply-current control, there is demonstrated an effect that the control load on the microprocessor is reduced and hence an inexpensive microprocessor can be utilized.

In a transmission control apparatus according to the present invention, because a label resistor is supplied with electric power from a constant voltage power source by way of a power-supply resistor that functions as a measurement circuit, measured voltages at various positions are digitally converted by a multi-channel A/D converter that operates with a reference voltage, which is the output voltage of the same constant voltage power source; thus, there is demonstrated an effect that the resistance value of the label resistor is accurately measured and hence the control accuracy can be enhanced.

In a transmission control apparatus according to the present invention, by utilizing measured signals inputted to a power supply on/off device and a control on/off device, which are provided between both ends of an electromagnetic coil, and a multi-channel A/D converter, protection functions for short-circuiting, a short-to-power fault, and a short-to-ground fault of signal wiring leads can readily be added; thus, there is demonstrated an effect that the safety is raised.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 20 is a set of characteristic graphs that each represent an approximate straight line of the pressure vs. current characteristic of a transmission control apparatus according to Embodiment 3 of the present invention;

DETAILED DESCRIPTION OF THE PREFERRED EMBODIMENTS

Embodiment 1

(1) Detailed Explanation

Figure 1:
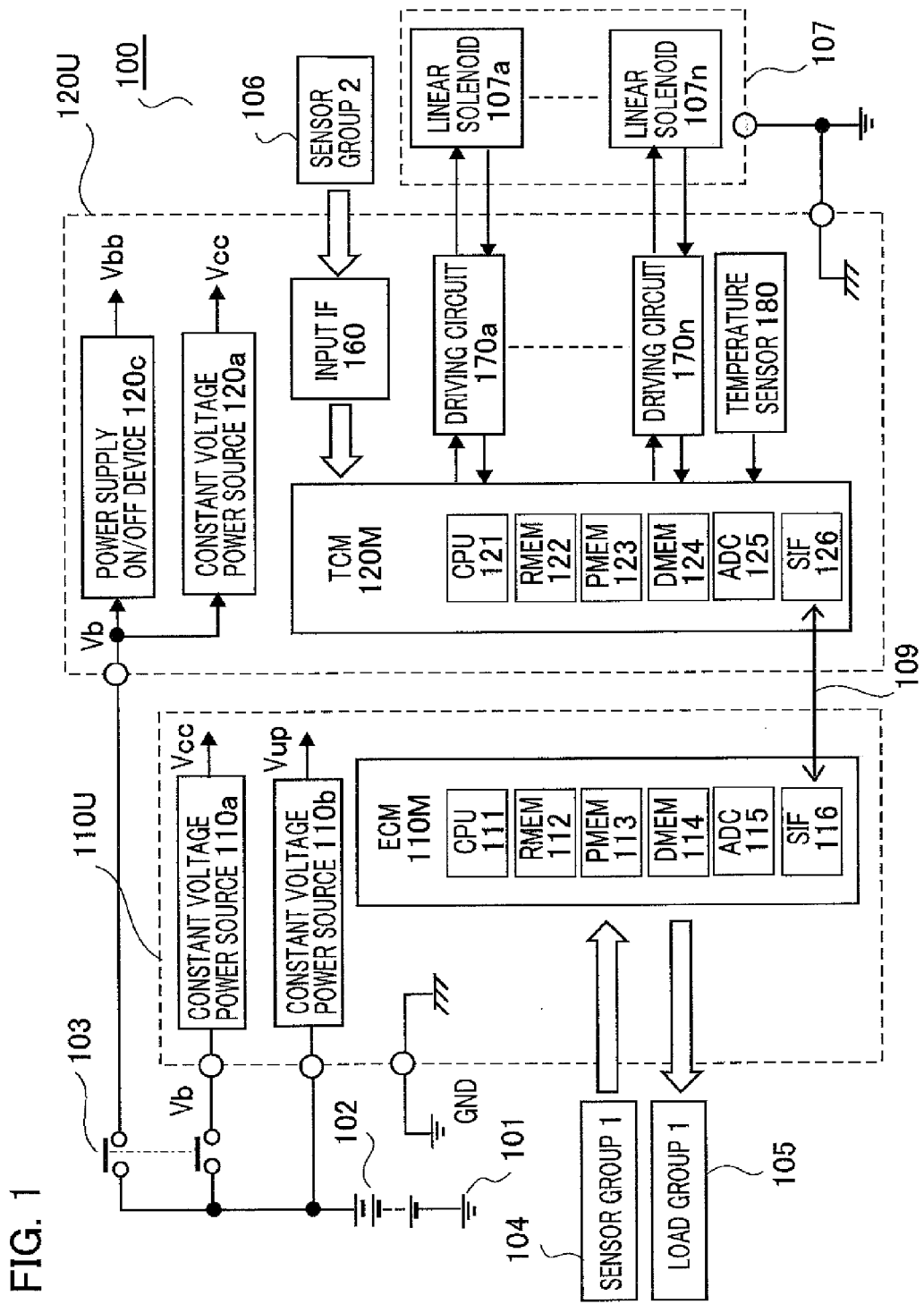
FIG. 1 is a configuration diagram of an overall transmission control apparatus according to Embodiment 1 of the present invention.

Hereinafter, there will be explained a transmission control apparatus according to Embodiment 1 of the present invention. FIG. 1 is a configuration diagram of an overall transmission control apparatus according to Embodiment 1 of the present invention. In FIG. 1, an engine control apparatus 110U provided in an engine room and a supply current control apparatus 120U fixed on the external wall of a gearbox 107 of a vehicle transmission are configured in such a way as to collaborate with each other so as to control supply currents for linear solenoids 107a through 107n incorporated in the gearbox 107. In Embodiment 1, a centralized-control transmission control apparatus 100 is configures with a single supply current control apparatus 120U and four to six, for example, linear solenoids 107a through 107n.

The positive terminal of a vehicle battery 102 whose negative terminal is connected with a vehicle body ground terminal 101 supplies a battery voltage Vb to the engine control apparatus 110U and the supply current control apparatus 120U, by way of an output contact 103 of an unillustrated power supply relay. The power supply relay is energized when an unillustrated power switch is closed; when the output contact 103 of the power supply relay is once closed and the engine control apparatus 110U starts to operate, the energization state is held through a self-holding command signal generated by the engine control apparatus 110U, whereby even when the power switch is opened, the energization state continues; when the engine control apparatus 110U and the supply current control apparatus 120U complete operation stopping processing, the self-holding command signal is cancelled and then the power supply relay is de-energized, whereupon the output contact 103 is opened.

A first group of sensors 104 whose outputs are inputted to the engine control apparatus 110U includes analogue sensors, on/off switch sensors, manual command switches, or the like, such as accelerator position sensor that detects the accelerator-pedal depressing degree, a throttle position sensor that detects the intake valve opening degree of an engine, an air flow sensor that measures intake amount, an exhaust-gas sensor, an engine rotation sensor, a crank angle sensor, a power switch, and an engine starting command switch. The outputs of part of the first group of sensors are directly inputted or transmitted through a communication line 109 also to the supply current control apparatus 120U.

A group of electric loads 105 that respond to the output signals generated by the engine control apparatus 110U include, for example, a fuel-injection electromagnetic valve, an ignition coil (in the case of an gasoline engine), an intake valve opening degree control motor, a starter motor, and the like. A second group of sensors 106 whose output signals are inputted to the supply current control apparatus 120U include, for example, a shift lever switch that indicates the selection position of the transmission shift lever and a vehicle speed sensor; part of the output signals are directly inputted or transmitted through the communication line 109 also to the engine control apparatus 110U.

Inside the engine control apparatus 110U, there is provided a constant voltage power source 110a that is energized from the vehicle battery 102 by way of the output contact 103 of the power supply relay and generates a stabilized control voltage Vcc of, for example, DC 5 [V]; the constant voltage power source 110a supplies electric power to a control module (ECM) 110M and other unillustrated units including interface circuits. In the control module 110M, a microprocessor (CPU) 111, which is a computing processing unit, a computing-processing RAM memory (RMEM) 112, a nonvolatile program memory (PMEM) 113, which is, for example, a flash memory, a nonvolatile data memory (DMEM) 114, a multichannel A/D converter (ADC) 115, and a serial-parallel converter (SIF) 116 are connected with one another through a bus line.

A constant voltage power source 110b that is directly supplied with electric power from the vehicle battery 102 backs up data written in the RAM memory 112 so that the data is prevented from disappearing when the output contact 103 of the power supply relay is opened; important data among the data written in the RAM memory 112 is transmitted to the data memory 114 while the unillustrated power switch is opened and the output contact 103 of the power supply relay is closed in a delayed manner.

In collaboration with the program memory 113, the microprocessor 111 controls the throttle valve opening degree in accordance with the accelerator-pedal depressing degree and supplies a fuel proportional to the intake amount; in the case of a gasoline engine, the ignition coil is on/off-controlled in accordance with the engine rotation speed and the fuel injection amount. When the transmission gear ratios of the transmission are changed, the microprocessor 111, in collaboration with the supply current control apparatus 120U, adjusts the fuel injection amount in such a way that the engine rotation speed gradually changes.

Inside the supply current control apparatus 120U, there is provided a constant voltage power source 120a that is energized from the vehicle battery 102 by way of the output contact 103 of the power supply relay and generates a stabilized control voltage Vcc of, for example, DC 5 [V]; the constant voltage power source 120a supplies electric power to a control module (TCM) 120M and driving circuit units 170a through 170n, described later. In the control module 120M, a microprocessor (CPU) 121, a computing-processing RAM memory (RMEM) 122, a nonvolatile program memory (PMEM) 123, which is, for example, a flash memory, a nonvolatile data memory (DMEM) 124, a multi-channel A/D converter (ADC) 125, and a serial-parallel converter (SIF) 126 are connected with one another through a bus line. The serial-parallel converter 126 and the serial-parallel converter 116 in the control module 110M of the engine control apparatus 110U are connected in series with each other through the communication line 109.

In response to a power supply start command issued by the microprocessor 121, the power supply on/off device 120c that is supplied with electric power from the vehicle battery 102 by way of the output contact 103 of the power supply relay closes and generates a supply voltage Vbb to be supplied to the driving circuit units 170a through 170n, described later. Signals inputted from the second group of sensors 106 are inputted to the microprocessor 121 by way of an input interface circuit 160; the microprocessor 121 controls the power supply to the linear solenoid 107a through 107n through the respective driving circuit units 170a though 170n, described later. An oil temperature sensor 180 is to detect the temperature of hydraulic oil inside the gearbox 107 in which the linear solenoids 107a through 107n are contained; in Embodiment 1, the oil temperature sensor 180 is provided directly in the supply current control apparatus 120U.

In addition, as each of the data memories 114 and 124, a nonvolatile memory may be utilized in which electrical reading and writing can readily be performed on a basis of one byte; however, in the case where the program memories 113 and 123 are flash memories in which collective erasure can electrically be performed on a basis of a block, specific blocks can be utilized as the data memories 114 and 124, respectively.

In the program memories 113 and 123, rewriting of the program is performed when an illustrated program tool or an adjustment tool 190, described later, is connected with the supply current control apparatus 120U; when neither a program tool nor the adjustment tool 190 is connected with the supply current control apparatus 120U, only reading can be performed, and rewriting processing cannot be performed. However, in the data memories 114 and 124, in the case where even when they are included in part of the regions of the program memories 113 and 123, respectively, blocks in which they are stored are different from each other, the microprocessors 111 and 121 can freely perform reading and writing even when no tool is connected with the supply current control apparatus 120U. However, in the case of a flash memory, the number of times of erasure is limited; therefore, in general, data items that have been written in the RAM memories 112 and 122 during driving are transmitted to and stored in the data memories 114 and 124, respectively, immediately after the power switch is opened.

Figure 2:
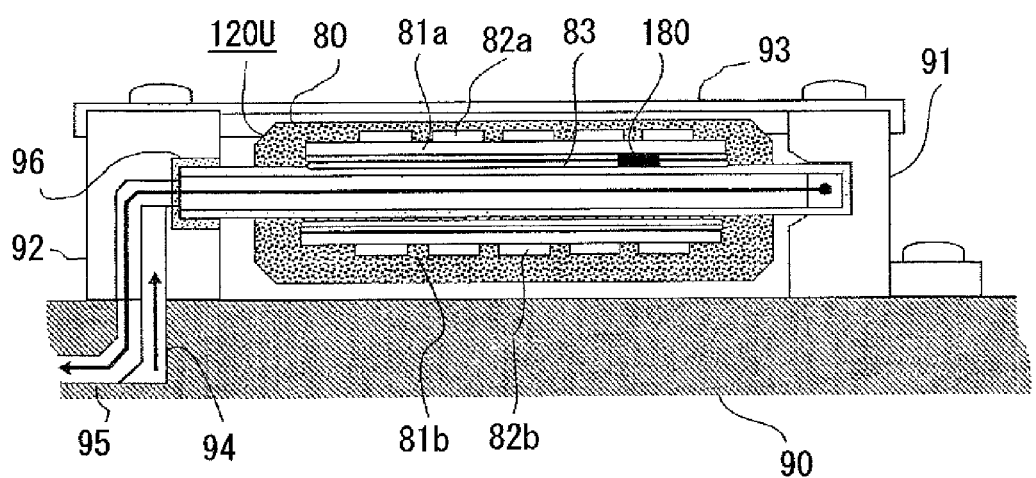
FIG. 2 is a cross-sectional view illustrating a supply current control apparatus, in a transmission control apparatus according to Embodiment 1 of the present invention, that is mounted on a gearbox.

Next, the configuration of the supply current control apparatus 120U will be explained. FIG. 2 is a cross-sectional view illustrating a supply current control apparatus, in a transmission control apparatus according to Embodiment 1 of the present invention, that is mounted on a gearbox. In FIG. 2, the supply current control apparatus 120U is configured with a U-shaped rectangular hollow pipe 83, on the respective external surfaces of which a pair of circuit boards 81a and 81b is adhered and fixed; circuit components 82a and 82b mounted on the circuit boards 81a and 81b, respectively; and the temperature sensor 180, which are integrally molded by use of a sealing resin 80. The U-shaped rectangular hollow pipe 83 is configured in such a way as described below: it is extended from the left-rear position to the right-rear position of the paper plane in FIG. 2; it is extended in such a way as to perpendicularly penetrate the paper plane from the rear surface to the front surface thereof at the right end position; it is extended from the right-front position to the left-front position of the paper plane; then, the left-end portion and the right-end portion thereof are exposed from the sealing resin 80.

The supply current control apparatus 120U is fixed with screws to the outer surface of an external wall 90 of the gearbox 107 by the intermediary of a pair of mounting feet 91 and 92 and is protected by a protection cover 93. In the one mounting foot 92, there are provided a gear oil inlet pipe 94 that communicates with one opening end of the U-shaped rectangular hollow pipe 83 and a gear oil outlet pipe 95 that communicates with the other opening end thereof; the pair of opening ends of the rectangular hollow pipe 83 is fixed to the mounting foot 92 by the intermediary of the packing 96. The temperature sensor 180 that adjoins the rectangular hollow pipe 83 measures the temperature of the gear oil that circulates through the rectangular hollow pipe 83.

Figure 3:
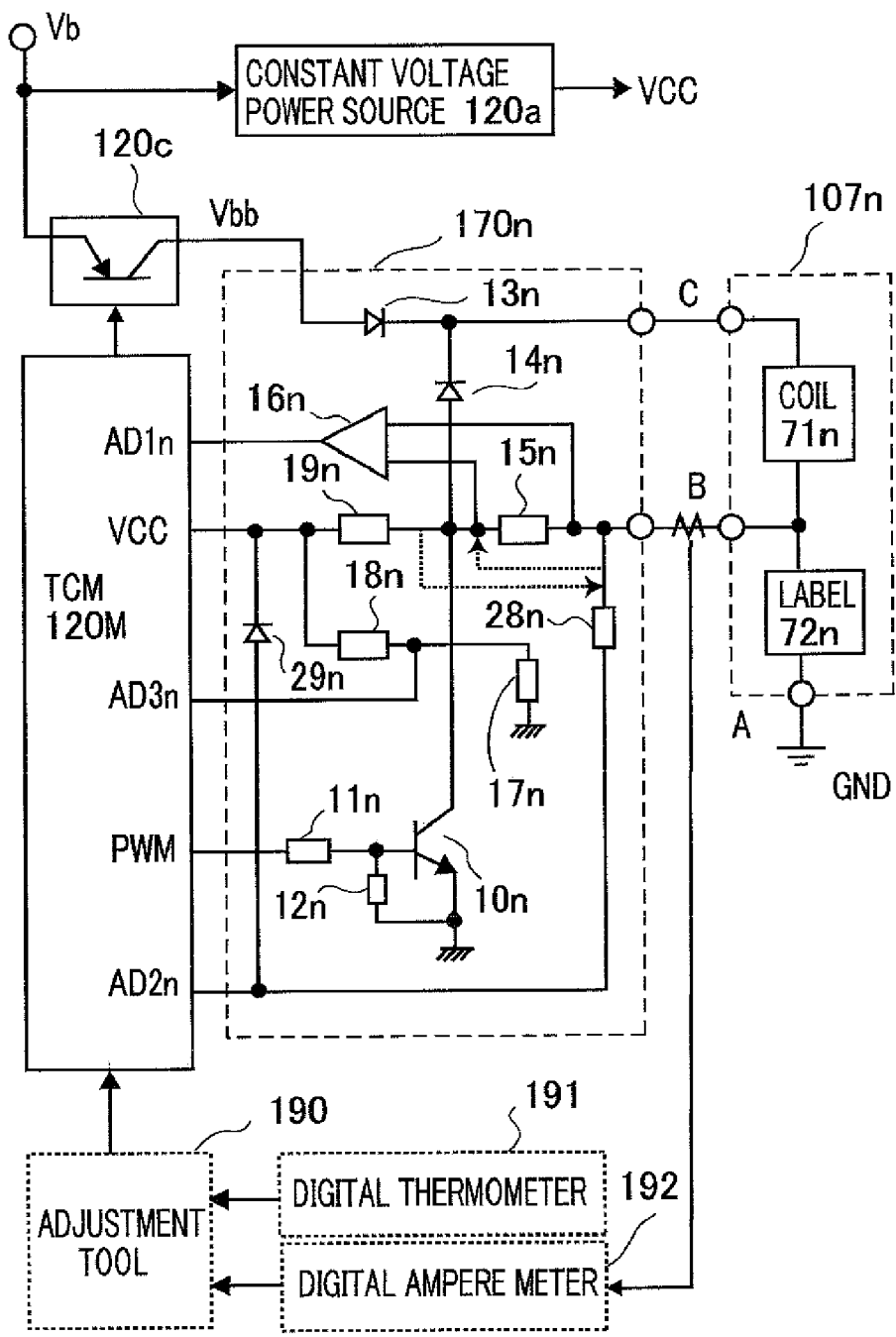
FIG. 3 is a circuit diagram of a driving circuit unit in a transmission control apparatus according to Embodiment 1 of the present invention.

Next, the driving circuit units will be explained. FIG. 3 is a circuit diagram of the driving circuit unit in a transmission control apparatus according to Embodiment 1 of the present invention; among the driving circuit units 170a through 170n, the driving circuit unit 170n is illustrated as a representative, and the linear solenoid 107n corresponding to the driving circuit unit 170n is concurrently illustrated. The other driving circuit units and the linear solenoids corresponding thereto are configured in the same manner. In FIG. 3, the linear solenoid 107n is configured with an electromagnetic coil 71n and a label resistor 72n; the electromagnetic coil 71n having a low resistance of, for example, several ohms is connected between an upstream side terminal C and a downstream side terminal B; the label resistor 72n having a high resistance of several kilo ohms or higher is connected between the downstream side terminal B and a ground terminal A.

The main circuit of the driving circuit unit 170n that supplies electric power to the linear solenoid 107n is configured with a reverse-flow prevention diode 13n connected between the power supply on/off device 120c and the upstream side terminal C of the linear solenoid 107n; a control on/off device 10n connected to the circuit ground position; a current detection resistor 15n, having a minute resistance of several milliohms, connected between the control on/off device 10n and the downstream side terminal B; and a commutation diode 14n; the commutation diode 14n is connected in parallel with a series circuit consisting of the electromagnetic coil 71n and the current detection resistor 15n.

When the power supply on/off device 120c and the control on/off device 10n are closed, an excitation current is supplied to the electromagnetic coil 71n by way of the power supply on/off device 120c, the electromagnetic coil 71n, the current detection resistor 15n, and the control on/off device 10n; the value of the voltage across the current detection resistor 15*n* is proportional to the value of the excitation current. In this situation, when the control on/off device 10*n* is opened, the excitation current that has been flowing in the electromagnetic coil 71*n* attenuates while flowing back thereto through the commutation diode 14*n*; the value of the voltage across the current detection resistor 15*n* is proportional to the value of the excitation current that flows back and attenuates.

In contrast, when the power supply on/off device 120*c* is closed and the control on/off device 10*n* is opened, a leakage current flows through the electromagnetic coil 71*n* by way of the power supply on/off device 120*c*, the electromagnetic coil 71*n*, the label resistor 72*n*, and the ground circuit, and concurrently, a leakage current is generated which flows into the output circuit of the constant voltage power source 120*a* by way of a power-supply resistor 19*n*; however, because the resistance values of the label resistor 72*n* and the power-supply resistor 19*n* are sufficiently large in comparison with that of the electromagnetic coil 71*n*, the linear solenoid 107*n* is not erroneously activated.

Provided that when the vehicle battery 102 is replaced, the positive and negative electrodes are set the other way around, there exists a possible risk that the power supply on/off device 120*c* and the control on/off device 10*n* become reversely conductive and hence a power-source shortcircuit is caused through the commutation diode 14*n*; the reverse-flow prevention diode 13*n* prevents the power-source shortcircuit. This countermeasure also applies to the case where the power supply on/off device 120*c* and the control on/off device 10*n* are each formed of not an illustrated junction-type transistor but a field-effect transistor.

The microprocessor 121 in the control module 120M generates a control command signal PWM; when the output logic becomes "H", the microprocessor 121 supplies the base current to the control on/off device 10*n* by way of a driving resistor 11*n* so as to close the control on/off device 10*n*; when the output logic becomes "L", the control on/off device 10*n* is securely opened by means of an open-circuit stabilizing resistor 12*n* connected between the base terminal and the emitter terminal thereof.

The voltage across the current detection resistor 15*n* is amplified by a differential amplifier 16*n* and is inputted to the multi-channel A/D converter 125 through an analogue input port AD1*n*. A temperature sensor 17*n* is disposed at a position immediately near to the current detection resistor 15*n*; the control voltage Vcc is applied to the temperature sensor 17*n* by way of a series resistor 18*n*. The voltage across the temperature sensor 17*n* is inputted to the multi-channel A/D converter 125 through an analogue input port AD3*n*.

The control voltage Vcc is applied to one terminal of the power-supply resistor 19*n*, and the other terminal thereof is connected with the downstream side terminal B of the linear solenoid 107*n* by way of the downstream terminal or the upstream terminal of the current detection resistor 15*n*; when the power supply on/off device 120*c* and the control on/off device 10*n* are opened, electric power is supplied to the label resistor 72*n* by way of the power-supply resistor 19*n*, and the voltage across the label resistor 72*n* is inputted to the multi-channel A/D converter 125 by way of an input resistor 28*n* and an analogue input port AD2*n*. In the case when the power supply on/off device 120*c* is closed and the control on/off device 10*n* is opened, the voltage of the downstream side terminal B of the linear solenoid 107*n* is approximately the same as the battery voltage Vb and is returned to the output terminal of the constant voltage power source 120*a* by way of a clip diode 29*n* for the purpose of preventing the input voltage of the multi-channel A/D converter 125 from becoming excessively high.

The input resistor 28*n* has a high resistance that does not provide any effect to a change in the output voltage of the constant voltage power source 120*a*; because the input resistance of the multi-channel A/D converter 125 is further larger than the resistance of the input resistor 28*n*, the voltage across the label resistor 72*n* can be inputted to the multi-channel A/D converter 125 without undergoing any effect of the input resistor 28*n*.

In FIGS. 1 and 3, the microprocessor 121 in the control module 120M firstly determines the transmission gear ratio in response to the gearshift switch, the accelerator-pedal depressing degree, and the vehicle speed inputted to the input interface circuit 160, selectively determines which linear solenoid among the plurality of linear solenoids 107*a* through 107*n* is to be energized, and then generates a target hydraulic pressure signal for the selected linear solenoid, for example, 107*n*. Subsequently, the microprocessor 121 generates a target current signal corresponding to the target hydraulic pressure signal, which is determined depending on the hydraulic pressure vs. current characteristic, of the linear solenoid 107*n*, that is concurrently utilized when the foregoing selective determination is implemented; the label resistor 72*n*, described later, indicates the correction parameter for an inherent variation from the reference hydraulic pressure vs. current characteristic. The characteristic of variation, in the hydraulic pressure vs. current characteristic, corresponding to the change in the oil temperature is stored in the program memory 123; in response to the oil temperature detected by the temperature sensor 180, the reference hydraulic pressure vs. current characteristic is corrected.

After a target current is determined, it is assumed that this target current is a setting signal and the output signal of the differential amplifier 16*n* is a measured signal; then, the control command signal PWM is generated in such a way that the setting signal, which is a target current, and the measured signal coincide with each other, and is inputted to the base of the control on/off device 10*n*.

Meanwhile, the reference resistance value of the temperature sensor 17*n* at the reference temperature 25° C., a data table for the standard temperature coefficients of the temperature sensor 17*n*, and a data table for the reference resistance values and the standard temperature coefficients of the current detection resistor 15*n* are stored in the program memory 123. The standard temperature coefficient referred to here is the standard value of the proportion of the reference resistance R25 at the reference temperature 25° C. to the resistance value Rt at a measurement temperature T, and the actual temperature coefficient varies depending on an individual component; however, because as the adopted temperature sensor 17*n* and current detection resistor 15*n*, high-accuracy components whose temperature coefficient varies little are utilized, the standard characteristic is utilized as this temperature coefficient.

However, even in the case where as the adopted temperature sensor 17*n* and current detection resistor 15*n*, high-accuracy components whose temperature coefficient varies little are utilized, it is uneconomical to select components whose temperature coefficient and reference resistance R25 vary little; actually, a non-negligible inherent variation remains in the reference resistance R25. Accordingly, one of the roles of the adjustment tool 190 is to correct the inherent variation.

In the step of production and outgoing inspection of the supply current control apparatus 120U, a digital thermometer 191 that measures the ambient temperature of the temperature sensor 17n and a digital ampere meter 192 that measures the current flowing in the current detection resistor 15n are connected with the adjustment tool 190 that is connected in series with the supply current control apparatus 120U.

At first, the power supply on/off device 120c and the control on/off device 10n are opened; at an normal ambient temperature Ta (≈25° C.) at which no heat is generated by the current detection resistor 15n, the input voltage AD3n at the analogue input port AD3n is measured; according to the equation described below, the resistance value R17n of the temperature sensor 17n is calculated; a correction coefficient is calculated based on the proportion R17n/R25n of the resistance value R17n to the reference resistance R25 and is stored in the data memory 124. However, in the case where the measured normal ambient temperature is considerably far away from the reference temperature 25° C., the resistance value Ra at the ambient temperature Ta is calculated from the data table, and the proportion R17n/Ra is utilized as the correction coefficient; as the ambient temperature Ta, the value measured by the digital thermometer 191 is utilized.

Subsequently, the microprocessor 121 sets a predetermined target current, which is, for example, the rated current of the electromagnetic coil 71n, calculates a correction coefficient for the current detection resistor 15n in such a way that when at a predetermined battery voltage Vb, the power supply on/off device 120c is closed and the control on/off device 10n is opening/closing-controlled, the target current and the current measured by the digital ampere meter 192 coincide with each other, and stores the correction coefficient in the program memory 123 or the data memory 124.

As a result, there is corrected a control error caused by an error in the resistance value of the current detection resistor 15n with respect to the designing reference value or by a variation in the input resistance included in the amplification circuit formed of the differential amplifier 16n; therefore, even when the resistance value of the current detection resistor 15n at the reference temperature varies or the resistance value of the current detection resistor 15n varies due to a change in the ambient temperature or self-heating in the current detection resistor 15n, a supply current that approximately coincides with the target current can be obtained.

In addition, strictly speaking, the resistance value of the electromagnetic coil 71n changes depending of the temperature of its own; thus, by taking the changing characteristic, as well, into consideration, there can be implemented control that further reduces the current control error and immediately responds to a rapid change in the target current. The main point is that the adjustment work for supplying an accurate excitation current in accordance with a target current can be implemented when a linear solenoid, as the standard sample, is provided, and the excitation current can be adjusted in such a way as not to change due to an inherent variation of the linear solenoid.

Figure 4:
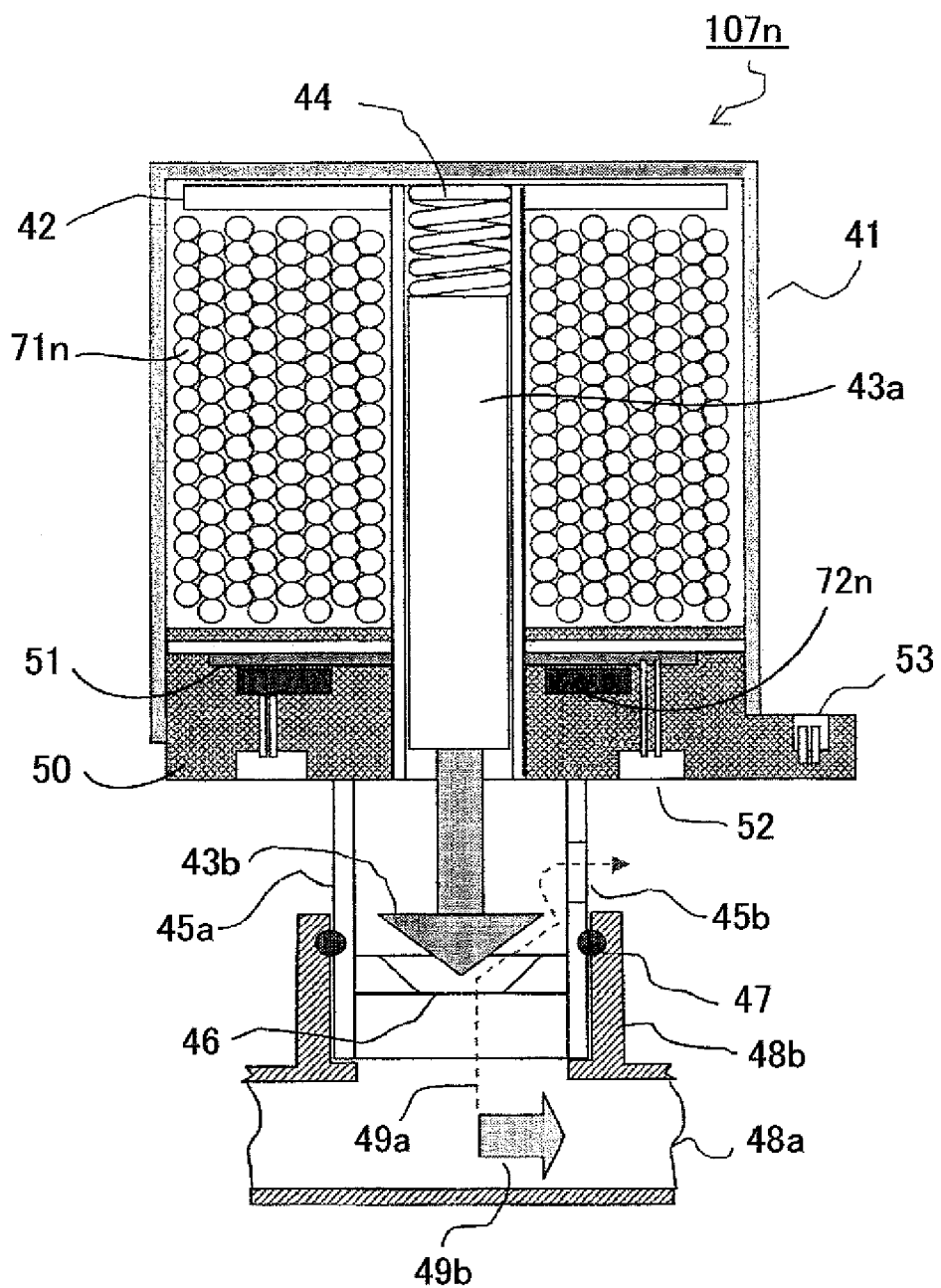
FIG. 4 is a schematic cross-sectional view of a linear solenoid in a transmission control apparatus according to Embodiment 1 of the present invention.

Next, the configurations of the linear solenoids 107a through 107n illustrated in FIG. 1 will be explained. FIG. 4 is a schematic cross-sectional view of a linear solenoid in a transmission control apparatus according to Embodiment 1 of the present invention. FIG. 4 illustrates the linear solenoid 107n, which is one of the plurality of linear solenoids 107a through 107n; the configurations of the other linear solenoids are the same as that of the linear solenoid 107n.

In FIG. 4, the linear solenoid 107n is provided with a bobbin 42 mounted inside a yoke 41; the electromagnetic coil 71n is wound around the bobbin 42. A plunger 43a to be attracted by the electromagnetic force of the electromagnetic coil 71n and a relief valve 43b, which is a hydraulic pressure adjustment valve, are integrated with each other and pressed downward in FIG. 4 by a spring 44; when the electromagnetic coil 71n is energized, due to the electromagnetic force thereof, the plunger 43 resists the pressing force of the spring 44 and moves upward in FIG. 4.

At the opening end of the yoke 41, there is provided a circuit board 51 and the label resistor 72n mounted on the circuit board 51; the circuit board 51 and the label resistor 72n are integrally molded with a sealing resin 50; a plurality of window openings 52, described later, are provided in the end face of the sealing resin 50. The upstream side terminal C and the downstream side terminal B for the electromagnetic coil 71n and the label resistor 72n are extracted outward through a coupling connector 53; the ground terminal A illustrated in FIG. 3 is connected with the yoke 41 without passing through any connector.

Meanwhile, a fixed valve 46 facing the movable relief valve 43b is provided in a cylinder portion 45a that is integrally mounted on the yoke 41. In a pipe portion 48a, an activation oil 49b having a predetermined pressure is pressure-fed from an unillustrated hydraulic pump to the right side in FIG. 4 so that by means of an illustrated hydraulic cylinder, a hydraulic clutch or a hydraulic brake in the transmission is engaged or released.

An opening wall 48b provided on the pipe portion 48a is engaged with the outer circumference of the cylinder portion 45a and sealed with an O-ring 47. When a gap is produced between the fixed valve 46 having a conical opening portion and the relief valve 43b, part of the activation oil 49b flows into the gearbox 107 through the gap between the foregoing valves and an adjustment flow path 49a, which is a relief flow path leading to an opening portion 45b provided in the cylinder portion 45a.

The linear solenoid 107n illustrated in FIG. 4 is a normally-close type in which when the electromagnetic coil 71n is not energized, the spring 44 presses the relief valve 43b in the direction in which the relief valve 43b closes; the following relationships are established:

hydraulic pressure×valve opening area=pressing force of spring−electromagnetic driving force pressing force of spring=spring constant×(initial compression measurement+opened valve moving measurement)

Accordingly, the relationship is established in which when the excitation current for the electromagnetic coil 71n is determined, the hydraulic pressure is determined, and when the excitation current is increased, the valve opening measurement becomes larger and hence the hydraulic pressure decreases.

Figure 6:
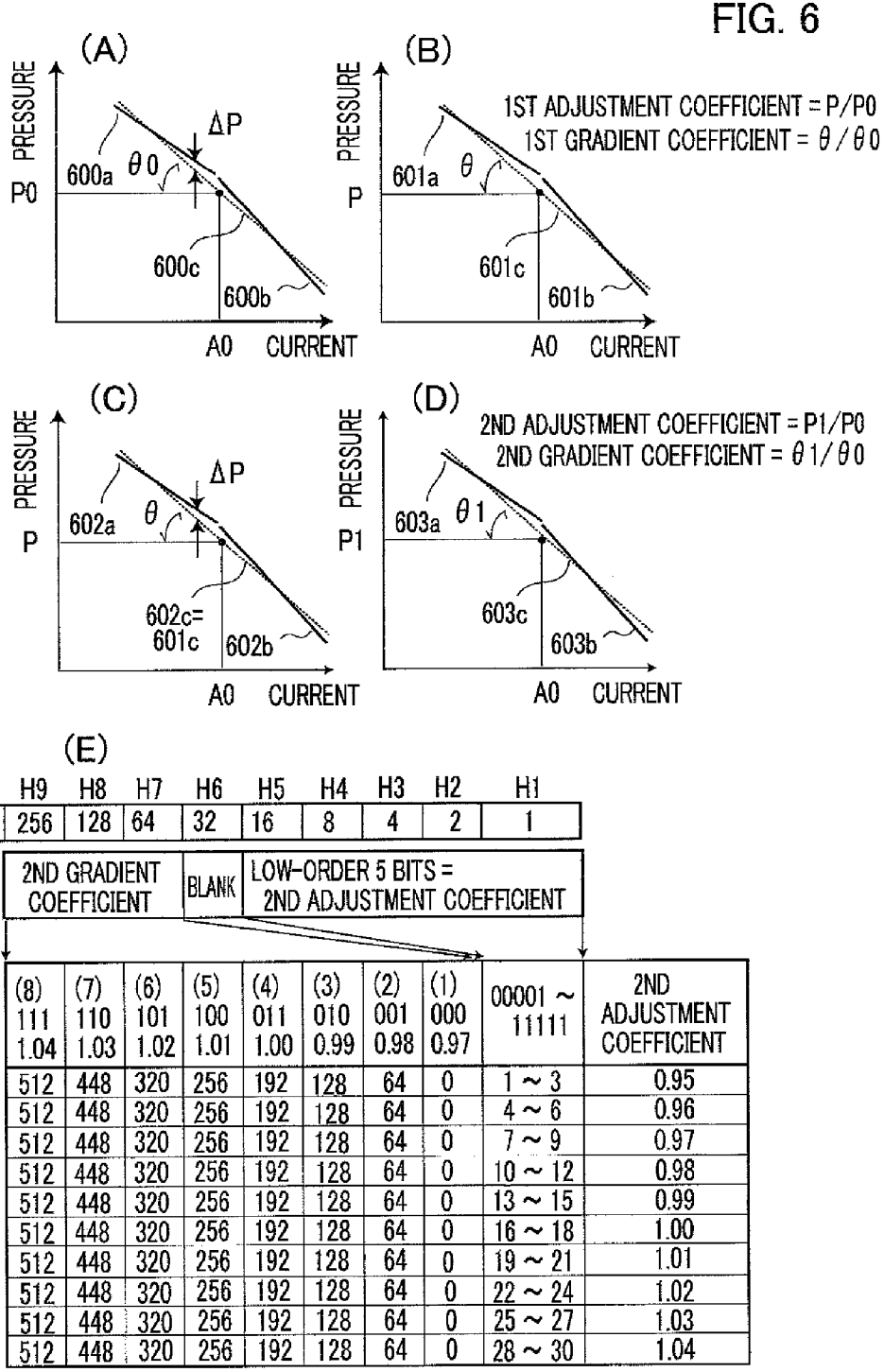
FIG. 6 is a set of explanatory graphs and tables for explaining how to determine the resistance value of a label resistor in a transmission control apparatus according to Embodiment 1 of the present invention.

The hydraulic pressure vs. current characteristic of the linear solenoid 107n will be described later with reference to FIG. 6; each of the linear solenoids 107a through 107n has its inherent variation with respect to the hydraulic pressure vs. current characteristic of a standard linear solenoid; the first factor of the inherent variation is the variation in the pressing force for the compression measurement of the spring 44. The second factor of the inherent variation is the variation in the electromagnetic driving force caused by the variation in the magnetic resistance of the yoke 41. The other variation factor that undergoes the effect of the oil temperature is the fact that when the oil temperature rises, the viscosity of the activation oil decreases and hence the hydraulic pressure is reduced because even when the valve opening measurement is small, a great deal of activation oil is discharged. Because undergoing the effect of the oil temperature, the sliding resistance of the plunger 43a increases when the oil temperature is low.

The foregoing variation factors of the hydraulic pressure vs. current characteristic of the linear solenoid are the same as those of an unillustrated normally-open type of linear solenoid. In the case of a normally-open type of linear solenoid, the spring presses the relief valve in a direction in which the relief valve opens, and the following relationships are established:

hydraulic pressure×valve opening
area=electromagnetic driving force−pressing
force of spring pressing force of spring=spring constant×(initial compression measurement−opened valve moving measurement)

Accordingly, the relationship is established in which when the excitation current for the electromagnetic coil $71n$ is determined, the hydraulic pressure is determined, and when the excitation current is increased, the valve opening measurement becomes smaller and hence the hydraulic pressure increases.

Regardless of whether the type of the linear solenoid is a normally-close type or a normally-open type, how to express by the label resistor $72n$ the respective variations of the linear solenoids for the standard hydraulic pressure vs. current characteristic is an important issue. The variation characteristics of the hydraulic pressure for the oil temperature can preliminarily be stored, as the standard data, in the program memory 123.

Figure 5:
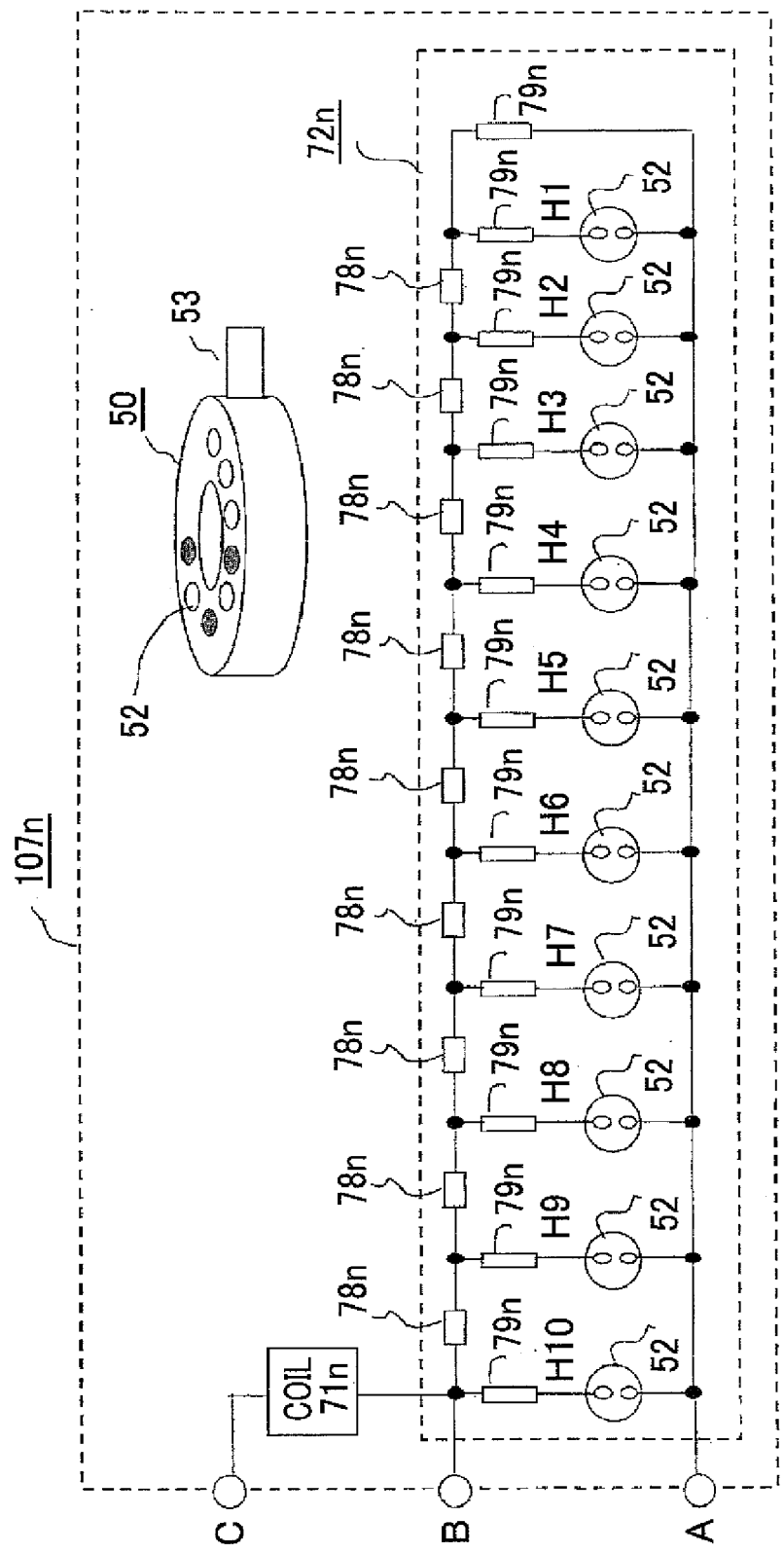
FIG. 5 is a circuit diagram of a ladder circuit for configuring a label resistor in a transmission control apparatus according to Embodiment 1 of the present invention.

Next, the configuration of the label resistor $72n$ illustrated in FIGS. 3 and 4 will be explained. FIG. 5 is a circuit diagram of a ladder circuit for configuring a label resistor in the transmission control apparatus according to Embodiment 1 of the present invention. FIG. 5 illustrates the label resistor $72n$ for the linear solenoid $107n$, which is one of the plurality of linear solenoids $107a$ through $107n$; the configurations of the respective label resistors for the other linear solenoids are the same as that of the label resistor $72n$.

In FIG. 5, the label resistor $72n$ is formed of a ladder circuit in which a plurality of first resistors $78n$ are sequentially connected in series with one another, and respective second resistors $79n$ having a resistance value of twice as large as the resistance value of the first resistor $78n$ are connected with the start point of the in-series connection circuit, the end point thereof, and the respective connection points between the plurality of first resistors $78n$, and in which the respective other terminals of the second resistors $79n$ are selectively connected with the ground terminal A by way of respective pairs of shorting/opening terminals H1 through H10.

The respective shorting/opening terminals H1 through H10 are arranged at the respective window openings 52 in the sealing resin 50 that seals the plurality of first resistors $78n$ and the plurality of second resistors $79n$ in an air-tight manner. When the pair of shorting/opening terminal H1 is short-circuited, the second resistor $79n$, which has been connected through the short-circuited pair of shorting/opening terminal H1, and the second resistor $79n$ at the end are connected in parallel with each other, and the value of the combined resistance is the same as the resistance value of the first resistor $78n$; because the combination resistor is connected in series with the first resistor $78n$ at the end position, the present situation becomes equivalent to the situation in which at the right side of the next-stage pair of shorting/opening terminals H2 in FIG. 5, only a single second resistor $79n$ is connected.

When the circuit configuration is made in such a way as described above and the pairs of shorting/opening terminals H1 through H10 are short-circuited in an arbitrary combination, the combination resistance, as the label resistor $72n$, changes depending on the combination. In other words, the change in the label resistor $72n$, caused by short-circuiting the pairs of shorting/opening terminals H1 through H10 situated at the left side of FIG. 5, is larger than the change in the label resistor $72n$, caused by short-circuiting the shorting/opening terminals H1 through H10 situated at the right side of FIG. 5; the pairs of shorting/opening terminals H1 through H10 situated at the left side of FIG. 5 are assigned as higher-order bits.

As the adjustment work for the label resistor $72n$, part or all of the pairs of shorting/opening terminals H1 through H10 are short-circuited with solder, or in some cases, all of them are opened; after the adjustment work is completed, a seal material is poured into the window opening 52 in the sealing resin 50.

Next, the method of determining the resistance value of the label resistor configured as illustrated in FIG. 5 will be explained. FIG. 6 is a set of explanatory graphs and tables for explaining how to determine the resistance value of a label resistor in a transmission control apparatus according to Embodiment 1 of the present invention. FIG. 6(A) represents the standard characteristic graph, which is an average pressure vs. current characteristic of a great number of linear solenoids, at a time when the oil temperature is a predetermined temperature, which is a reference temperature; the ordinate denotes the value of an adjusted hydraulic pressure obtained by use of the linear solenoid; the abscissa denotes the value of a supply current for the electromagnetic coil. The characteristic curve in the standard characteristic graph represents the linear portion of the band where the hydraulic pressure adjustment is performed; when the supply voltage is decreased, the adjusted hydraulic pressure gradually increases up to a predetermined maximum hydraulic pressure equivalent to the pumping hydraulic pressure obtained by the oil pump and is saturated at the upper limit.

When the supply current is further increased, the adjusted hydraulic pressure gradually decreases up to a predetermined minimum hydraulic pressure determined by the maximum opening area of the relief valve $43b$ and the pipe resistance of the adjustment flow path $49a$, which is a relief flow path, and is saturated at the lower limit. The represented linear portion is approximated with a pair of straight lines $600a$ and $600b$ that are represented by solid lines and configure a broken line, and the broken line can further be approximated with a single straight line $600c$ that is obtained by minimizing the relative error through the least square method and is represented by a dotted line. Here, it is assumed that when the value of the supply current is A0, the adjusted hydraulic pressure determined by the approximate straight line $600c$ is P0 and the gradient of the approximate straight line $600c$ is $\theta 0$. The adjusted hydraulic pressure P0, the current value A0, the gradient $\theta 0$, and the difference value $\Delta P$, at each current value, between the approximate straight line $600c$ and the pair of straight lines $600a$ and $600b$ are stored, as a data table, in the program memory 123 or the data memory 124.

FIG. 6(B) is the inherent characteristic graph, which is a hydraulic pressure vs. current characteristic obtained by measuring a specific linear solenoid that is subject to adjustment and shipping; the characteristic represented by this inherent characteristic graph is approximated with a pair of straight lines $601a$ and $601b$ that are represented by solid lines and configure a broken line, and the broken line is further approximated with a single straight line $601c$ that is obtained by minimizing the relative error through the least square method and is represented by a dotted line. Here, it is assumed that when the value of the supply current is A0, the adjusted hydraulic pressure determined by the approximate straight line $601c$ is P and the gradient of the approximate straight line 601c is θ. In this case, the first adjustment coefficient for the current is P/P0, and the first gradient coefficient for the straight-line gradient is θ/θ0.

FIG. 6(C) is a first adjustment characteristic graph obtained by correcting the standard characteristic graph represented in FIG. 6(A) with the first adjustment coefficient and the first gradient coefficient; the straight line 602c in the first adjustment characteristic graph is the same as the straight line 601c in FIG. 6(B); in contrast, a pair of straight lines 602a and 602b that configure a broken line are different from the pair of straight lines 601a and 601b that configure the broken line in FIG. 6(B). In other words, the pair of straight lines 602a and 602b is obtained by algebraically adding the difference value ΔP between the straight line 600c in FIG. 6(A) and the pair of straight lined 600a and 600b to the straight line 602c (=the straight line 601c).

In FIG. 6(D), error calculation is performed by slightly increasing or decreasing the first adjustment coefficient P/P0 and the first gradient coefficient θ/θ0 so that the relative error between the pair of straight lines 601a and 601b that configure the broken line in FIG. 6(B) and the pair of straight lines 602a and 602b that configure the broken line in FIG. 6(C) becomes minimal, and when the relative error has become minimal, a second adjustment coefficient P1/P0 and a second gradient coefficient θ1/θ0 are determined. Accordingly, the relative error between the pair of straight lines 601a and 601b represented in the inherent characteristic graph in FIG. 6(B) and a pair of straight lines 603a and 603b represented in FIG. 6(D) is minimal; the characteristic for obtaining the pair of straight lines 603a and 603b is represented by a straight line 603c.

The second adjustment coefficient P1/P0 and the second gradient coefficient θ1/θ0 obtained in such a way as described above are expressed as the resistance value of the label resistor 72n in such a manner as described later; the microprocessor 121 that reads the resistance value of the label resistor 72n interprets the resistance value into the second adjustment coefficient P1/P0 and the second gradient coefficient θ1/θ0 and stores them in the program memory 123 or the data memory 124.

FIG. 6(E) shows a list that represents an example of bit assignment for label resistors; the 6 lower-order bits (H1 through H6) of the pairs of shorting/opening terminals H1 through H10 of the label resistor 72n are short-circuited or opened in accordance with the value of the second adjustment coefficient P1/P0. In this list, the most significant bit H10 is always logic "1" and the shorting/opening terminal H10 is opened. The 5 low-order bits (H1 through H5) are utilized for setting the second adjustment coefficient P1/P0 in ten steps "0.95" through "1.04". The pair of shorting/opening terminals H6 are terminals that are always short-circuited for logic "0" so that a group of high-order bits and a group of low-order bits can clearly be distinguished from each other. The 3 high-order bits (H9 through H7) are utilized for setting the second gradient coefficient θ1/θ0 in eight steps "0.97" through "1.04".

In the case where the foregoing setting is performed, the larger the set binary value for the pair of shorting/opening terminals becomes, the more the number of opened terminals of the label resistor 72n becomes, whereby the value of the combination resistance becomes larger; the characteristic of the combination resistance becomes like a nonlinear broken line. However, based on the measured resistance value, it can be estimated whether the pair of shorting/opening terminals are short-circuited or opened with a predetermined data cable.

In the case where the resolution of the multi-channel A/D converter 125 is 10 bits, a voltage obtained through division by the power-supply resistor 19n and the label resistor 72n is inputted to the analogue input port AD2n in FIG. 3; therefore, by setting the lower limit adjustment value of the label resistor 72n to a value that is larger than the power-supply resistor 19n, the input voltage of the analogue input port AD2n can securely become half of the control voltage Vcc. In this case, the multi-channel A/D converter 125 can be regarded as an A/D converter having a resolution of 9 bits. For that reason, the pairs of shorting/opening terminals, of the label resistor 72n, that correspond to 9 bits are made effective; however, by utilizing a multi-channel A/D converter having a resolution of 12 bits, the selection range of the adjustment coefficient and the gradient coefficient can further be expanded.

(2) Detailed Description of Operation

Figure 7:
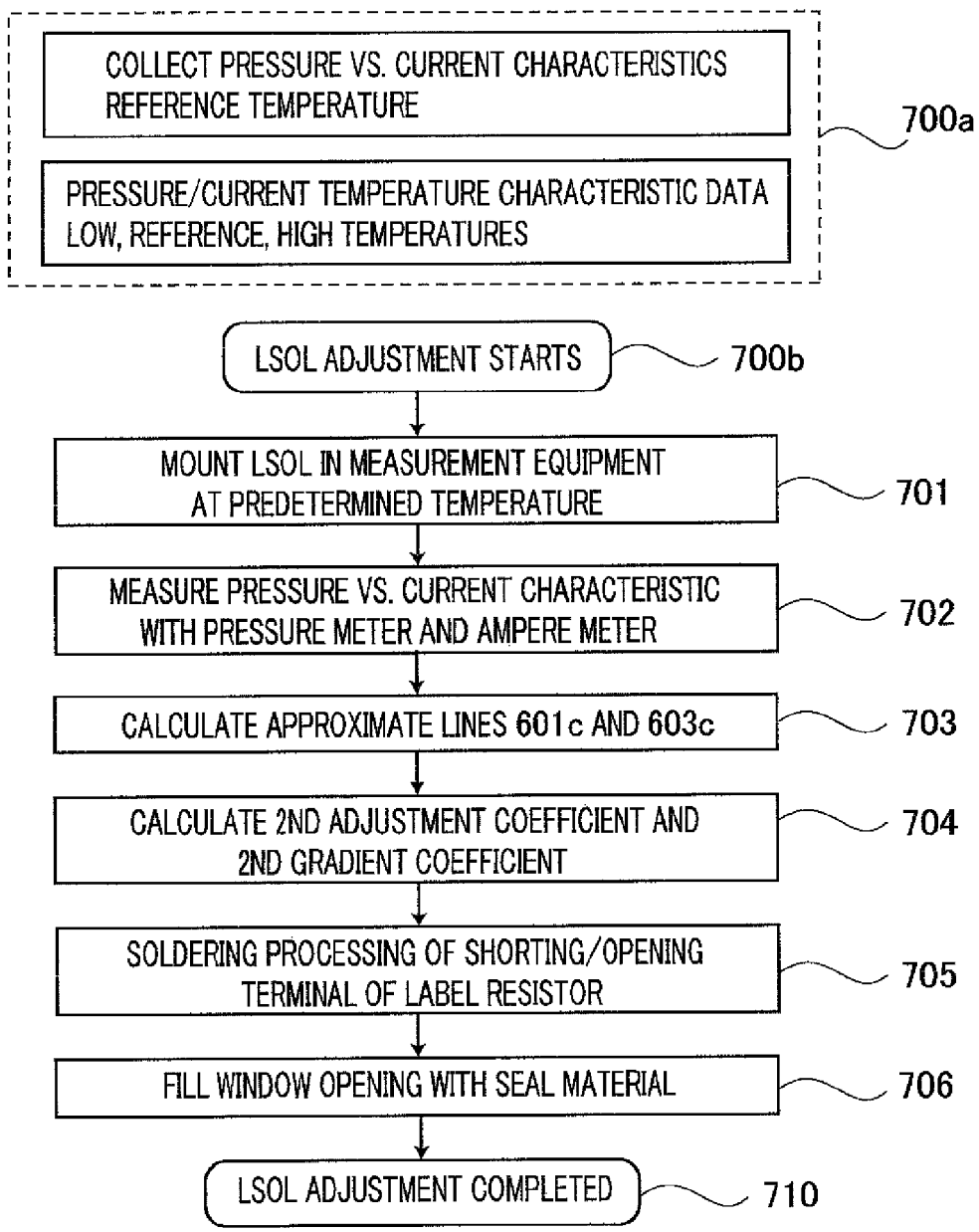
FIG. 7 is a flowchart representing adjustment work for a linear solenoid in a transmission control apparatus according to Embodiment 1 of the present invention.

Next, there will be explained the operation of the transmission control apparatus, according to Embodiment 1 of the present invention, that is configured as described above. FIG. 7 is a flowchart representing adjustment work for a linear solenoid in a transmission control apparatus according to Embodiment 1 of the present invention; outgoing adjustment work for a linear solenoid is represented. In FIG. 7, the step 700a is a step in which experiment and measurement that are prior to the outgoing adjustment work are performed; in the step 700a, the linear solenoid 107n is mounted in a transmission; under an oil temperature environment of the reference temperature, for example, 25° C., various levels of excitation currents are supplied to the electromagnetic coil 71n and the values of the adjusted hydraulic pressures corresponding to the excitation currents are measured with a hydraulic pressure gauge.

Similar measurements are implemented with the plurality of linear solenoids 107a through 107n and a plurality of measurement data items are averaged, so that the standard characteristic graph represented in FIG. 6(A) is obtained. From this standard characteristic graph, values (A0, P0, θ0) that specify the approximate straight line 600c in FIG. 6(A) and the difference value ΔP between the approximate straight line 600c and the pair of straight lines 600a and 600b that configure a broken line are obtained. Here, A0 denotes a predetermine supply current having a value of, for example, 50% of the rated current of the electromagnetic coil 71n; P0 denotes an average adjusted hydraulic pressure corresponding to the supply current A0; θ0 denotes the gradient of the average approximate straight line 600c. Instead of the difference value ΔP, respective equation data items, related to the approximate straight line, of the pair of straight lines 600a and 600b may be created.

Next, the oil temperature is adjusted to a low temperature and then to a high temperature, for example, to −25° C. and then to +75° C., and at the low temperature and the high temperature, the respective pressure vs. current characteristics of a standard sample having a characteristic near to the standard characteristic are measured, so that the low temperature characteristic graph and the high temperature characteristic graph are obtained. Based on the low temperature characteristic graph and the high temperature characteristic graph, data on the approximate straight line and the difference value is created as is the case with the standard characteristic graph; then, there is created a data table related to the changing rates that indicate how (A0, P0, θ0) and ΔP change in accordance with the oil temperature. The characteristic data created in such a way as described above is transferred to the design department of the supply current control apparatus and then is preliminarily stored in the program memory 123 or the data memory 124.

In the step 700b, respective outgoing adjustment works for linear solenoids are started; then, in the step 701, a linear solenoid to be adjusted is set in the inspection equipment that corresponds to a transmission. At this time, the oil temperature of the inspection equipment is set to a reference temperature. In the step 702, the pressure vs. current characteristic expressed by the pair of straight lines 601a and 601b represented in FIG. 6(B) is measured, so that data (A0, P, θ) that specifies the approximate straight line 601c is created.

In the step 703, by algebraically adding the difference value □P in FIG. 6(A) to the approximate straight line 602c in FIG. 6(C), which is the same as the approximate straight line 601c in FIG. 6(B), the pair of straight lines 602a and 602b are created; then, the approximate straight line 603c is calculates with which the relative error between the pair of straight lines 601a and 601b in FIG. 6(B) and the pair of straight lines 602a and 602b in FIG. 6(C) becomes minimal.

In the step 704, from the data (A0, P1, θ1) that specifies the approximate straight line 603c in FIG. 6(D), the second adjustment coefficient P1/P0 and the second gradient coefficient θ1/θ0 are calculated. In the step 705, based on the list in FIG. 6(E), the pairs of shorting/opening terminals of the label resistor 72n are soldered, and in the step 706, the window opening 52 in the sealing resin 50 is filled with a seal material; then, in the step 710, the adjustment work is completed.

Figure 8:
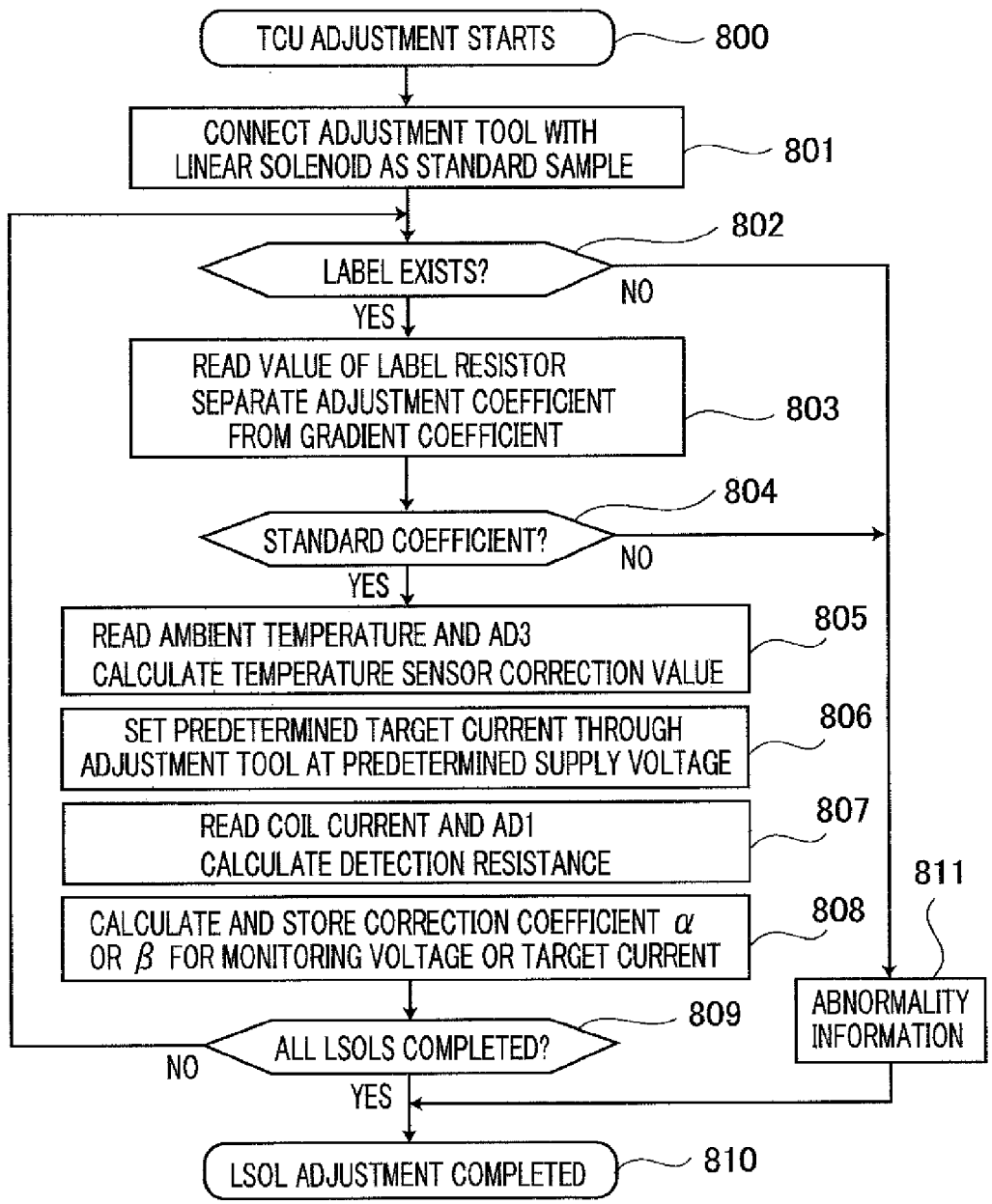
FIG. 8 is a flowchart representing adjustment operation of a supply current control apparatus in a transmission control apparatus according to Embodiment 1 of the present invention.

Next, the adjustment operation of the supply current control apparatus 120U illustrated in FIG. 1 will be explained. FIG. 8 is a flowchart representing the adjustment operation of a supply current control apparatus in a transmission control apparatus according to Embodiment 1 of the present invention. In FIG. 8, in the step 800, the outgoing adjustment work for the supply current control apparatus 120U is started. In the step 801, the adjustment tool 190 with which as illustrated in FIG. 3, the thermometer and the ampere meter are connected is connected with the supply current control apparatus 120U; concurrently, a linear solenoid, which is a standard sample, is connected with the driving circuit 170n in the supply current control apparatus 120U.

In the step 802, the value of the label resistor provided in the linear solenoid, which is a standard sample, connected with the driving circuit 170n, and it is determined whether or not a predetermined resistance value can be read; in the case where the predetermined resistance value can be read, the result of the determination becomes "YES", and then, the step 802 is followed by the step 803; in the case where the predetermined resistance value cannot be read, the result of the determination becomes "NO", and then, the step 802 is followed by the step 811. The resistance value R72n of the label resistor 72n is calculated by dividing the digital conversion value of the voltage Vad2, across the label resistor 72n, that is inputted to the analogue input port AD2n in FIG. 3 by the value of a current flowing in the label resistor 72n. The value of the current flowing in the label resistor 72n is obtained by dividing the voltage obtained by subtracting the voltage Vad2 across the label resistor 72n from the value of the control voltage Vcc by the resistance value R19n of the power-supply resistor 19n.

In the step 803, the second adjustment coefficient and the second gradient coefficient are separated from the read resistance value of the label resistor; in the step 804, it is determined whether or not both the second adjustment coefficient and the second gradient coefficient, which have been extracted in the step 803, are the standard coefficient of "1.0"; in the case where both the second adjustment coefficient and the second gradient coefficient are the standard coefficient, the result of the determination becomes "YES", and then, the step 804 is followed by the step 805; in the case where both the second adjustment coefficient and the second gradient coefficient are not the standard coefficient, the result of the determination becomes "NO", and then, the step 804 is followed by the step 811, where it is checked whether or not the reading function for the label resistor 72n is normal.

In the step 805, based on the ambient temperature information inputted from the adjustment tool 190 and the voltage across the temperature sensor 17n inputted to the analogue input port AD3n, the correction coefficient for the temperature sensor 17n is calculated. The resistance value R17n of the temperature sensor 17n is calculated by dividing the digital conversion value of the voltage Vad3, across the temperature sensor 17n, that is inputted to the analogue input port AD3n by the value of a current flowing in the temperature sensor 17n. The value of the current flowing in the temperature sensor 17n is obtained by dividing the voltage obtained by subtracting the voltage Vad3 across the temperature sensor 17n from the value of the control voltage Vcc by the resistance value R18n of the series resistor 18n.

In the case where the ambient temperature Ta inputted from the adjustment tool 190 coincides with the reference temperature (for example, 25° C.), the correction coefficient is the proportion of the reference resistance R170 of the temperature sensor 17n at the reference temperature to the calculated resistance value R17n. In the case where the ambient temperature Ta inputted from the adjustment tool 190 does not coincide with the reference temperature (for example, 25° C.), the correction coefficient can be calculated by use of the conversion resistance value obtained by converting, based on a predetermined temperature coefficient, the calculated resistance value R17n into the reference temperature or by use of the conversion resistor obtained by converting, based on a predetermined temperature coefficient, the reference resistor R170 of the temperature sensor 17n into the ambient temperature Ta.

In the step 805, it is confirmed that the value of the reference resistance R170 of the temperature sensor 17n and the resistance values of the standard sample at a low temperature of, for example, "−25° C." and at a high temperature of, for example, "+75 C" are stored in the program memory 123.

Next, in the step 806, under the condition that the predetermined supply voltage Vbb is, for example, DC 14 [V], a predetermined target current Is, which is, for example, the rated current of the electromagnetic coil 71n, is set in the adjustment tool 190 and is applied to the electromagnetic coil 71n. When the energization is started, the ambient temperature of the current detection resistor 15n is the same as the ambient temperature inputted from the adjustment tool 190, because the self-heating by the current detection resistor 15n has not yet raised the temperature of the current detection resistor 15n.

In the step 807, from the value of a monitoring voltage Vfn, which is the digital conversion value of a voltage proportional to the voltage V15n, across the current detection resistor 15n, that is inputted to the analogue input port AD1n, the value of the actual supply current Ifn, to the electromagnetic coil 71n, that is inputted from the adjustment tool 190, and the amplification factor G of the differential amplifier 16n, the resistance value [R15n=V15n/Ifn=(Vfn/G)/Ifn] of the current detection resistor 15n is calculated. In the case where the actual measurement current Ifn is smaller than the target current Isn, it suggests that the resistance value R15n or the amplification factor G is too large; in the case where the actual measurement current Ifn is larger than the target current Isn, it suggests that the resistance value R15n or the amplification factor G is too small.

The step 808 is a correction control constant storage means in which a correction coefficient [α=Ifn/Isn] related to the monitoring voltage Vfn or a correction coefficient [β=Isn/Ifn] for the target current Isn is calculated and is stored in the program memory 123 or the data memory 124.

In the step 809, it is determined whether or not in the step 808, the calculation and storage of the correction control constant α or β has been completed for each of all the driving circuits 170a through 170n in the supply current control apparatus 120U; in the case where, in the step 808, the calculation and storage of the correction control constant α or β has not been completed for each of all the driving circuits 170a through 170n, the result of the determination becomes "NO" and the linear solenoid, which is the standard sample, is connected with the driving circuit that is subject to the adjustment next time, and then, the step 802 is resumed; in the case where the calculation and storage of the correction control constant α or β has been completed for each of all the driving circuits 170a through 170n, the result of the determination becomes "YES", and then the step 809 is followed by the step 810 where the adjustment is completed.

In the step 811, abnormality information is inputted to the adjustment tool 190 in the case where in the step 802 or 804, the result of the determination becomes "NO"; then, the step 811 is followed by the step 810 where the adjustment is completed.

Figure 9A:
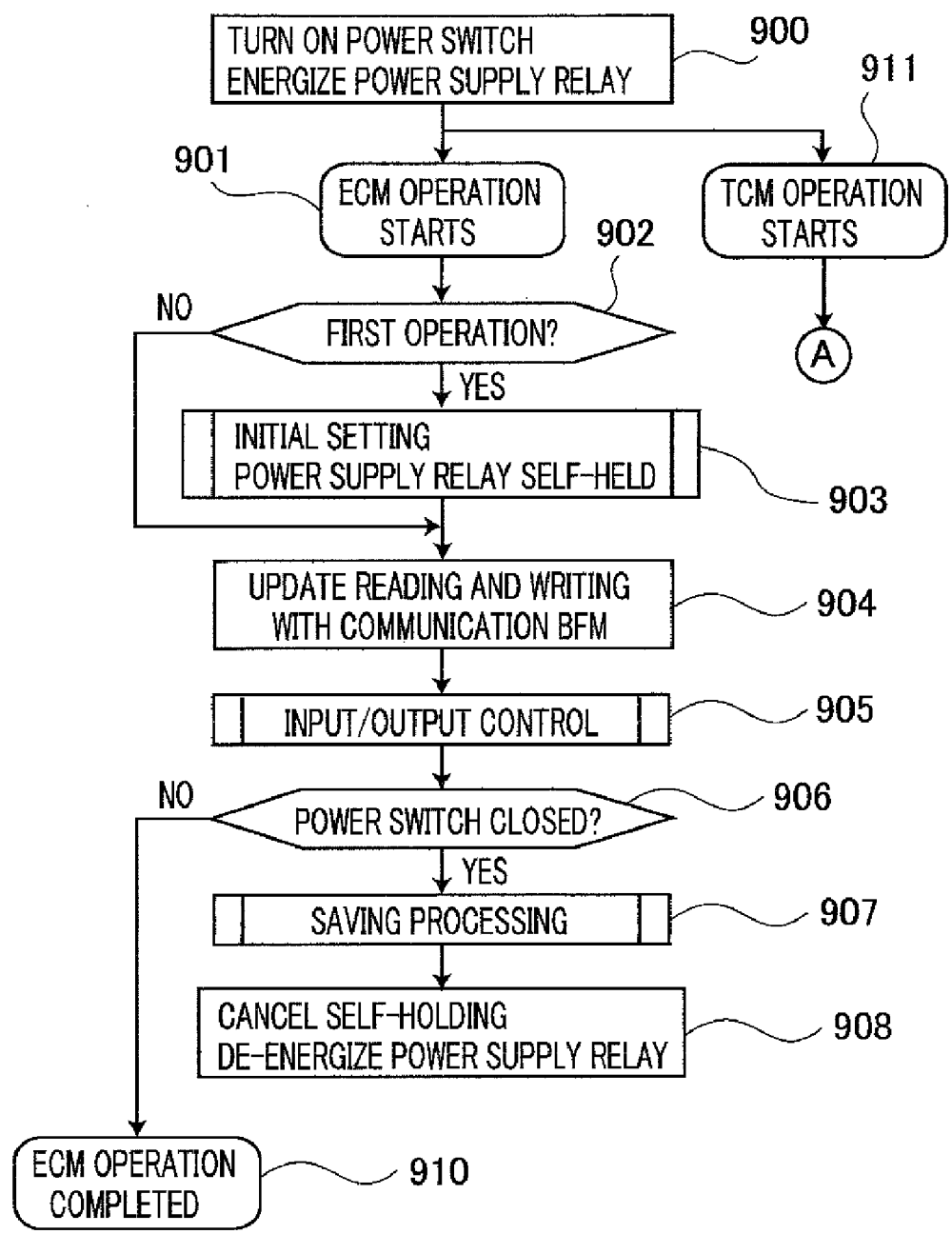
FIGS. 9A and 9B are a set of flowcharts representing the driving operation of a transmission control apparatus according to Embodiment 1 of the present invention.
Figure 9B:
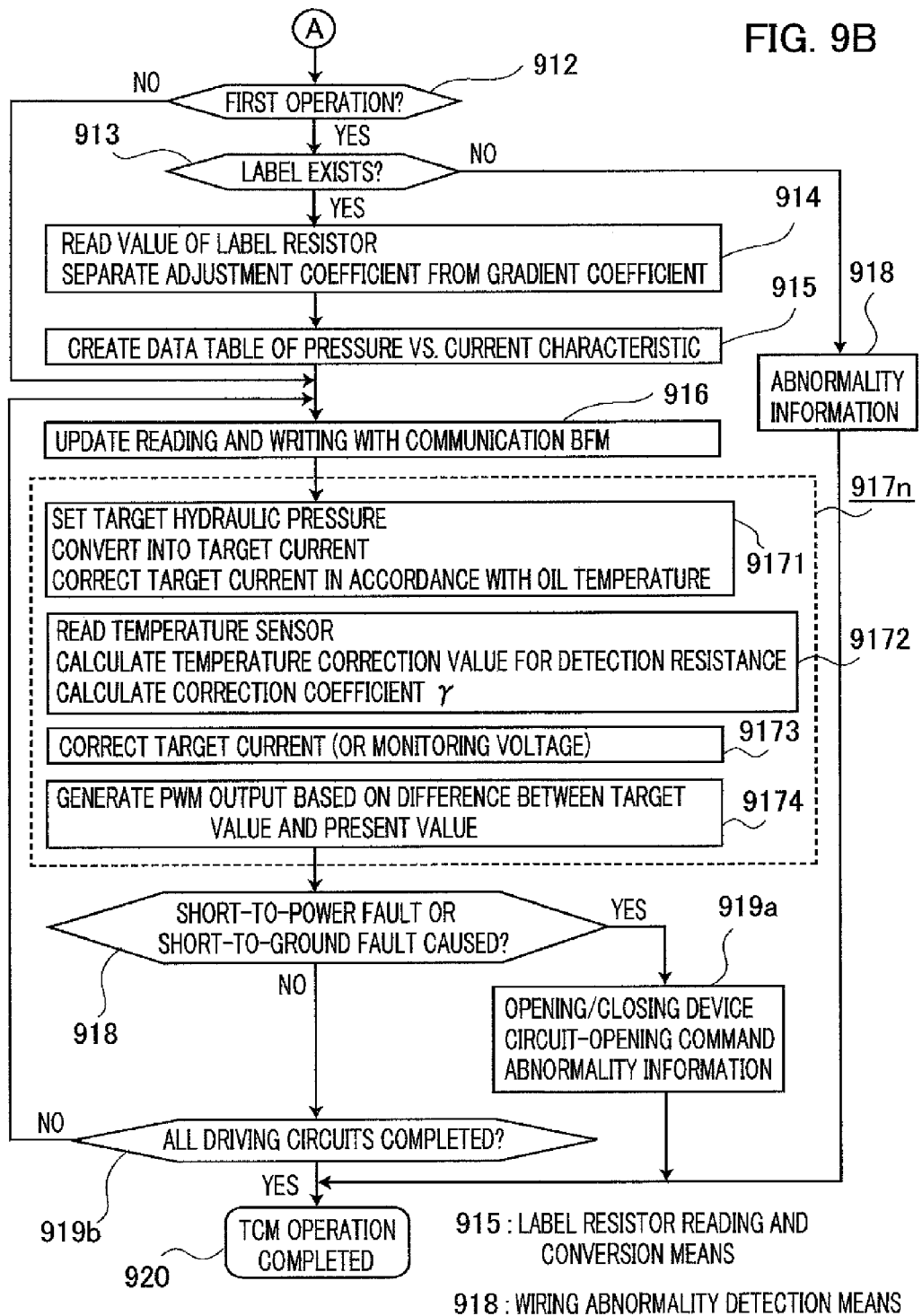

Next, there will be explained the driving operation of the transmission control apparatus according to Embodiment 1 of the present invention. FIGS. 9A and 9B are a set of flowcharts representing the driving operation of the transmission control apparatus according to Embodiment 1 of the present invention. In FIG. 9A, in the step 900, the unillustrated power switch is closed; the power supply relay in FIG. 1 is energized so as to close the output contact 103; then, electric power is supplied to the engine control apparatus 110U and the supply current control apparatus 120U. In the step 901, the constant voltage power source 110a in the engine control apparatus 110U generates a predetermined control voltage Vcc, so that the microprocessor 111 starts its operation.

In the step 911, the constant voltage power source 120a in the supply current control apparatus 120U generates a predetermined control voltage Vcc, so that the microprocessor 121 starts its operation. In the step 901 following the step 901, it is determined, from the operation state of an unillustrated flag memory, whether or not the present flow is a control flow that is implemented for the first time after the power switch is closed; in the case where the present flow is a control flow that is implemented for the first time, the result of the determination becomes "YES", and then the step 902 is followed by the step block 903; in the case where the present flow is not a control flow that is implemented for the first time, the result of the determination becomes "NO", and then, the step 902 is followed by the step 904. In the step block 903, initialization processing is applied to the RAM memory 112, and the self-holding command signal for the power supply relay is generated; then, the step block 903 is followed by the step 904.

In the step 904, reading and updating writing are performed in a buffer memory provided in the serial-parallel converter 116 that mutually communicate with the microprocessor 121 in the supply current control apparatus 120U. The step 904 is timely implemented in the step block 905, described later. In the step block 905, the first group of electric loads 105 is driven and controlled in response to the operation states of the first group of sensors 104, the operation state of the input signal received from the microprocessor 121 in the step 904, and the contents of an input/output control program stored in the program memory 113.

In the step block 905, the throttle opening degree, the fuel injection amount, or the ignition timing, in the case of a gasoline engine, is controlled in such a way that the output torque of the engine is generated in accordance with the accelerator-pedal depressing degree and the engine rotation speed; when the transmission gear ratios of the transmission are being changed, control synchronized with the supply current control apparatus 120U is implemented in such a way that the engine rotation speed smoothly rises or falls.

The step 906 is periodically implemented in the step block 905; in the step 906, it is determined whether or not the unillustrated power switch has been closed; in the case where the unillustrated power switch is still closed, the result of the determination becomes "NO", and then the step 906 is followed by the step 910 where the operation is completed; in the case where the unillustrated power switch has been opened, the result of the determination becomes "YES", and then the step 906 is followed by the step 907.

In the step block 907, the fact that the power switch has been opened is informed to the supply current control apparatus 120U, and important data items, such as learning information and abnormality occurrence information, that have been written in the RAM memory 112 when the step block 905 was implemented, are transmitted to and stored in the data memory 114; when a power-off permission signal is received from the supply current control apparatus 120U, the step 907 is followed by the step 908.

In the step 908, when the self-holding command signal generated in the step block 903 is cancelled, the power supply relay is de-energized, whereby the output contact 103 is opened and hence the power supply to the engine control apparatus 110U and the supply current control apparatus 120U is stopped. In this regard, however, in the engine control apparatus 110U, the constant voltage power source 110b, which is supplied with electric power directly from the vehicle battery 102, continues the power supply to part of the regions of the RAM memory 112. In the step 910 where the operation is completed, the other control programs are implemented; then, within a predetermined time, the step 901 is resumed. The steps 901 through 910 are recurrently implemented.

In the step 912 following the step 911, it is determined, from the operation state of an unillustrated flag memory, whether or not the present flow is a control flow that is implemented for the first time after the power switch is closed; in the case where the present flow is a control flow that is implemented for the first time, the result of the determination becomes "YES", and then the step 912 is followed by the step block 913; in the case where the present flow is not a control flow that is implemented for the first time, the result of the determination becomes "NO", and then, the step 912 is followed by the step 916. In the step 913, as is the case with the step 802 in FIG. 8, the value of the label resistor 72n provided in the linear solenoid 107n, which is actually connected with the driving circuit 170n, is read, and it is determined whether or not a predetermined resistance value can be read; in the case where a predetermined resistance value can be read, the result of the determination becomes "YES", and then, the step 913 is followed by the step 914; in the case where the predetermined resistance value cannot be read, the result of the determination becomes "NO", and then, the step 913 is followed by the step 918.

The resistance value R72n of the label resistor 72n is calculated by dividing the digital conversion value of the voltage Vad2, across the label resistor 72n, that is inputted to the analogue input port AD2n in FIG. 3 by the value of a current flowing in the label resistor 72n. The value of the current flowing in the label resistor 72$n$ is obtained by dividing the voltage obtained by subtracting the voltage Vad2 across the label resistor 72$n$ from the value of the control voltage Vcc by the resistance value R19$n$ of the power-supply resistor 19$n$.

In the step 914, the second adjustment coefficient and the second gradient coefficient are separated from the read resistance value of the label resistor; in the step 915, based on the second adjustment coefficient and the second gradient coefficient extracted in the step 914, there is created a data table for the pressure vs. current characteristic represented by the pair of straight lines 603$a$ and 603$b$ in FIG. 6(D); then, the step 915 is followed by the step 916.

In the step 916, reading and updating writing are performed in a buffer memory provided in the serial-parallel converter 126 that mutually communicate with the microprocessor 111 in the engine control apparatus 110U; the step 916 is timely implemented in the step block 917$n$, described later.

In the step block 917$n$ is a feedback control block consisting of the step 9171 through 9174. The step 9171 is a step that functions as a setting means for a first correction target current Isn in which in response to the operation states of the gearshift sensor, the vehicle speed sensor, and the accelerator position sensor inputted from the second group of sensors, the target hydraulic pressures are selectively set for, for example, one to two of four to six linear solenoids, in which with reference to the data table created in the step 915, the target hydraulic pressure is converted into a target current corresponding to the target hydraulic pressure at the reference oil temperature, and in which based on the temperature characteristic data on the pressure vs. current preliminarily stored in the program memory 123 or the data memory 124 and the oil temperature detected by the temperature sensor 180, the target current is further corrected to a target current corresponding to the present oil temperature.

In the step 9172, the resistance value R17$n$ of the temperature sensor 17$n$ for detecting the temperature of the current detection resistor 15$n$ is calculated, and a correction coefficient $\gamma$, which is the proportion of the resistance value R17$n$ at the present temperature to the resistance value thereof at the reference temperature, is calculated from the resistance value vs. temperature characteristic of the temperature sensor 17$n$ that is preliminarily stored in the program memory 123.

The resistance value R17$n$ of the temperature sensor 17$n$ is calculated by dividing the digital conversion value of the voltage Vad3, across the temperature sensor 17$n$, that is inputted to the analogue input port AD3$n$ in FIG. 3 by the value of a current flowing in the temperature sensor 17$n$. The value of the current flowing in the temperature sensor 17$n$ is obtained by dividing the voltage obtained by subtracting the voltage Vad3 across the temperature sensor 17$n$ from the value of the control voltage Vcc by the resistance value R18$n$ of the series resistor 18$n$.

The step 9173 is a step in which a control error caused in the driving circuit 170$n$ is corrected; in the step 9173, there is set a second correction target current Isnn=$\beta\gamma$Isn, which is obtained by further correcting the first correction target current Isn determined in the step 9171 or there is created a correction monitoring voltage Vfnn=$\alpha$Vfn/$\gamma$, which is obtained by correcting the monitoring voltage Vfn which is the digital conversion value of an analogue input voltage Vad1 proportional to the voltage across the current detection resistor 15$n$. The correction coefficients $\alpha$ and $\beta$ are calculated and stored in the step 808 in FIG. 8.

The step 9174 is a step that functions as a feedback control means in which with the second target current Isnn as the target current and with the monitoring voltage Vfn as the feedback signal, the control signal PWM is generated and duty control of the control on/off device 10$n$ is performed so that the first target current Isn is obtained. In the step 9174, when with the first target current Isn as the target current as the target current and with the correction monitoring voltage Vfn as the feedback signal, the control signal PWM is generated and duty control of the control on/off device 10$n$ is performed, the first target current Isn is obtained.

The step 918 is a step that functions as a wiring abnormality detection means in which it is determined whether or not there exists a short-to-power abnormality of the positive line or a short-to-power abnormality of the negative line, i.e., a phenomenon that the positive or negative power-supply line for the electromagnetic coil 71$n$ makes contact with the power source line, a short-to-ground abnormality of the positive line or a short-to-ground abnormality of the negative line, i.e., a phenomenon that the positive or negative power-supply line makes contact with the ground circuit, or a load short-circuit abnormality, i.e., a phenomenon that the positive and negative power-supply lines make contact with each other; in the case where the abnormality is detected, the result of the determination becomes "YES", and then, the step 918 is followed by the step 919$a$; in the case where the abnormality is not detected, the result of the determination becomes "NO", and then, the step 918 is followed by the step 919$b$.

The short-to-ground abnormality of the positive line is detected by the fact that when the power supply on/off device 120$c$ is closed and the control on/off device 10$n$ is opened, the input voltage of the analogue input port AD2$n$ is too low or by the fact that when the control on/off device 10$n$ is closed, the input voltage of the analogue input port AD1$n$ is too low.

The short-to-power abnormality of the negative line is detected by the fact that when the control on/off device 10$n$ is closed, the input voltage of the analogue input port AD1$n$ is excessively high or by the fact that when both the control on/off device 10$n$ and the power supply on/off device 120$c$ are opened, the input voltage of the analogue input port AD2$n$ is excessively high.

The load short-circuit abnormality is detected by the fact that when both the control on/off device 10$n$ and the power supply on/off device 120$c$ are closed, the input voltage of the analogue input port AD1$n$ is too high. The short-to-power abnormality of the positive line is detected by the fact that when the power supply on/off device 120$c$ is opened and the control on/off device 10$n$ is opened, the input voltage of the analogue input port AD2$n$ is too high or by the fact that when the control on/off device 10$n$ is closed, the input voltage of the analogue input port AD1$n$ is not zero.

The short-to-ground abnormality of the negative line is detected by the fact that when the power supply on/off device 120$c$ is closed and the control on/off device 10$n$ is opened, the input voltage of the analogue input port AD2$n$ is too low or by the fact that when the control on/off device 10$n$ is closed, the input voltage of the analogue input port AD1$n$ is too low.

In the step 919$a$, circuit-closing commands for the power supply on/off device 120$c$ and the control on/off device 10$n$ are cancelled, and an abnormality is informed; then, the step 919$a$ is followed by the step 920 where the operation is completed. In the step 919$b$, it is determined whether or not detection of wiring abnormality in each of all the linear solenoids 107$a$ through 107$n$ and hydraulic pressure setting for part of the linear solenoids have been completed; in the case where detection of wiring abnormality in each of all the linear solenoids 107$a$ through 107$n$ and hydraulic pressure setting for part of the linear solenoids have not been completed, the result of the determination becomes "NO", and then the step 916 is resumed; in the case where detection of wiring abnormality in each of all the linear solenoids 107$a$ through 107$n$ and hydraulic pressure setting for part of the linear solenoids have been completed, the result of the determination becomes "YES", and then the step 919*b* is followed by the step 920. In the step 920 where the operation is completed, the other control programs are implemented; then, within a predetermined time, the step 911 where the operation is started is resumed and then the steps following the step 911 are recurrently implemented.

(3) Variant Example of Embodiment 1

In the above explanation, the microprocessor 121 sets a target current corresponding to the target hydraulic pressure and performs feedback control so that the value of an actual measurement current detected by the current detection resistor 15*n* coincides with the target current; however, it may also be allowed that the microprocessor 121 performs only setting of a target current, supplies a setting voltage proportional to the target current to a feedback control circuit provided in the driving circuit 170*n*, performs PID control by use of the monitoring voltage, which is obtained by amplifying the voltage across the current detection resistor 15*n*, as the feedback signal, and performs duty control of the control on/off device 10*n*. In this case, because it is difficult to correct the monitoring voltage for the purpose of correcting the control error, the microprocessor 121 may generate the setting voltage based on the target current obtained by performing the second correction.

The current detection resistor 15*n* may be provided either at the positive line of the electromagnetic coil 71*n* or at the downstream position of the control on/off device 10*n*. As each of the power supply on/off device 120*c* and the control on/off device 10*n*, a field-effect transistor, instead of a junction-type transistor, may be utilized; furthermore, an intelligent power transistor including a shortcircuit protection function may also be utilized.

As the label resistor 72*n*, a label resistor 76*n* (refer to FIG. 19 in Embodiment 3, described later) that has been adjusted through laser trimming can be utilized. Instead of the power-supply resistor 19*n* that functions as a measurement circuit for the resistance value of the label resistor 72*n* (76*n*), the power supply on/off device 120*c* may supply a measurement current to the label resistor 72*n* (76*n*) by way of a constant current control circuit. In the case where it is not desired to connect the one end terminal of the label resistor 72*n* (76*n*) with the one end terminal of the electromagnetic coil 71*n*, it may allowed that two independent terminals are provided and through the two independent terminals, the label resistor 72*n* (76*n*) and the driving circuit 170*n* are connected with each other.

Meanwhile, the step 915, which is a label resistor reading and conversion means, is implemented each time and immediately after the power is turned on; therefore, the data table of the pressure vs. current characteristic for the utilized label resistor is stored in the RAM memory 122 and does not need to be transmitted to and stored in the nonvolatile data memory 124. However, as the timing of implementing the step 915, in the case where the label resistor reading and conversion means is implemented when the power switch is turned on for the first time after the terminal of the vehicle battery 102 has been detached and attached, the data table needs to be transmitted to and stored in the nonvolatile data memory 124.

The correction control constant storage means described in the step 808 represented in FIG. 8 is to correct an inherent variation in the proportional gain in the feedback control; when first and second additional correction means, described below, are desirably added, the current control accuracy can further be raised. In other words, in the first additional correction means, for the purpose of performing nonlinear correction with regard to the actual measurement current vs. the target current, respective actual measurement currents corresponding to large, middle, and small target currents are measured and interpolation calculation is performed so that the correction coefficient $\alpha$ or $\beta$ can be calculated in accordance with the magnitude of a target current. In the second additional correction means, the value of the first correction target current at the time instant when the actual measurement current If measured by the ampere meter 192 exceeds "0" while the first correction target current Isn is gradually increased is calculated as a bias correction value $\delta$ and the second correction target current is made to include this bias correction value $\delta$ so that more accurate current control is performed. This bias correction value $\delta$ changes depending on the average applied voltage for the electromagnetic coil 71*n*; therefore, it is most ideal that in response to the product of the supply voltage Vbb and the conductive duty of the control on/off device 10*n*, the bias correction value $\delta$ is corrected.

In addition, it can be allowed that the temperature sensor 180 for detecting the oil temperature is mounted in the gearbox 107, and at the stage, represented in FIG. 8, of performing outgoing adjustment of the supply current control apparatus 120U, the resistance value of the temperature sensor 180 at the reference oil temperature is measured and the correction coefficient for the reference resistance value is preliminarily measured.

In addition, the power supply on/off device 120*c* may be the output contact of a power-supply electromagnetic relay provided outside the supply current control apparatus 120U.

(4) Gist and Feature of Embodiment 1

As is clear from the foregoing explanation, the transmission control apparatus 100 according to Embodiment 1 of the present invention is provided with the linear solenoids 107*a* through 107*n*, each of which acts on the hydraulic pressure adjustment valve incorporated in a vehicle transmission and generates an adjusted hydraulic pressure output corresponding to a supply current and with the supply current control apparatus 120U for the linear solenoids; in the linear solenoid, the electromagnetic coil 71*n* and the label resistor 72*n* (or 76*n*) having a resistance value that serves as parameter data for correcting an inherent variation in the performance characteristics of the linear solenoid are integrated with each other. The supply current control apparatus 120U is provided with the driving circuits 170*a* through 170*n* that operate with the supply voltage Vbb, which is the output voltage of the power supply on/off device 120*c* connected between the vehicle battery 102 and all the plurality of linear solenoids 107*a* through 107*n* or between the vehicle battery 102 and each of the linear solenoids 107*a* through 107*n*, and the control voltage Vcc, which is the output voltage of the constant voltage power source 120*a* that is supplied with electric power from the vehicle battery 102; the control module 120M; and the control on/off device 10*n* that are included and connected in series with the respective other terminals of the linear solenoids 107*a* through 107*n*. Each of the driving circuits 170*a* through 170*n* includes the measurement circuit 19*n* for energizing the label resistor 72*n* (or 76*n*) and measuring the resistance value of the label resistor; the control module 120M includes the microprocessor 121 that generates a command signal for controlling the conduction state of the control on/off device 10*n*, the program memory 123 that collaborates with the microprocessor 121, the nonvolatile data memory 124 that is provided in part of the region of the program memory 123 or is provided in such a way as to be separated from the program memory 123, and the multi-channel A/D converter 125 to which, as a reference voltage, the control voltage Vcc is applied.

The program memory 123 is provided with control programs that function as the correction control constant storage means 808 and the label resistor reading and conversion means 915; and the correction control constant storage means 808 collaborates with the adjustment tool 190, which is externally connected, so as to measure the current control constants for the driving circuits 170a through 170n, calculates correction coefficients for obtaining the supply currents that coincide with the target currents even when there exists the inherent variation of a circuit component, and stores the correction coefficients in the program memory 123 or the data memory 124. The label resistor reading and conversion means 915 calculates the resistance value of the label resistor 72n (or 76n) based on the proportion of the measured current that flows from the measurement circuit 19n to the label resistor 72n (or 76n) to the measured voltage applied to the label resistor 72n (or 76n), calculates or selectively determines, based on the calculated resistance value, parameter data for correcting the inherent variations of the linear solenoids 107a through 107n, and stores the parameter data in the data memory 124 or the RAM memory 122. The label resistor reading and conversion means 915 is implemented at an operation start timing when the power switch is turned on; even when the linear solenoids 107a through 107n are replaced for maintenance, the supply current can be controlled in accordance with the resistance value of the label resistor added to the replaced linear solenoid.

The label resistor 72n is formed of a ladder circuit in which a plurality of first resistors 78n are sequentially connected in series with one another, and respective second resistors 79n having a resistance value of twice as large as the resistance value of the first resistor 78n are connected with the start point of the in-series connection circuit, the end point thereof, and the respective connection points between the plurality of first resistors 78n, and in which the respective other terminals of the second resistors 79n are selectively connected with the ground terminal by way of respective pairs of shorting/opening terminals; the pairs of shorting/opening terminals are arranged at the respective window openings 52 in the sealing resin 50 that seals the plurality of first resistors 78n and the plurality of second resistors 79n in an air-tight manner.

As described above, the respective pairs of shorting/opening terminals of the label resistor, included in the ladder circuit, can be short-circuited through the window opening in the sealing resin. Accordingly, there is demonstrated a feature that through post-processing after air-tight mounting of the label resistor, adjustment for a label resistor having a high-accuracy resistance value can be performed.

The digital conversion value of the label resistor 72n (or 76n) measured by the control module 120M is utilized in such a way as to be divided into a group of high-order bits and a group of low-order bits; any one of the group of high-order bits and the group of low-order bits of the label resistor 72n (or 76n) is a first parameter for selecting the adjustment coefficient, which is the proportion of the pressure corresponding to a predetermined current of the linear solenoids 107a through 107n to the reference pressure; the other one is a second parameter for selecting the gradient coefficient, which is the proportion of the gradient of the current vs. hydraulic pressure characteristic to the reference gradient.

As described above, a single label resistor provided in the linear solenoid makes it possible to identify the characteristic correction coefficients, i.e., the adjustment coefficient and the gradient coefficient. Therefore, there is demonstrated a feature that in the supply current control apparatus, the target current corresponding to a commanded target hydraulic pressure can accurately be set in accordance with the current vs. pressure characteristic of a utilized linear solenoid.

The supply current control apparatus 120U and the linear solenoids 107a through 107n are mounted and fixed on a common conductive member, which is a ground circuit; the upstream side terminal C of the electromagnetic coil 71n is connected with the positive terminal of the vehicle battery 102 by way of the power supply on/off device 120c, and the downstream side terminal B thereof is connected with the control on/off device 10n; the one terminal of the label resistor 72n (or 76n) is connected with the downstream side terminal B of the electromagnetic coil 71n, and the other terminal is connected with the ground terminal A; the driving circuit 170n includes the power-supply resistor 19n, which functions as the measurement circuit that energizes the label resistor 72n (or 76n) from the constant voltage power source 120a by way of the downstream side terminal B. When the power supply on/off device 120c and the control on/off device 10n are opened, the control voltage Vcc is applied to the label resistor 72n (or 76n) from the constant voltage power source 120a by way of the power-supply resistor 19n; the voltage across the label resistor 72n (or 76n) is inputted to the multi-channel A/D converter 125 by way of the analogue input port AD2n.

The resistance value R72n (or R76n) of the label resistor 72n (or 76n) is calculated by the microprocessor 121, based on the following equation (1), letting R19n denote the resistance value of the power-supply resistor 19n and letting Vad2 denote the input voltage of the analogue input port AD2n.

$$R72n (\text{or } R76n) = Vad2/\{(Vcc-Vad2)/R19n\} = R19n \times (Vad2/Vcc)/\{1-(Vad2/Vcc)\} \quad (1)$$

The minimum resistance value of the label resistor 72n (or 76n) is sufficiently larger than the maximum resistance value of the electromagnetic coil 71n, and is limited to a value with which the linear solenoids 107a through 107n are not caused to erroneously operate by a leakage current that flows from the vehicle battery 102 to the ground circuit by way of the power supply on/off device 120c, the upstream side terminal C of the electromagnetic coil 71n, the electromagnetic coil 71n, and the label resistor 72a (or 76n) when the control on/off device 10n is opened; the resistance value R19n of the power-supply resistor 19n is set to a known fixed constant that is preliminarily stored in the program memory 123 or the data memory 124. As described above, the one terminal of the label resistor is connected with the ground circuit, and the resistance value of the label resistor is calculated by the microprocessor, based on the resistance value of the power-supply resistor and the input voltage of the analogue input port. Accordingly, there is demonstrated a feature that the label resistor can be read without increasing the number of direct wiring leads between the supply current control apparatus and the linear solenoid. Moreover, because there exists no nonlinear resistance element such as a diode or a transistor in the label resistor measurement circuit, the resistance value can accurately be measured.

The temperature sensor 17n is disposed in the vicinity of the current detection resistor 15n; the temperature sensor 17n is connected with the constant voltage power source 120a by way of the series resistor 18n, and the voltage across the temperature sensor 17n or the series resistor 18n is inputted to the multi-channel A/D converter 125 by way of the analogue input port AD3n; the adjustment tool 190 collaborates with the microprocessor 121 so as to calculate a conversion resistance value obtained by converting the resistance value of the temperature sensor 17n at a measurement ambient temperature into a resistance value at the reference temperature or a correction coefficient obtained by dividing the conversion resistance value by the reference resistance value and stores it in the program memory 123 or the data memory 124; a temperature coefficient for calculating the value of resistance change, caused by a temperature rise, from the resistance value of the current detection resistor 15n at the reference temperature, a temperature coefficient for calculating the value of resistance change, caused by a temperature rise, from the resistance value of the temperature sensor 17n at the reference temperature, and the resistance value R18n of the series resistor 18n are preliminarily written in the program memory 113 or the data memory 124; while the supply current control apparatus 120U is operated, the digital conversion value of the detected current value inputted to the analogue input port AD1n or the setting value corresponding to the target current is corrected, based on the ambient temperature of the current detection resistor 15n; correction control is performed in such a way that even when a temperature change causes a change in the resistance value of the current detection resistor 15n, a target supply current can be obtained.

As described above, the resistor temperature is measured by use of a temperature sensor provided in the vicinity of the current detection resistor so that even when the resistance value of the current detection resistor changes due to the change in the ambient temperature and self-heating, accurate current detection is performed; the correction coefficient for the inherent variation of the temperature-detecting characteristic of the temperature sensor is stored in the data memory when adjustment operation is performed. Accordingly, there is demonstrated a feature that even when the supply current for the linear solenoid or a change in the ambient temperature causes the temperature of the current detection resistor to change, accurate current control can be performed.

A first voltage signal proportional to the voltage across the current detection resistor 15n connected in series with the electromagnetic coil 71n or a second voltage signal proportional to the voltage at the one terminal of the electromagnetic coil 71n is inputted to the analogue input port AD1n or AD2n of the control module 120M; the program memory 123 includes a control program that functions as the wiring abnormality detection means 918; based on the voltage signals inputted to the plurality of analogue input ports AD1n or AD2n, the microprocessor 121 detects a mutual-shorting abnormality in which the positive and negative wiring leads connected to the linear solenoids 107a through 107n make contact with each other, a short-to-power abnormality in which any one of the wiring leads makes contact with the power line, or a short-to-ground abnormality in which any one of the wiring leads makes contact with the vehicle body; when the abnormality is detected, the microprocessor 121 issues a circuit-opening command to the power supply on/off device 120c and the control on/off device 10n.

As described above, by monitoring the voltage proportional to a current that flows in the electromagnetic coil or the voltage proportional to a voltage applied to the one terminal or the other terminal of the electromagnetic coil, a mutual-shorting abnormality, a short-to-power abnormality, or a short-to-ground abnormality in the positive and negative wiring leads connected with the linear solenoid is detected, and then the power supply on/off device and the control on/off device are opened. Accordingly, there is demonstrated a feature that by directly utilizing the power supply on/off device required to measure the resistance value of the label resistor, the control on/off device, and the measured voltage signal, the abnormality can be prevented from developing into a burnout accident.

The supply current control apparatus 120U and the engine control apparatus 110U, which are provided separately from each other, collaborate with each other, and perform communication of input/output signals with each other, and the supply current control apparatus 120U is provided on the external wall of the transmission case or on the internal wall of the case; the plurality of linear solenoids 107a through 107n provided inside the transmission case are connected with the supply current control apparatus 120U by way of a connector; the supply current control apparatus 120U is provided with a single control module 120M that selectively determines the linear solenoids 107a through 107n to be energized, sets a target hydraulic pressure for the selected linear solenoid, and generates a command signal for obtaining the set target hydraulic pressure, and driving circuits 170a through 170n that supply driving currents to the respective linear solenoids 107a through 107n.

As described above, the supply current control apparatus, which collaborates with the engine control apparatus, collectively controls a plurality of linear solenoids connected therewith through a connector. Accordingly, the engine control apparatus, the supply current control apparatus, and a plurality of linear solenoids can be assembled in such a way that they are freely combined with one another, and can separately be replaced for maintenance; the supply current control apparatus that collectively controls the plurality of linear solenoids can be configured at a low cost; thus, there is demonstrated a feature that the control load of the engine control apparatus can be reduced.

The linear solenoids 107a through 107n drive the relief valve 43b in an opening/closing manner, by use of the plunger 43a on which electromagnetic force produced by the electromagnetic coil 71n and repulsive force caused by the spring 44 are exerted; at a predetermined oil temperature, there is obtained a predetermined hydraulic pressure corresponding to the supply current for the electromagnetic coil 71n; at a predetermined oil temperature, the label resistor 72n (or 76n) has a resistance value corresponding to a correction coefficient for correcting the difference between the actual characteristic of the supply current for the electromagnetic coil 71n vs. the pressure of the activation oil 49b decompressed by the relief valve 43b and the standard characteristic and setting a supply current corresponding to a target hydraulic pressure; the temperature sensor 180 for estimating the temperature of oil in the transmission is connected with one of the supply current control apparatus 120U and the engine control apparatus 210U; the standard data related to the characteristic of the pressure vs. oil temperature inside the transmission of the activation oil 49b is preliminarily stored in the program memory 123 or the data memory 124; the microprocessor 121 corrects the value of the supply current for obtaining a target hydraulic pressure, in accordance with the oil temperature estimated by the temperature sensor 180.

As described above, the difference driving force between the repulsive spring force and the electromagnetic driving force competes with the pressure of the activation oil, and the supply current is corrected in response to a change in the oil temperature, so that control is performed in such a way that a constant hydraulic pressure can be obtained. Accordingly, there is demonstrated a feature that although even with the constant hydraulic pressure, the valve opening amount changes depending on the hydrodynamic properties of the activation oil, a hydraulic pressure that is near to the target hydraulic pressure can be obtained by correcting the supply current in accordance with a measured temperature, based on a preliminarily measured standard oil temperature vs. hydraulic pressure characteristic. In particular, the inherent variation in the supply current vs. hydraulic pressure characteristic at the reference temperature is corrected through a label resistor; the inherent variation in the target current vs. current control of the supply current characteristic is preliminarily corrected through an adjustment tool; the target current corresponding to the target hydraulic pressure during the driving is corrected based on the standard data of the hydraulic pressure vs. oil temperature characteristic; thus, by separately performing correction in accordance with the individual changing factor, adjustment for the combination of the supply current control apparatus and the linear solenoid can be eliminated.

Embodiment 2

(1) Detailed Description of Configuration

Figure 10:
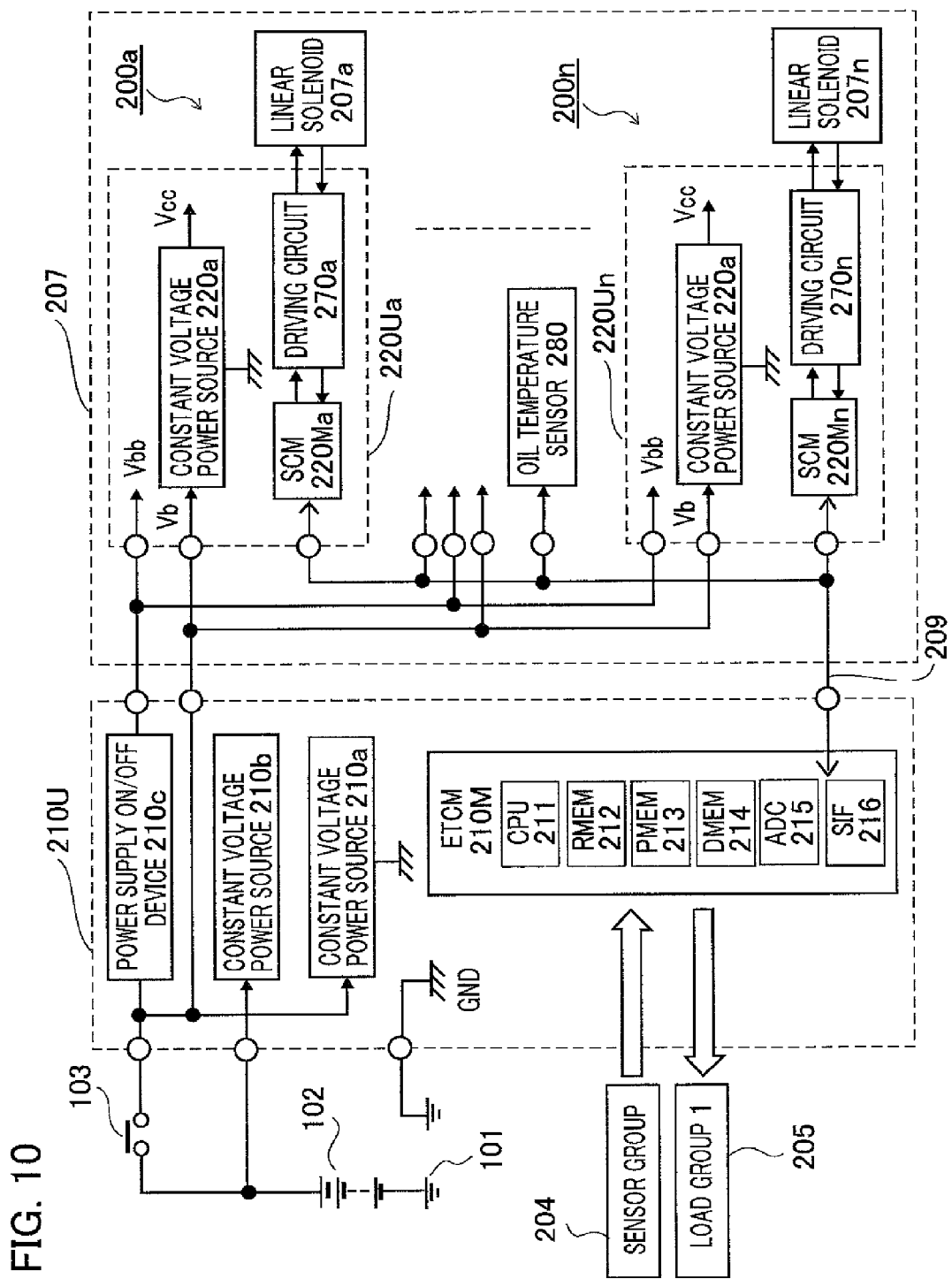
FIG. 10 is a configuration diagram of an overall transmission control apparatus according to Embodiment 2 of the present invention.

Next, a transmission control apparatus according to Embodiment 2 of the present invention will be explained. FIG. 10 is a configuration diagram of an overall transmission control apparatus according to Embodiment 2 of the present invention. In the explanation below, there will be mainly described the points different from FIG. 1 in Embodiment 1. In each of the drawings, the same reference characters denote the same or similar portions; the reference characters in the 100 s are replaced by the reference characters in the 200 s that denote similar portions.

In FIG. 10, an engine control apparatus 210U provided in an engine room and a plurality of supply current control apparatuses 220Ua through 220Un fixed inside of a gearbox 207 of a vehicle transmission are configured in such a way as to collaborate with each other so as to control supply currents for linear solenoids 207a through 207n incorporated in the gearbox 207. In Embodiment 2, four to six supply current control apparatus 220Ua through 220Un are combined on a one-to-one basis with respective four to six linear solenoids 207a through 207n; the respective combinations of the supply current control apparatus and the linear solenoid form distributed-control-type transmission control apparatuses 200a through 200n. The positive terminal of a vehicle battery 102 whose negative terminal is connected with a vehicle body ground terminal 101 supplies a battery voltage Vb to the engine control apparatus 210U and the supply current control apparatuses 220Ua through 220Un, by way of an output contact 103 of an unillustrated power supply relay.

A first group of sensors 204 whose outputs are inputted to the engine control apparatus 210U is a combination of the first group of sensors 104 and the second group of sensors 106 in FIG. 1 and includes a shift lever switch for indicating a shift lever position, a vehicle speed sensor, and the like in addition to analogue sensors, on/off switch sensors, manual command switches, or the like, such as accelerator position sensor that detects the accelerator-pedal depressing degree, a throttle position sensor that detects the intake valve opening degree of an engine, an air flow sensor that measures intake amount, an exhaust-gas sensor, an engine rotation sensor, a crank angle sensor, a power switch, and an engine starting command switch.

A group of electric loads 205 that respond to the output signals generated by the engine control apparatus 210U include, for example, a fuel-injection electromagnetic valve, an ignition coil (in the case of an gasoline engine), an intake valve opening degree control motor, a starter motor, and the like. In this regard, however, the engine control apparatus 210U includes part of the functions of the supply current control apparatus 120U in FIG. 1 in addition to the foregoing engine control functions and transmits respective hydraulic pressure command signals to the supply current control apparatuses 220Ua through 220Un by way of a communication line 209, in response to the selection position of the gearshift lever, the accelerator-pedal depressing degree, and the vehicle speed.

The output of an oil temperature sensor 280 provided inside the gearbox 207 is temporarily inputted to the engine control apparatus 210U by way of the communication line 209 and then is transmitted, as an oil temperature detection signal, to the supply current control apparatus 220Ua through 220Un.

Inside the engine control apparatus 210U, there are provided a constant voltage power source 210a that is energized from the vehicle battery 102 by way of the output contact 103 of the power supply relay, a constant voltage power source 210b that is energized directly from the vehicle battery 102, a power supply on/off device 120c that supplies a supply voltage Vbb to the supply current control apparatuses 220Ua through 220Un, and a control module 210M. In the control module 210M, a microprocessor 211, which is a computing processing unit, a computing-processing RAM memory 212, a nonvolatile program memory 213, which is, for example, a flash memory, a nonvolatile data memory 214, a multi-channel A/D converter 215, and a serial-parallel converter 216 are connected with one another through a bus line.

In collaboration with the program memory 213, the microprocessor 211 controls the throttle valve opening degree in accordance with the accelerator-pedal depressing degree and supplies a fuel proportional to the intake amount; in the case of a gasoline engine, the ignition coil is on/off-controlled in accordance with the engine rotation speed and the fuel injection amount. In response to the selection position of the gearshift lever, the accelerator-pedal depressing degree, and the vehicle speed, the microprocessor 211 transmits respective hydraulic pressure command signals and oil temperature information obtained through the temperature sensor 280 to the linear solenoids 207a through 207n through the communication line 209; when the transmission gear ratios of the transmission are changed, the microprocessor 211 adjusts the fuel injection amount in such a way that the engine rotation speed gradually changes.

Inside each of the supply current control apparatuses 220Ua through 220Un, there is provided a constant voltage power source 220a that is energized from the vehicle battery 102 by way of the output contact 103 of the power supply relay and generates a stabilized control voltage Vcc of, for example, DC 5 [V]; the constant voltage power sources 220a supply electric power to respective control modules 220Ma through 220Mn and respective driving circuits 270a through 270n, described later.

Figure 11:
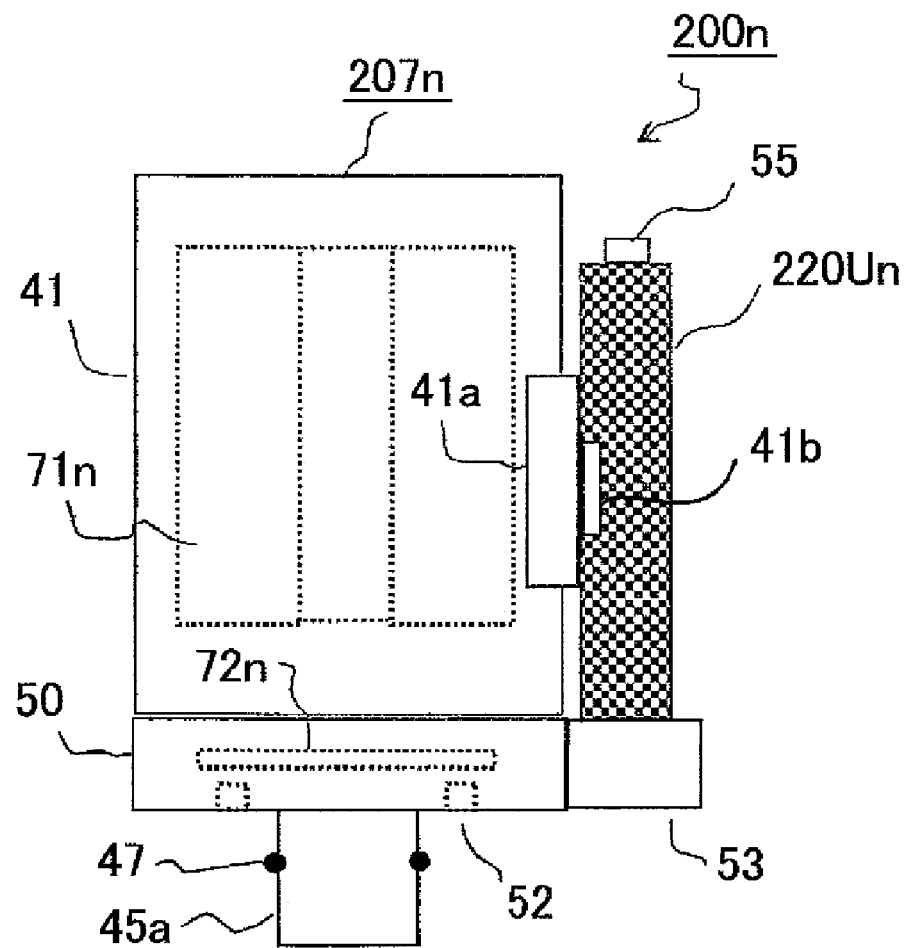
FIG. 11 is an external view of a linear solenoid in a transmission control apparatus according to Embodiment 2 of the present invention.

Next, the linear solenoid 207n will be explained. FIG. 11 is an external view of a linear solenoid in a transmission control apparatus according to Embodiment 2 of the present invention. In FIG. 11, in a yoke 41 configured in the same manner as the yoke 41, which has been described in detail with reference to FIG. 4, there is provided a mounting foot 41a; the mounting foot 41a and amounting foot 41b provided on the supply current control apparatus 220Un are fixed to each other with screws. At the opening end of the yoke 41, there is provided a label resistor 72n that is integrated by a sealing resin 50; the electromagnetic coil 71n and the label resistor 72n are connected with the supply current control apparatus 220U by the intermediary of a coupling connector 53. By the intermediary of a wiring connector 55, the supply current control apparatus 220Un and the engine control apparatus 210U are connected with each other through the communication line 209. The other configurations are the same as those in FIG. 4 in Embodiment 1.

Figure 12:
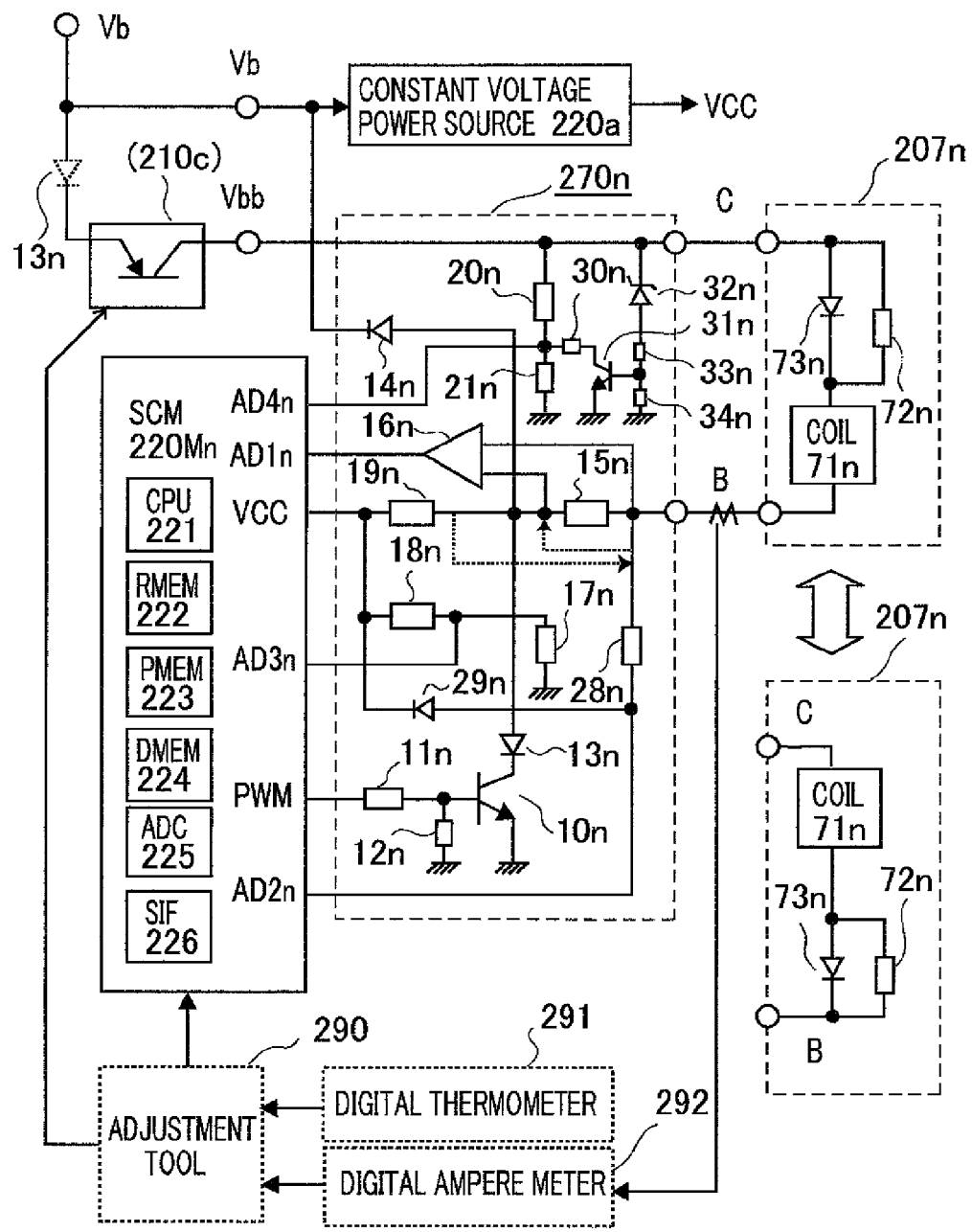
FIG. 12 is a circuit diagram of a driving circuit unit in a transmission control apparatus according to Embodiment 2 of the present invention.

Next, the driving circuit unit will be explained. FIG. 12 is a circuit diagram of the driving circuit unit in a transmission control apparatus according to Embodiment 2 of the present invention. In FIG. 12, in the control module 220M, a microprocessor 221, a computing-processing RAM memory 222, a nonvolatile program memory 223, which is, for example, a flash memory, a nonvolatile data memory 224, a multi-channel A/D converter 225, and a serial-parallel converter 226 are connected with one another through a bus line. The serial-parallel converter 226 and the serial-parallel converter 216 in the engine control apparatus 210U are connected in series with each other through the communication line 209.

In response to a power supply start command issued by the microprocessor 211 in the engine control apparatus 210U, the power supply on/off device 210c that is situated in the engine control apparatus 210U and is supplied with electric power from the vehicle battery 102 by way of the output contact 103 of the power supply relay closes and generates a supply voltage Vbb to be supplied to the driving circuits 270a through 270n in the supply current control apparatuses 220Ua through 220Un.

The linear solenoid 207n is configures with an electromagnetic coil 71n to which a power supply diode 73n is directly connected and a label resistor 72n connected in parallel with the power supply diode 73n; one end of the series circuit is connected with the upstream side terminal C and the other end thereof is connected with the downstream side terminal B.

In the driving circuit 270n that supplies electric power to the linear solenoid 207n, the downstream side terminal B of the linear solenoid 207n is connected with the ground circuit by way of a downstream series circuit consisting of a current detection resistor 15n, a reverse-flow prevention diode 13n, and a control on/off device 10n; when the power supply on/off device 210c connected with the upstream side terminal C is closed, a power supply circuit for the electromagnetic coil 71n is formed of the series circuit consisting of the power supply diode 73n and the electromagnetic coil 71n in the linear solenoid 207n and the foregoing downstream series circuit.

The reverse-flow prevention diode 13n connected with the upstream terminal of the control on/off device 10n may be connected with a point that is at the upstream side of the power supply on/off device 210c, as illustrated by a dotted line in FIG. 12. A commutation diode 14n is connected in parallel with a series circuit consisting of the power supply on/off device 210c, power supply diode 73n, the electromagnetic coil 71n, and the current detection resistor 15n. When the power supply on/off device 210c and the control on/off device 10n are closed, an excitation current is supplied to the electromagnetic coil 71n by way of the power supply on/off device 210c, the power supply diode 73n, the electromagnetic coil 71n, the current detection resistor 15n, the reverse-flow prevention diode 13n, and the control on/off device 10n; the value of the voltage across the current detection resistor 15n is proportional to the value of the excitation current.

In this situation, when the control on/off device 10n is opened, the excitation current that has been flowing in the electromagnetic coil 71n attenuates while flowing back thereto through the commutation diode 14n; the value of the voltage across the current detection resistor 15n is proportional to the value of the excitation current that flows back and attenuates.

Provided that when the vehicle battery 102 is replaced, the positive and negative electrodes are set the other way around, there exists a possible risk that the power supply on/off device 210c or the control on/off device 10n becomes reversely conductive and hence a power-source shortcircuit is caused through the commutation diode 14n; the reverse-flow prevention diode 13n prevents the power-source shortcircuit. The above-mentioned matters also apply to the case where the power supply on/off device 210c is formed of a field-effect transistor, instead of a junction-type transistor.

The microprocessor 221 in the control module 220M generates a control command signal PWM; when the output logic becomes "H", the microprocessor 221 supplies the base current to the control on/off device 10n by way of a driving resistor 11n so as to close the control on/off device 10n; when the output logic becomes "L", the control on/off device 10n is securely opened by means of an open-circuit stabilizing resistor 12n connected between the base terminal and the emitter terminal thereof.

The voltage across the current detection resistor 15n is amplified by a differential amplifier 16n and is inputted to the multi-channel A/D converter 225 through an analogue input port AD1n. A temperature sensor 17n is disposed at a position immediately near to the current detection resistor 15n; the control voltage Vcc is applied to the temperature sensor 17n by way of a series resistor 18n; the voltage across the temperature sensor 17n is inputted to the multi-channel A/D converter 225 through an analogue input port AD3n.

The control voltage Vcc is applied to one terminal of a power-supply resistor 19n included in a measurement circuit for the label resistor 72n, and the other terminal thereof is connected with the upstream or the downstream side terminal B of the linear solenoid 107n by way of the downstream terminal or the upstream terminal of the current detection resistor 15n; when the power supply on/off device 210c and the control on/off device 10n are opened, electric power is supplied to the label resistor 72n by way of the power-supply resistor 19n, the electromagnetic coil 71n, and division resistors 20n and 21n, and the voltage applied to the downstream side terminal B is inputted to the multi-channel A/D converter 225 by way of an input resistor 28n and an analogue input port AD2n.

In the case when the power supply on/off device 210c is closed and the control on/off device 10n is opened, the voltage of the downstream side terminal B is approximately the same as the battery voltage Vb and is returned to the output terminal of the constant voltage power source 220a by way of a clip diode 29n for the purpose of preventing the input voltage of the multi-channel A/D converter 225 from becoming excessively high.

The input resistor 28n has a high resistance that does not provide any effect to a change in the output voltage of the constant voltage power source 220a; because the input resistance of the multi-channel A/D converter 225 is further larger than the resistance of the input resistor 28n, the voltage applied to the downstream side terminal B can be inputted to the multi-channel A/D converter 225 without undergoing any effect of the input resistor 28n.

The voltage across the division resistor 21n, among the division resistors 20n and 21n connected between the upstream side terminal C and the ground circuit, that is situated at the downstream side is inputted to the multi-channel A/D converter 225 by way of the analogue input port AD4n. A parallel resistor 30n is connected in parallel with the division resistor 21n at the downstream side, by way of the parallel transistor 31n. The parallel transistor 31n is energized and biased from the upstream side terminal C, by way of a series circuit consisting of a constant voltage diode 32n and a driving resistor 33n.

However, when the voltage at the upstream side terminal C is lower than the control voltage Vcc, the energization is obstructed by the constant voltage diode 32n; an open-circuit stabilizing resistor 34n connected between the base terminal and the emitter terminal securely makes the parallel transistor 31n turn off. Accordingly, when both the power supply on/off device 210c and the control on/off device 10n are opened, the control voltage Vcc is applied to a series circuit consisting of the power-supply resistor 19n, which functions as a measurement circuit, the current detection resistor 15n, the electromagnetic coil 71n, the label resistor 72n, and the division resistors 20n and 21n; in this case, the parallel transistor 31n turns off.

In contrast, when the power supply on/off device 210c is closed, the parallel transistor 31n is energized and biased by way of the constant voltage diode 32n and the driving resistor 33n; thus, because the parallel resistor 30n is connected in parallel with the downstream division resistor 21n, no excessive input voltage is applied to the analogue input port AD4n.

The microprocessor 221 in the control module 220M generates the target current signal corresponding to a target hydraulic pressure signal transmitted from the engine control apparatus 210U; this target current signal is determined depending on the hydraulic pressure vs. current characteristic of the utilized linear solenoid; the label resistor 72n, described later, notifies the correction parameter for the inherent variation with respect to the reference hydraulic pressure vs. current characteristic.

The characteristic of variation, in the hydraulic pressure vs. current characteristic, corresponding to the change in the oil temperature is stored in the program memory 223; in response to the oil temperature detected by the temperature sensor 280, the reference hydraulic pressure vs. current characteristic is corrected. After a target current is determined, it is assumed that this target current is a setting signal and the output signal of the differential amplifier 16n is a measured signal; then, the control command signal PWM is generated in such a way that the setting signal and the measured signal coincide with each other.

Meanwhile, the reference resistance value of the temperature sensor 17n at the reference temperature 25° C., a data table for the standard temperature coefficients of the temperature sensor 17n, and a data table for the reference resistance values and the standard temperature coefficients of the current detection resistor 15n are stored in the program memory 223.

The standard temperature coefficient referred to here is the standard value of the proportion of the reference resistance R25 at the reference temperature 25° C. to the resistance value Rt at a measurement temperature T, and the actual temperature coefficient varies depending on an individual component; however, because as the adopted temperature sensor 17n and current detection resistor 15n, high-accuracy components whose temperature coefficient varies little are utilized, the standard characteristic is utilized as this temperature coefficient.

However, even in the case where as the adopted temperature sensor 17n and current detection resistor 15n, high-accuracy components whose temperature coefficient varies little are utilized, it is uneconomical to select components whose temperature coefficient and reference resistance R25 vary little; actually, a non-negligible inherent variation remains in the reference resistance R25. One of the functions of the adjustment tool 290 is to correct this variation.

In the step of production and outgoing inspection of the supply current control apparatus 220Un, a digital thermometer 290 that measures the ambient temperature of the temperature sensor 17n and a digital ampere meter 291 that measures the current flowing in the current detection resistor 15n are connected with the adjustment tool 290 that is connected in series with the supply current control apparatus 220Un. The adjustment tool 290 turns on or off the power supply on/off device (210c) that is provided, instead of the power supply on/off device 210c, in outgoing inspection facilities.

At first, the power supply on/off device 210c and the control on/off device 10n are opened; at an normal ambient temperature Ta ($\approx 25°$) at which no heat is generated by the current detection resistor 15n, the input voltage AD3n at the analogue input port AD3n is measured; according to the equation described below, the resistance value R17n of the temperature sensor 17n is calculated; a correction coefficient is calculated based on the proportion R17n/R25n of the resistance value R17n to the reference resistance R25 and is stored in the data memory 124.

However, in the case where the measured normal ambient temperature is considerably far away from the reference temperature 25° C., the resistance value Ra at the ambient temperature Ta is calculated from the data table, and the proportion R17n/Ra is utilized as the correction coefficient; as the ambient temperature Ta, the value measured by the digital thermometer 191 is utilized. Subsequently, the microprocessor 221 sets a predetermined target current, which is, for example, the rated current of the electromagnetic coil 71n, calculates a correction coefficient for the current detection resistor 15n in such a way that when the power supply on/off device 210c is closed and the control on/off device 10n is opening/closing-controlled, the target current and the current measured by the digital ampere meter 192 coincide with each other, and stores the correction coefficient in the program memory 123 or the data memory 124.

As a result, there is corrected a control error caused by an error in the resistance value of the current detection resistor 15n with respect to the designing reference value or by a variation in the input resistance included in the amplification circuit formed of the differential amplifier 16n; therefore, even when the resistance value of the current detection resistor 15n at the reference temperature varies or the resistance value of the current detection resistor 15n varies due to a change in the ambient temperature or self-heating in the current detection resistor 15n, a supply current that approximately coincides with the target current can be obtained.

In addition, strictly speaking, the resistance value of the electromagnetic coil 71n changes depending of the temperature of its own; thus, by taking the changing characteristic, as well, into consideration, there can be implemented control that further reduces the current control error and immediately responds to a rapid change in the target current. The main point is that the adjustment work for supplying an accurate excitation current in accordance with a target current can be implemented when a linear solenoid, as the standard sample, is provided, and the excitation current can be adjusted in such a way as not to change due to an inherent variation of the linear solenoid.

(2) Variant Example of Embodiment 2

Figure 13:
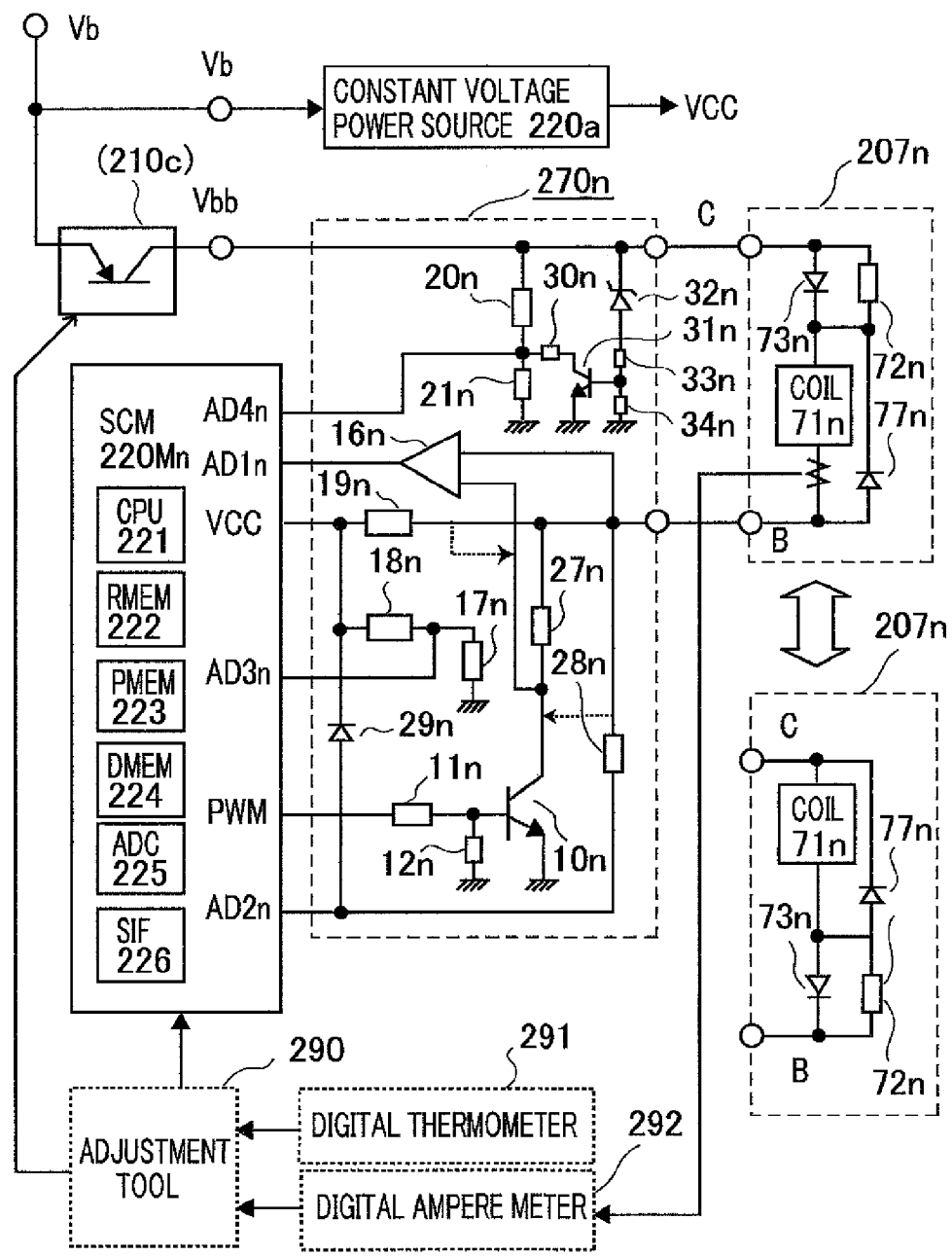
FIG. 13 is a circuit diagram illustrating a variant example of driving circuit unit in a transmission control apparatus according to Embodiment 2 of the present invention.

Next, a variant example of transmission control apparatus according to Embodiment 2 of the present invention will be explained. FIG. 13 is a circuit diagram illustrating a variant example of driving circuit unit in a transmission control apparatus according to Embodiment 2 of the present invention. Different points between FIG. 13 and FIG. 12 will mainly be explained. In FIG. 13, the control module 220Mn is configured in the same manner as that in FIG. 12; however, a linear solenoid 207n is configured with the electromagnetic coil 71n with which the power supply diode 73n is connected in series, the label resistor 72n connected in parallel with the power supply diode 73n, and a commutation diode 77n connected in parallel with the electromagnetic coil 71n, and one end of a series circuit consisting of the electromagnetic coil 71n and the power supply diode 73n is connected with the upstream side terminal C and the other end thereof is connected with the downstream side terminal B.

Meanwhile, the commutation diode 14n is not connected with a current detection resistor 27n, which corresponds to the current detection resistor 15n in FIG. 12; instead of the commutation diode 14n, the commutation diode 77n is utilized. The reverse-flow prevention diode 13n in FIG. 12 is not connected; the power supply diode 73n has the function of the reverse-flow prevention diode 13n.

Accordingly, when the power supply on/off device 210c and the control on/off device 10n are closed, an excitation current is supplied to the electromagnetic coil 71n by way of the power supply on/off device 210c, the power supply diode 73n, the electromagnetic coil 71n, the current detection resistor 27n, and the control on/off device 10n; the value of the voltage across the current detection resistor 27n is proportional to the value of the excitation current.

In this situation, when the control on/off device 10n is opened, the excitation current that has been flowing in the electromagnetic coil 71n attenuates while flowing back thereto through the commutation diode 77n; the excitation current that attenuates while flowing back thereto through the commutation diode 77n does not flow in the current detection resistor 27n. Accordingly, the digital ampere meter 292, which is outgoing-adjustment equipment, is connected with a temporary terminal provided at the downstream side of the electromagnetic coil 71n of the linear solenoid 207n, which is a standard sample for outgoing adjustment. As a result, the digital ampere meter 292 can directly measure the average current, of the electromagnetic coil 71n, that is duty-controlled by the control on/off device 10n. However, the amplified value of the voltage across the current detection resistor 27n inputted to the analogue input port AD1n through the differential amplifier 16n is produced only when the control on/off device 10n is closed; when the control on/off device 10n is opened, the amplified value is zero.

Based on the on/off duty of the control command signal PWM and the input voltage to the analogue input port AD1n at a time when the control on/off device 10n is closed, the microprocessor 221 estimates the attenuated current of the electromagnetic coil 71n so as to calculate the average current over the on and off periods. When as described above, the commutation diode 77n is connected in parallel with the electromagnetic coil 71n, there is posed a problem that the average current of the electromagnetic coil 71n cannot directly measured by use the current detection resistor 27n. However, there is demonstrated a feature that even provided that when the vehicle battery 102 is replaced and the positive and negative electrodes are set the other way around, the power supply on/off device 210c or the control on/off device 10n becomes reversely conductive, a power-source shortcircuit is not caused through the commutation diode 14n and the power supply diode 73n prevents a reverse flow. This countermeasure also applies to the case where the power supply on/off device 210c and the control on/off device 10n are each formed of not an illustrated junction-type transistor but a field-effect transistor.

Figure 19:
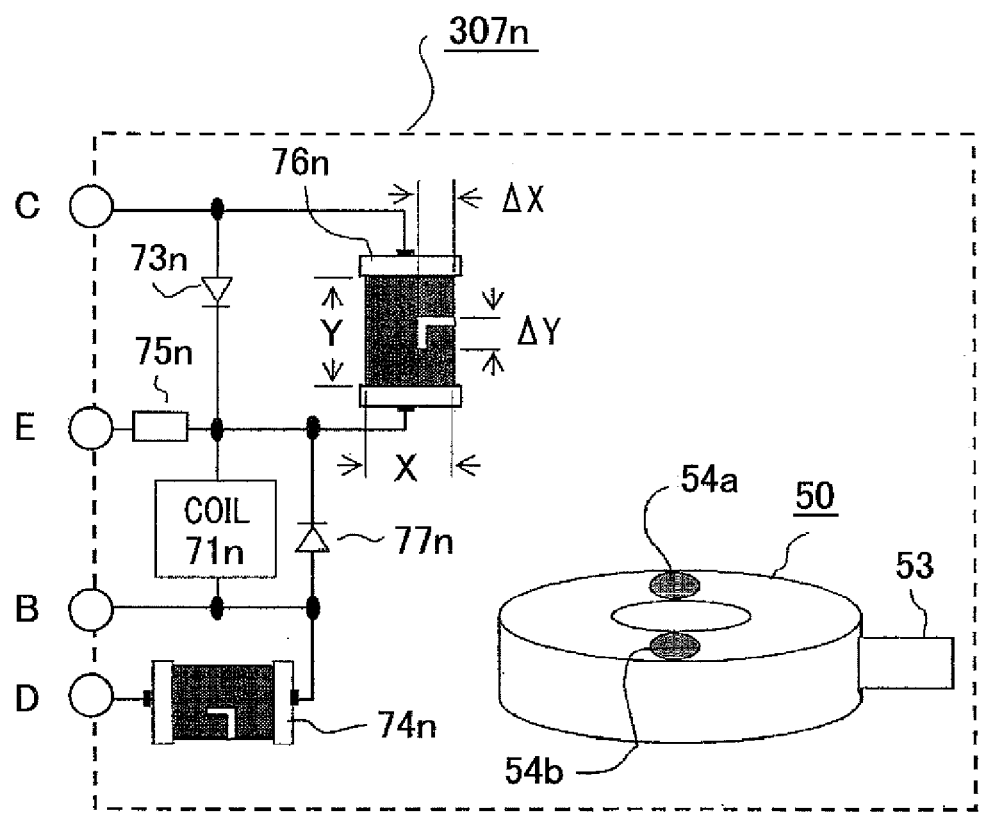
FIG. 19 is a configuration diagram illustrating a label resistor in a transmission control apparatus according to Embodiment 3 of the present invention.

As the label resistor 72n, a label resistor 76n, described later with reference to FIG. 19, utilizing laser-trimming resistors can also be adopted. In addition, the power supply on/off device 210c may be the output contact of a power-supply electromagnetic relay provided outside the engine control apparatus 210U.

(3) Detailed Description of Operation

Figure 14:
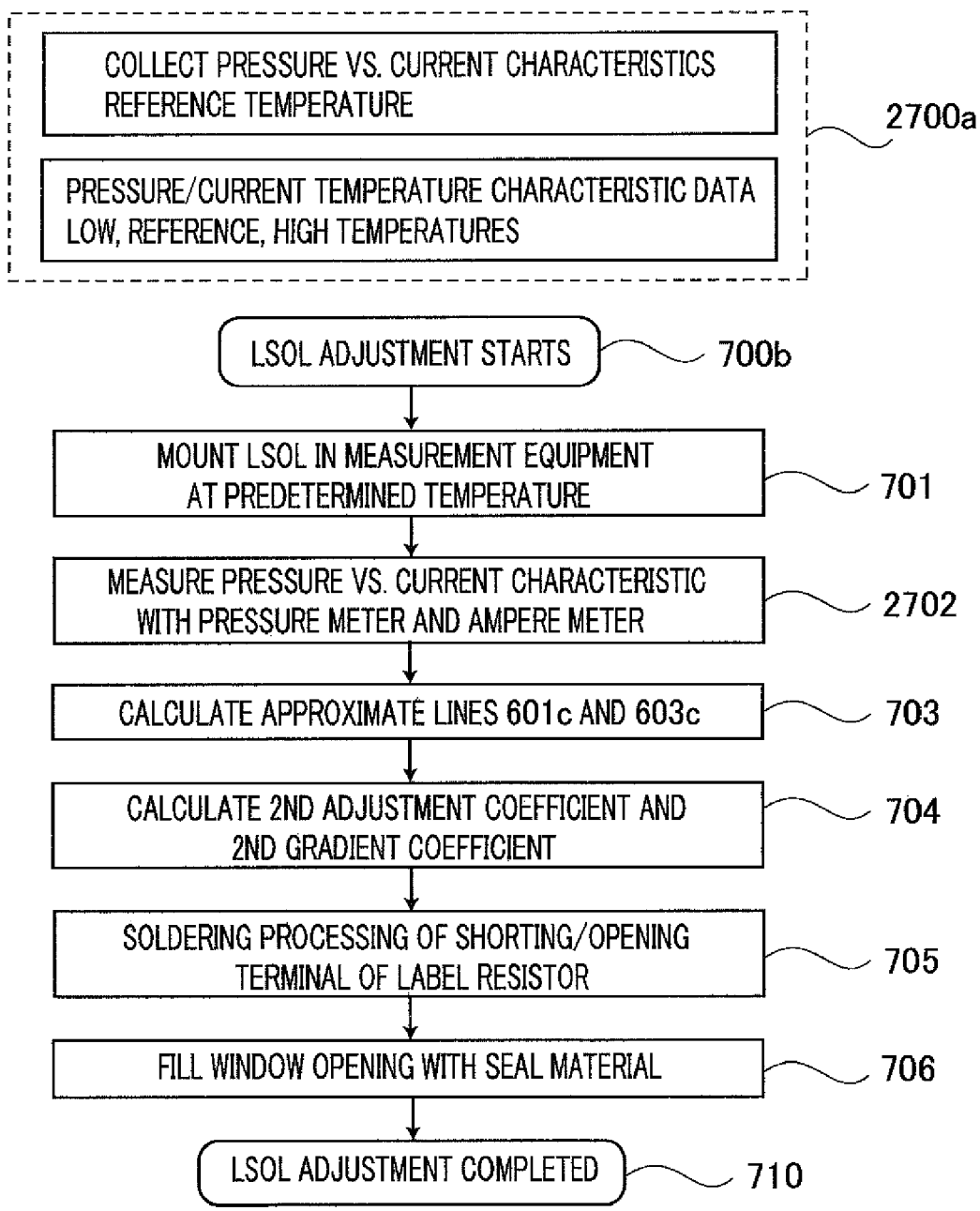
FIG. 14 is a flowchart representing adjustment work for a linear solenoid in a transmission control apparatus according to Embodiment 2 of the present invention.
Figure 15:
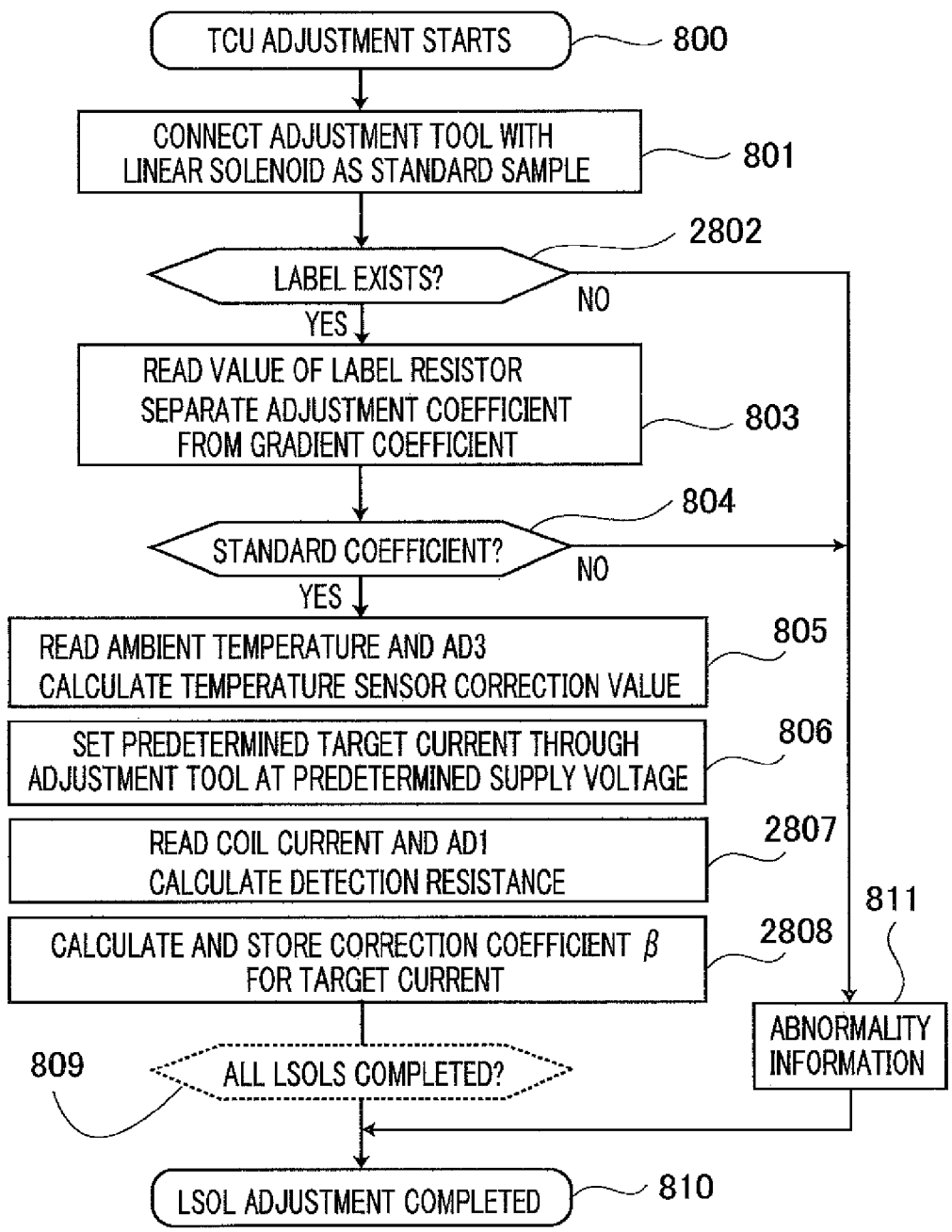
FIG. 15 is a flowchart representing adjustment operation of a supply current control apparatus in a transmission control apparatus according to Embodiment 2 of the present invention.
Figure 16A:
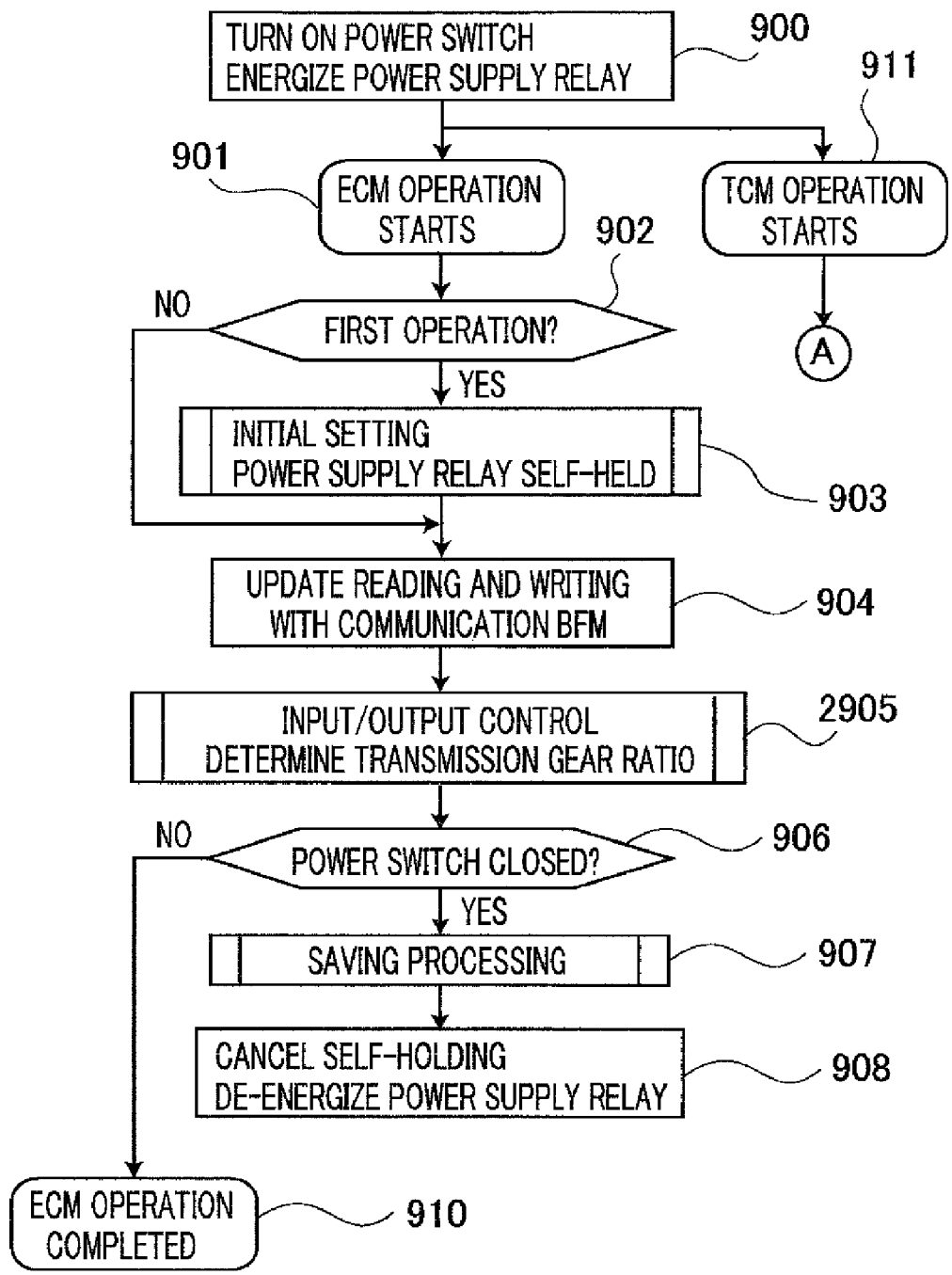
FIGS. 16A and 16B are a set of flowcharts representing the driving operation of a transmission control apparatus according to Embodiment 2 of the present invention.
Figure 16B:
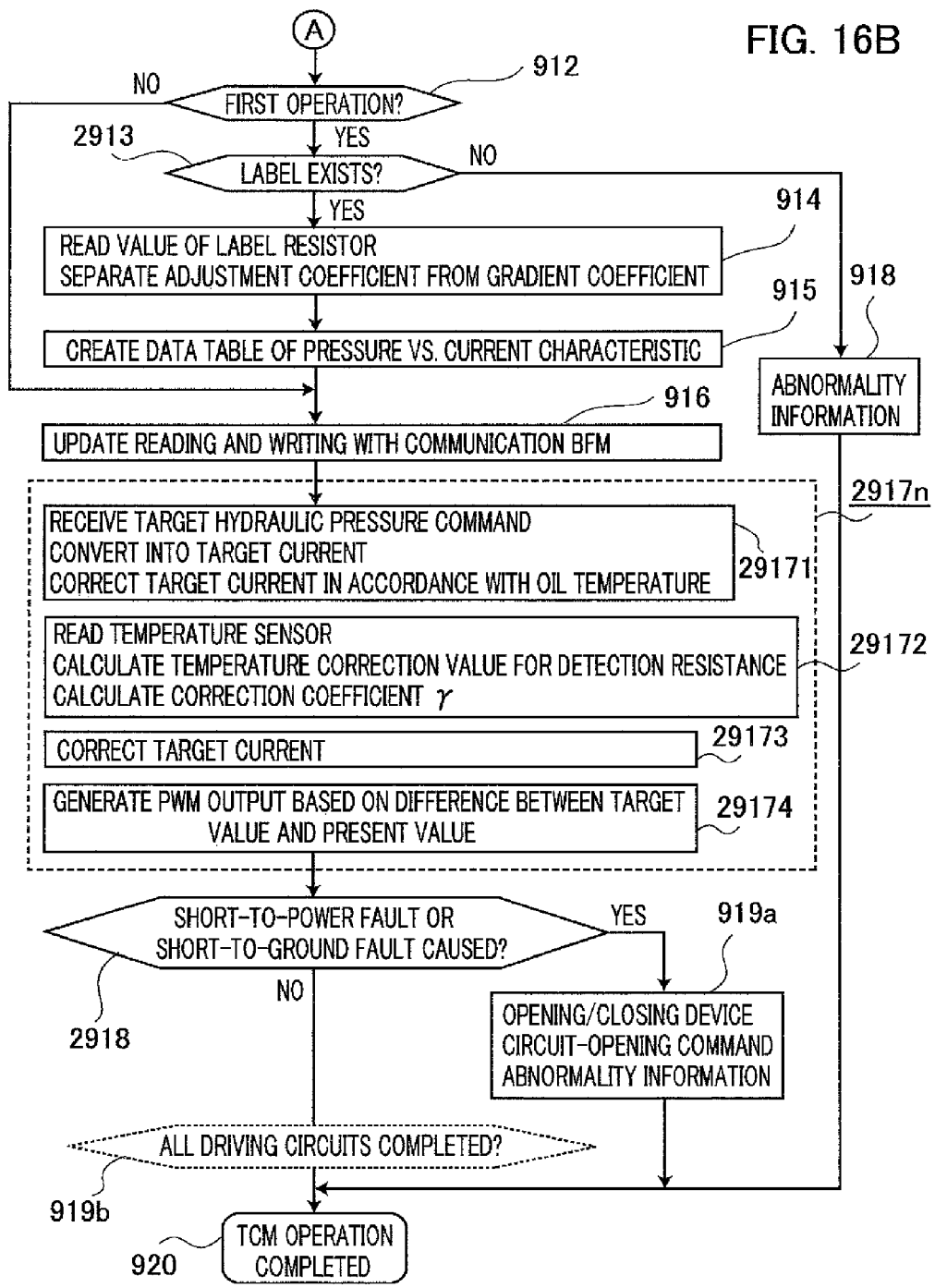

Next, the operation of a transmission control apparatus according to Embodiment 2 of the present invention will be explained. FIG. 14 is a flowchart representing adjustment work for a linear solenoid in the transmission control apparatus according to Embodiment 2 of the present invention; FIG. 15 is a flowchart representing adjustment work for a supply current control apparatus in the transmission control apparatus according to Embodiment 2 of the present invention; FIGS. 16A and 16B are a set of flowcharts representing the driving operation of the transmission control apparatus according to Embodiment 2 of the present invention. In FIGS. 14 through 16, the steps in which the same operation items as those in FIGS. 7 through 9 are performed are designated by the same reference characters, and the steps in which different operation items are performed are designated by reference characters in the 2000 s. In the following explanation, the operation items of the steps in the 2000 s will be described.

At first, in FIG. 14 which is a flowchart of the outgoing adjustment work for a linear solenoid, in the case where as illustrated in FIG. 12, the linear solenoid 207n does not include any commutation diode, the outgoing adjustment work for the solenoid is entirely the same as that in FIG. 7. However, in the case where as illustrated in FIG. 13, the linear solenoid 207n includes the commutation diode 77n, the connection position of the ampere meter at a time when the pressure vs. current characteristic is measured differs; in the step 2700a for the working in an experimental facilities, the ampere meter is directly connected with the downstream terminal of the electromagnetic coil 71n, as illustrated in FIG. 13. However, in the case of a linear solenoid to be shipped, the ampere meter cannot be connected with the downstream terminal of the electromagnetic coil 71n in the step 2702; therefore, it is required that the ampere meter is connected with a point outside the downstream side terminal B, and that the current for the electromagnetic coil 71n is adjusted not by performing duty control through an opening/closing device but by increasing/decreasing the applied voltage so that commutation to the commutation diode 77n is not caused.

Next, in FIG. 15 which is a flowchart of the adjustment operation of the supply current control apparatus 220U in FIG. 10, in the case where as illustrated in FIG. 12, the linear solenoid 207n does not include any commutation diode, the outgoing adjustment work for the linear solenoid is entirely the same as that in FIG. 8. However, only a single linear solenoid is connected with the supply current control apparatus 220U; therefore, the step 809 in FIG. 8 is removed.

In contrast, in the case where as illustrated in FIG. 13, the linear solenoid 207n includes the commutation diode 77n, the connection position of the ampere meter at a time when the pressure vs. current characteristic is measured differs; in the working step 2807 in outgoing adjustment facilities for the supply current control apparatus 220U, the ampere meter is directly connected with the downstream terminal of the electromagnetic coil 71n, as illustrated in FIG. 13. In the step 2808, instead of a correction coefficient $\alpha = Ifn/Isn$ related to the monitoring voltage Vfn, a correction coefficient β=Isn/Ifn for the target current Isn is calculated and is stored in the program memory 223 or the data memory 224. The reason for the foregoing method is that the monitoring voltage Vfn is a value at a time when the control on/off device 10n is closed and not an average value including the period in which the control on/off device 10n is opened.

In the step 2802 in which the resistance value of the label resistor 72n is read, the reading method is different from that in FIG. 8, regardless of whether or not the commutation diode 77n is provided. The resistance value R72n of the label resistor 72n is calculated by dividing the voltage, applied to the label resistor 72n under the condition that in FIG. 12 or FIG. 13, the power supply on/off device 210c and the control on/off device 10n are opened, by the electric current flowing in the label resistor 72n.

The voltage applied to the label resistor 72n is obtained by subtracting the voltage across the division resistors 20n and 21n from the input voltage Vad2 to the analogue input port AD2n. The voltage across the division resistors 20n and 21n is obtained by multiplying the input voltage Vad4 to the analogue input port AD4n by the reciprocal of the voltage division ratio of the division resistors 20n and 21n. The electric current that flows in the label resistor 72n is obtained by dividing the input voltage Vad4 to the analogue input port AD4n by the resistance value of the downstream resistor 21n.

The value of the electric current that flows in the label resistor 72n can also be obtained by dividing the voltage obtained by subtracting the input voltage Vad2 to the analogue input port AD2n from the value of the control voltage Vcc by the resistance value R19n of the power-supply resistor 19n. The resistance value R72n of the label resistor 72n includes the resistance value of the electromagnetic coil 71n; however, because the resistance value of the electromagnetic coil 71n is minute, compared with the resistance value of the label resistor 72n, it can be neglected; strictly speaking, the resistance value of the electromagnetic coil 71n may be subtracted from the resistance value R72n of the label resistor 72n.

Next, in FIGS. 16A and 16B which are a set of flowcharts of the overall driving operation of the control apparatus in FIG. 10, in the step 2905 which is an input/output control step in the engine control apparatus 210U, the first group of electric loads 205 is driven and controlled in response to the operation state of the first group of sensors 204 and the contents of an input/output control program stored in the program memory 213, and the transmission gear ratio is determined in response to the selection position of the gearshift lever, the accelerator-pedal depressing degree, and the vehicle speed; and a pressure setting command signal for any one of the plurality of linear solenoids 207a through 207n is generated and is transmitted to any one of the supply current control apparatuses 220Ua through 220Un, through the communication line 209.

In the steps 911 through 920 related to a specific supply current control apparatus 220Un among the supply current control apparatuses 220Ua through 220Un, the step 919b in FIG. 9B is removed. In the step 2913, as is the case with the step 2802 in FIG. 15, the value of the label resistor 72n provided in the linear solenoid 107n is read, and it is determined whether or not a predetermined resistance value can be read.

In the step block 2917n consisting of steps 29171 through 29174, the step 29171 is a step that functions as a setting means for a first correction target current Isn in which based on the target hydraulic pressure command value received from the engine control apparatus 210U and with reference to the data table created in the step 915, the target hydraulic pressure is converted into a target current corresponding to a target hydraulic pressure at the reference oil temperature, and in which based on the temperature characteristic data on the pressure vs. current preliminarily stored in the program memory 223 or the data memory 224 and the oil temperature detected by the temperature sensor 280, the target current is further corrected to a target current corresponding to the present oil temperature.

In the step 29172, the resistance value R17n of the temperature sensor 17n for detecting the temperature of the current detection resistor 15n is calculated, and a correction coefficient γ, which is the proportion of the resistance value R17n at the present temperature to the resistance value thereof at the reference temperature, is calculated from the resistance value vs. temperature characteristic of the temperature sensor 17n that is preliminarily stored in the program memory 223. The resistance value R17n of the temperature sensor 17n is calculated in the same manner as in the step 9172 represented in FIG. 9B.

The step 29173 is a step in which a control error caused in the driving circuit 270n is corrected; in the step 29173, there is set a second correction target current Isnn=βγIsn obtained by further correcting the first correction target current Isn determined in the step 29171. The correction coefficient β is calculated and stored in the step 2808 in FIG. 15.

The step 29174 is a step that functions as a feedback control means in which with the second target current Isnn as the target current and with the monitoring voltage Vfn as the feedback signal, the control signal PWM is generated and duty control of the control on/off device 10n is performed so that the first target current Isn is obtained.

The step 2918 is a step that functions as a wiring abnormality detection means in which it is determined whether or not there exists a short-to-power abnormality of the positive line or a short-to-power abnormality of the negative line, i.e., a phenomenon that the positive or negative power-supply line for the electromagnetic coil 71n makes contact with the power source line, a short-to-ground abnormality of the positive line or a short-to-ground abnormality of the negative line, i.e., a phenomenon that the positive or negative power-supply line makes contact with the ground circuit, or a load short-circuit abnormality, i.e., a phenomenon that the positive and negative power-supply lines make contact with each other.

In each of FIGS. 12 and 13, in the case where the input signals through the analogue input port AD1n and the analogue input port AD2n are utilized, the method of detecting a wiring abnormality is the same as that in FIG. 3. In this regard, however, in each case of FIGS. 12 and 13, a wiring abnormality can also be detected, as described below, by use of the input signals through the analogue input port AD1n and the analogue input port AD4n.

That is to say, a short-to-ground abnormality of the positive line is detected by the fact that when the power supply on/off device 210c is closed, the input voltage to the analogue input port AD4n is excessively low. The short-to-power abnormality of the negative line is detected by the fact that when the control on/off device 10n is closed, the input voltage of the analogue input port AD1n is excessively high or by the fact that when both the control on/off device 10n and the power supply on/off device 120c are opened, the input voltage of the analogue input port AD2n is excessively high. The load short-circuit abnormality is detected by the fact that when both the control on/off device 10n and the power supply on/off device 210c are closed, the input voltage of the analogue input port AD1n is excessively high. Furthermore, a short-to-power abnormality of the positive line is detected by the fact that when the power supply on/off device 210c is opened, the input voltage to the analogue input port AD4n is excessively high. A short-to-ground abnormality of the negative line is detected by the fact that when the control on/off device 10n is closed and the power supply on/off device 210c is closed, the input voltage to the analogue input port AD1n is excessively low.

(4) Gist and Feature of Embodiment 2

As is clear from the foregoing explanation, the transmission control apparatuses 200a through 200n according to Embodiment 2 of the present invention are provided with the respective linear solenoids 207a through 207n, each of which acts on the hydraulic pressure adjustment valve incorporated in a vehicle transmission and generates an adjusted hydraulic pressure output corresponding to a supply current and with the supply current control apparatuses 220Ua through 220Un for the respective linear solenoids; in the linear solenoid, the electromagnetic coil 71n and the label resistor 72n (or 76n) having a resistance value that serves as parameter data for correcting an inherent variation in the performance characteristics of the linear solenoid are integrated with each other. The supply current control apparatuses include the respective driving circuits 270a through 270n, each of which operates with the supply voltage Vbb, which is the output voltage of the power supply on/off device 210c connected between the vehicle battery 102 and all the plurality of linear solenoids or between the vehicle battery 102 and each of the linear solenoids, and the control voltage Vcc, which is the output voltage of the constant voltage power source 220a that is supplied with electric power from the vehicle battery 102; the respective control modules 220Ma through 220Mn; and the respective control on/off devices 10n that are included in the driving circuit and is connected in series with the respective other terminals of the linear solenoids. The driving circuit is provided with the measurement circuit 19n for energizing the label resistor 72n (or 76n) and measuring the resistance value of the label resistor; the control module includes the microprocessor 221 that generates a command signal for controlling the conduction state of the control on/off device 10n, the program memory 223 that collaborates with the microprocessor, the nonvolatile data memory 224 that is provided in part of the region of the program memory or is provided in such a way as to be separated from the program memory, and the multi-channel A/D converter 225 to which, as a reference voltage, the control voltage Vcc is applied.

The program memory 223 is provided with control programs that function as the correction control constant storage means 2808 and the label resistor reading and conversion means 915; and the correction control constant storage means 2808 collaborates with the adjustment tool 290, which is externally connected, so as to measure the current control constants for the driving circuits 270a through 270n, calculates correction coefficients for obtaining the supply currents that coincide with the target currents even when there exists the inherent variation of a circuit component, and stores the correction coefficients in the program memory 223 or the data memory 224. The label resistor reading and conversion means 915 calculates the resistance value of the label resistor 72n (or 76n) based on the proportion of the measured current that flows from the measurement circuit 19n to the label resistor 72n (or 76n) to the measured voltage applied to the label resistor 72n (or 76n), calculates or selectively determines, based on the calculated resistance value, parameter data for correcting the inherent variations of the linear solenoids, and stores the parameter data in the data memory 224 or the RAM memory 222. The label resistor reading and conversion means 915 is implemented at an operation start timing when the power switch is turned on; even when the linear solenoids are replaced for maintenance, the supply current can be controlled in accordance with the resistance value of the label resistor added to the replaced linear solenoid.

The power supply diode 73n with which the label resistor 72n (or 76n) is connected in parallel is connected in series with the electromagnetic coil 71n of the linear solenoid 207n; one terminal of the series circuit is connected with the upstream side terminal C, and the other terminal thereof is connected with the downstream side terminal B; the upstream side terminal C is connected with the positive terminal of the vehicle battery 102 by way of the power supply on/off device 210c, and the downstream side terminal B thereof is connected with the control on/off device 10n. The driving circuit 270n includes the power-supply resistor 19n, which functions as the measurement circuit that energizes the label resistor 72n (or 76n) from the constant voltage power source 220a by way of the downstream side terminal B; and the upstream division resistor 20n and the downstream division resistor 21n that are connected with the output of the power supply on/off device 210c. When the power supply on/off device 220c and the control on/off device 10n are opened, the control voltage Vcc is applied to the label resistor 72n (or 76n) from the constant voltage power source 220a by way of the power-supply resistor 19n, the electromagnetic coil 71n, and the upstream division resistor 20n and the downstream division resistor 21n; the voltage at the output side of the power-supply resistor 19n and the voltage across the downstream division resistor 21n are inputted to the multi-channel A/D converter 225 by way of the analogue input ports AD2n and AD4n, respectively.

Check from Here

The resistance value R72n (or R76n) of the label resistor 72n (or 76n) is calculated by the microprocessor 221, based on the following equation (2) or (3), letting R19n denote the resistance value of the power-supply resistor 19n, letting R20n and R21n denote the resistance values of the upstream division resistor 20n and the downstream division resistor 21n, respectively, and letting Vad2 and Vad4 denote the input voltages of the analogue input ports AD2n and AD4n, respectively.

$$R72n \text{ (or } R76n) = \qquad (2)$$
$$\{Vad2 - Vad4 \times (R20n + R21n)/R21n\}/\{(Vcc - Vad2)/R19n\} =$$
$$R19n \times \{(Vad2/Vcc) - (Vad4/Vcc) \times (R20n + R21n)/R21n\}/$$
$$(1 - Vad2/Vcc)$$

$$R72n \text{ (or } R76n) = \qquad (3)$$
$$\{Vad2 - Vad4 \times (R20n + R21n)/R21n\}/(Vad4/R21n) =$$
$$R21n \times Vad2/Vad4 - (R20n + R21n)$$

The resistance value of the electromagnetic coil 71n is smaller than the value of the minimum unit of the digital conversion value of the label resistor 72n (or 76n); the resistance value R19n of the power-supply resistor 19n, the resistance values R20n and R21n of the upstream division resistor 20n and the downstream division resistor 21n, respectively, that are utilized in the foregoing equations (2) and (3) are known fixed constants that are preliminarily stored in the program memory 223 or the data memory 224.

As described above, a power supply diode is connected in series with the electromagnetic coil in the linear solenoid, a label resistor is connected in parallel with the power supply diode, and division resistors are connected with the output terminal of the power supply on/off device; the resistance value of the label resistor is calculated by a microprocessor, based on the resistance value of a power-supply resistor, the resistance values of the division resistors, and the input voltages to two analogue input ports. Accordingly, there is demonstrated a feature that the label resistor can be read without increasing the number of direct wiring leads between the supply current control apparatus and the linear solenoid. Moreover, because no nonlinear resistance element such as a diode or a transistor is connected in serried in the label resistor measurement circuit, the resistance value can accurately be measured.

The driving circuit 270n is further provided with the parallel transistor 31n for connecting the parallel resistor 30n in parallel with the downstream division resistor 21n when the power supply on/off device 210c is closed; the parallel transistor 31n does not close when the power supply on/off device 210c is opened and a voltage the same as or lower than the control voltage Vcc is applied thereto by way of the power-supply resistor 19n.

As described above, when the power supply on/off device is closed, the parallel resistor is connected with the downstream resistor out of the division resistors provided for measuring the label resistor when the power supply on/off device is opened, so that the voltage division ratio is decreased. Accordingly, there is demonstrated a feature that the input signal to the analogue input port AD4n for measuring the voltage across the downstream division resistor can also be utilized for constantly monitoring the supply voltage Vbb at a time when the vehicle is being driven, and when the label resistor is measured, the voltage division ratio is raised so that the detection sensitivity can be enhanced.

The upstream side terminal C of each of the linear solenoids 207a through 207n is connected with the positive terminal of the vehicle battery 102 by way of the power supply on/off device 210c, and the downstream side terminal B thereof is connected with the control on/off device 10n by way of the current detection resistor 15n; the power supply diode 73n with which the label resistor 72n (or 76n) is connected in parallel is connected in series with the electromagnetic coil 71n, and one terminal of the series circuit is connected with the upstream side terminal C, and the other terminal thereof is connected with the downstream side terminal B; the voltage across the current detection resistor 15n is inputted to the multi-channel A/D converter 225 by way of the differential amplifier 16n and the analogue input port AD1n; there is provided the commutation diode 14n that is connected in parallel with a series circuit consisting of the power supply diode 73n, the electromagnetic coil 71n, and the current detection resistor 15n, by way of the power supply on/off device 210c; with reference to the value of the supply current inputted to the analogue input port AD1n, the microprocessor 221 calculates the average current over the opened and closed period of the control on/off device 10n and generates a command signal for controlling the conduction state of the control on/off device 10n so that the average becomes equal to the target supply current; the reverse-flow prevention diode 13n is connected in series with the power supply on/off device 210c or the control on/off device 10n.

As described above, the commutation diode is connected in parallel with the series circuit consisting of the electromagnetic coil and the current detection resistor by way of the power supply on/off device, and the reverse-flow prevention diode is connected in series with the power supply on/off device or the control on/off device. Accordingly, there is demonstrated a feature that the label resistor can be read without increasing the number of direct wiring leads between the supply current control apparatus and the linear solenoid.

There is demonstrated a feature that when the wiring leads are connected the other way around to the positive and negative electrodes of the vehicle battery, it is prevented by the reverse-flow prevention diode that the power supply on/off device and the control on/off device become reversely conductive and hence a power-source shortcircuit is caused through the commutation diode and that when the label resistor is measured, the label resistor is short-circuited by the commutation diode. Moreover, because no nonlinear resistance element such as a diode or a transistor is connected in series in the label resistor measurement circuit, the resistance value can accurately be measured.

The upstream side terminal C of each of the linear solenoids 207a through 207n is connected with the positive terminal of the vehicle battery 102 by way of the power supply on/off device 210c, and the downstream side terminal B thereof is connected with the control on/off device 10n by way of the current detection resistor 27n; the electromagnetic coil 71n is provided with the commutation diode 77n connected in parallel therewith and the power supply diode 73n connected in series therewith, and one terminal of the series circuit is connected with the upstream side terminal C and the other terminal thereof is connected with the downstream side terminal B; the label resistor 72n (or 76n) is connected in parallel with the power supply diode 73n; the voltage across the current detection resistor 27n is inputted to the multi-channel A/D converter 225 by way of the differential amplifier 16n and the analogue input port AD1n; with reference to the value of the supply current inputted to the analogue input port AD1n when the control on/off device 10n is closed, the microprocessor 221 estimates an attenuated excitation current at a time when the control on/off device 10n is opened and the excitation current for the electromagnetic coil 71n is commutated through the commutation diode 77n, calculates the average current over the opened/closed period, and generates a command signal for controlling the conduction state of the control on/off device 10n so that the average current becomes equal to the target supply current.

As described above, a commutation diode is connected in parallel with the electromagnetic coil in the linear solenoid, a power supply diode is connected in series with the electromagnetic coil, and a label resistor is connected in parallel with the power supply diode. Accordingly, there is demonstrated a feature that the label resistor can be read without increasing the number of direct wiring leads between the supply current control apparatus and the linear solenoid.

There is demonstrated a feature that because when the wiring leads are connected the other way around to the positive and negative electrodes of the vehicle battery, it is prevented by the power supply diode that the power supply on/off device and the control on/off device become reversely conductive and hence a power-source shortcircuit is caused through the commutation diode, it is not requires to externally provide a reverse-flow prevention diode, and hence the number of circuit components can be reduced and superfluous heat generation can be prevented. Moreover, because no nonlinear resistance element such as a diode or a transistor is connected in series in the label resistor measurement circuit, the resistance value can accurately be measured.

The temperature sensor 17n is disposed in the vicinity of the current detection resistor 15n or 17n; the temperature sensor 17n is connected with the constant voltage power source 220a by way of the series resistor 18n; the voltage across the temperature sensor 17n or the series resistor 18n is inputted to the multi-channel A/D converter 225 by way of the analogue input port AD3n; the adjustment tool 290 collaborates with the microprocessor 221 calculates a conversion resistance value obtained by converting the resistance value of the temperature sensor 17n at a measurement ambient temperature into a resistance value at the reference temperature or a correction coefficient obtained by dividing the conversion resistance value by the reference resistance value and stores it in the program memory 223 or the data memory 224; a temperature coefficient for calculating the value of resistance change, caused by a temperature rise, from the resistance value of the current detection resistor 15n or 27n at the reference temperature, a temperature coefficient for calculating the value of resistance change, caused by a temperature rise, from the resistance value of the temperature sensor 17n at the reference temperature, and the resistance value R18n of the series resistor 18n are preliminarily written in the program memory 223 or the data memory 224; while the supply current control apparatuses 220Ua through 220Un are operated, the digital conversion value of the detected current value inputted to the analogue input port AD1n or the setting value corresponding to the target current is corrected, based on the ambient temperature of the current detection resistor 15n or 27n; correction control is performed in such a way that even when a temperature change causes a change in the resistance value of the current detection resistor 15n, a target supply current can be obtained.

A plurality of voltage signals among the first voltage signal proportional to the voltage across the current detection resistor 15n or 27n connected in series with the electromagnetic coil 71n, the second voltage signal proportional to the voltage at one terminal of the electromagnetic coil 71n, and the third voltage signal proportional to the voltage at the other terminal of the electromagnetic coil 71n are inputted to the analogue input ports AD1n, AD2n, and AD4n of each of the control modules 220Ma through 220Mn; the program memory 223 includes a control program that functions as the wiring abnormality detection means 2918; based on the voltage signals inputted to the plurality of analogue input ports AD1n, AD2n, and AD4n, the microprocessor 221 detects a mutual-shorting abnormality in which the positive and negative wiring leads connected to the linear solenoids 207a through 207n make contact with each other, a short-to-power abnormality in which any one of the wiring leads makes contact with the power line, or a short-to-ground abnormality in which any one of the wiring leads makes contact with the vehicle body; when the abnormality is detected, the microprocessor 221 issues a circuit-opening command to the power supply on/off device 210c and the control on/off device 10n.

Each of the supply current control apparatuses 220Ua through 220Un collaborates with the engine control apparatus 210U provided outside the gearbox so as to perform communication of input/output signals with each other; the engine control apparatus 210U selectively determines the linear solenoids 207a through 207n to be energized, sets a target hydraulic pressure for the selected linear solenoid, and transmits the set target hydraulic pressure to the supply current control apparatuses 220Ua through 220Un; the supply current control apparatuses 220Ua through 220Un are integrated with the respective linear solenoids 207a through 207n through connectors, and include the respective control modules 220Ma through 220Mn that generate command signals for obtaining a target hydraulic pressure commanded by the engine control apparatus 210U and the respective driving circuits 207a through 207n that supply driving currents to the respective linear solenoids 207a through 207n.

As described above, the supply current control apparatuses, which collaborate with the engine control apparatus, are integrated with the respective linear solenoids through connectors. Accordingly, the engine control apparatus, a plurality of supply current control apparatuses, and a plurality of linear solenoids can be assembled in such a way that they are freely combined with one another and can separately be replaced for maintenance, and the supply current control apparatus individually controls the plurality of linear solenoids, so that there is demonstrated a feature that the supply current control apparatus including a current control power circuit, which is liable to cause a market trouble, can compactly and economically be configured, as a maintenance unit.

Moreover, there is demonstrated a feature that because a plurality of supply current control apparatuses include respective microprocessors so as to perform current control, no excessive control load is imposed on the engine control apparatus.

The linear solenoids 207a through 207n drive the relief valve 43b in an opening/closing manner, by use of the plunger 43a on which electromagnetic force produced by the electromagnetic coil 71n and repulsive force caused by the spring 44 are exerted; at a predetermined oil temperature, there is obtained a predetermined hydraulic pressure corresponding to the supply current for the electromagnetic coil 71n; at a predetermined oil temperature, the label resistor 72n (or 76n) has a resistance value corresponding to a correction coefficient for correcting the difference between the actual characteristic of the supply current for the electromagnetic coil 71n vs. the pressure of the activation oil 49b decompressed by the relief valve 43b and the standard characteristic and setting a supply current corresponding to a target hydraulic pressure; the temperature sensor 280 for estimating the temperature of oil in the transmission is connected with each of the plurality of supply current control apparatuses 220Ua through 220Un or with the engine control apparatus 210U; the standard data related to the characteristic of the pressure vs. oil temperature inside the transmission of the activation oil 49b is preliminarily stored in the program memory 223 or the data memory 224; the microprocessor 221 corrects the value of the supply current for obtaining a target hydraulic pressure, in accordance with the oil temperature estimated by the temperature sensor 280.

Embodiment 3

(1) Detailed Description of Configuration

Figure 17:
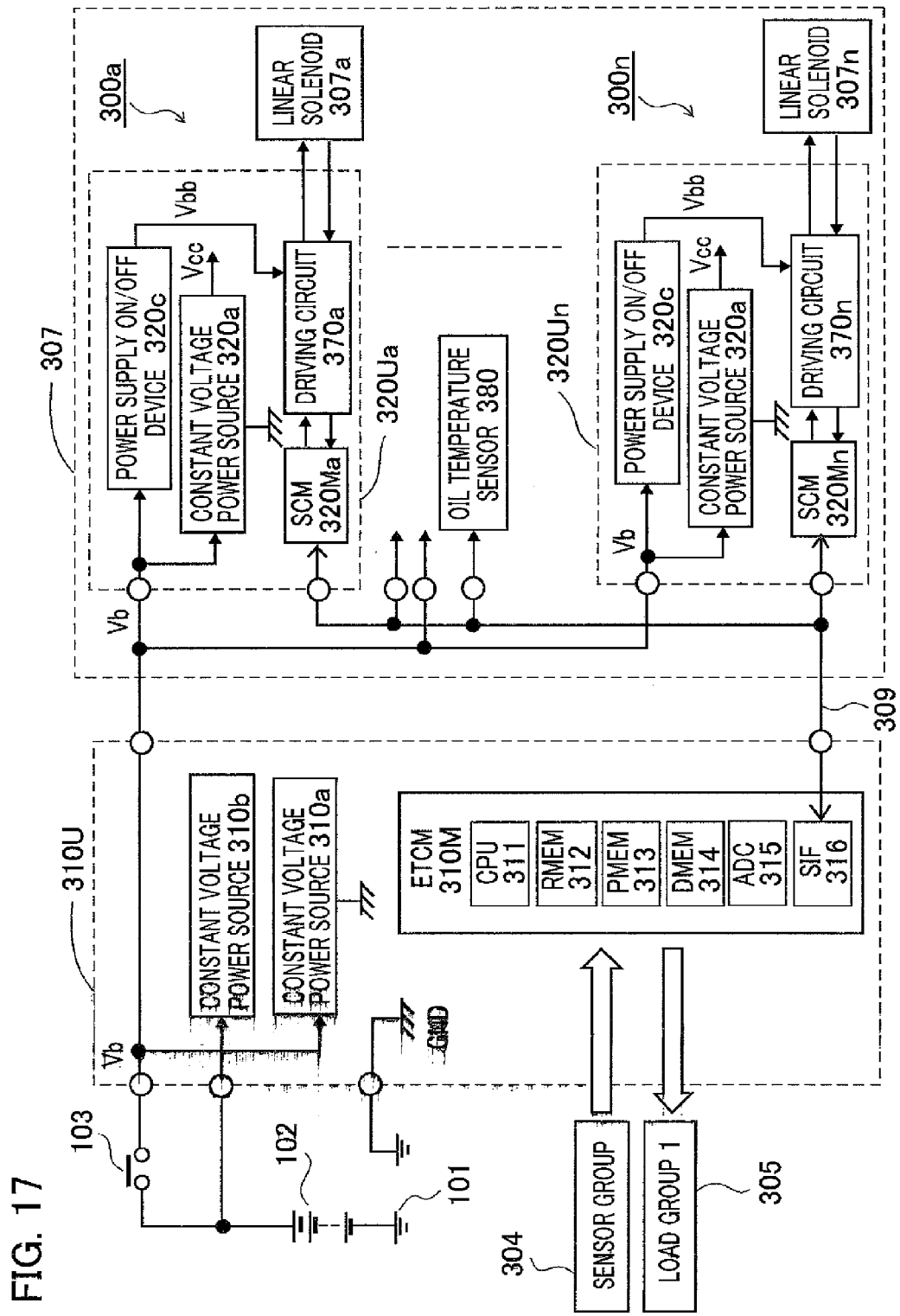
FIG. 17 is a configuration diagram of an overall transmission control apparatus according to Embodiment 3 of the present invention.

Next, a transmission control apparatus according to Embodiment 3 of the present invention will be explained. FIG. 17 is a configuration diagram of an overall transmission control apparatus according to Embodiment 3 of the present invention. With reference to FIG. 17, the points different from FIG. 1 in Embodiment 1 or FIG. 10 in Embodiment 2 will be mainly described below. In each of the drawings, the same reference characters denote the same or similar portions; the reference characters in the 100 s of Embodiment 1 and the reference characters in the 200 s of Embodiment 2 are replaced by the reference characters in the 300 s that denote similar portions.

In FIG. 17, an engine control apparatus 310U provided in an engine room and a plurality of supply current control apparatuses 320Ua through 320Un fixed inside of a gearbox 307 of a vehicle transmission are configured in such a way as to collaborate with each other so as to control supply currents for linear solenoids 307a through 307n incorporated in the gearbox 307. In Embodiment 3, four to six supply current control apparatus 320Ua through 320Un are combined on a one-to-one basis with respective four to six linear solenoids 307a through 307n; the respective combinations of the supply current control apparatus and the linear solenoid form distributed-control-type transmission control apparatuses 300a through 300n. The positive terminal of a vehicle battery 102 whose negative terminal is connected with a vehicle body ground terminal 101 supplies a battery voltage Vb to the engine control apparatus 310U and the supply current control apparatuses 320Ua through 320Un, by way of an output contact 103 of an unillustrated power supply relay.

A first group of sensors 304 whose outputs are inputted to the engine control apparatus 310U is a combination of the first group of sensors 104 and the second group of sensors 106 in FIG. 1 and includes a shift lever switch for indicating a shift lever position, a vehicle speed sensor, and the like in addition to analogue sensors, on/off switch sensors, manual command switches, or the like, such as accelerator position sensor that detects the accelerator-pedal depressing degree, a throttle position sensor that detects the intake valve opening degree of an engine, an air flow sensor that measures intake amount, an exhaust-gas sensor, an engine rotation sensor, a crank angle sensor, a power switch, and an engine starting command switch.

A group of electric loads 305 that respond to the output signals generated by the engine control apparatus 310U include, for example, a fuel-injection electromagnetic valve, an ignition coil (in the case of an gasoline engine), an intake valve opening degree control motor, a starter motor, and the like. In this regard, however, the engine control apparatus 310U includes part of the functions of the supply current control apparatus 120U in FIG. 1 in addition to the foregoing engine control functions and transmits respective hydraulic pressure command signals to the supply current control apparatuses 320Ua through 320Un by way of a communication line 309, in response to the selection position of the gearshift lever, the accelerator-pedal depressing degree, and the vehicle speed. The output of an oil temperature sensor 380 provided inside the gearbox 307 is temporarily inputted to the engine control apparatus 310U by way of the communication line 309 and then is transmitted, as an oil temperature detection signal, to the supply current control apparatus 320Ua through 320Un.

Inside the engine control apparatus 310U, there are provided a constant voltage power source 310a that is energized from the vehicle battery 102 by way of the output contact 103 of the power supply relay, a constant voltage power source 310b that is energized directly from the vehicle battery 102, and a control module 310M. In the control module 310M, a microprocessor 311, which is a computing processing unit, a computing-processing RAM memory 312, a nonvolatile program memory 313, which is, for example, a flash memory, a nonvolatile data memory 314, a multi-channel A/D converter 315, and a serial-parallel converter 316 are connected with one another through a bus line.

In collaboration with the program memory 313, the microprocessor 311 controls the throttle valve opening degree in accordance with the accelerator-pedal depressing degree and supplies a fuel proportional to the intake amount; in the case of a gasoline engine, the ignition coil is on/off-controlled in accordance with the engine rotation speed and the fuel injection amount.

In response to the selection position of the gearshift lever, the accelerator-pedal depressing degree, and the vehicle speed, the microprocessor 311 generates respective hydraulic pressure command signals to be sent to the linear solenoids 307a through 307n through the communication line 309 and transmits oil temperature information by the temperature sensor 380 to the linear solenoids 307a through 307n; when the transmission gear ratios of the transmission are changed, the microprocessor 311 adjusts the fuel injection amount in such a way that the engine rotation speed gradually changes. Inside each of the supply current control apparatuses 320Ua through 320Un, there is provided a constant voltage power source 320a that is energized from the vehicle battery 102 by way of the output contact 103 of the power supply relay and generates a stabilized control voltage Vcc of, for example, DC 5 [V]; the constant voltage power sources 320a supply electric power to respective control modules 320Ma through 320Mn and respective driving circuits 370a through 370n, described later. Inside the supply current control apparatuses 320Ua through 320Un, there are provided respective power supply on/off devices 320c that supply the supply voltage Vbb to the driving circuits 370a through 370n.

Figure 18:
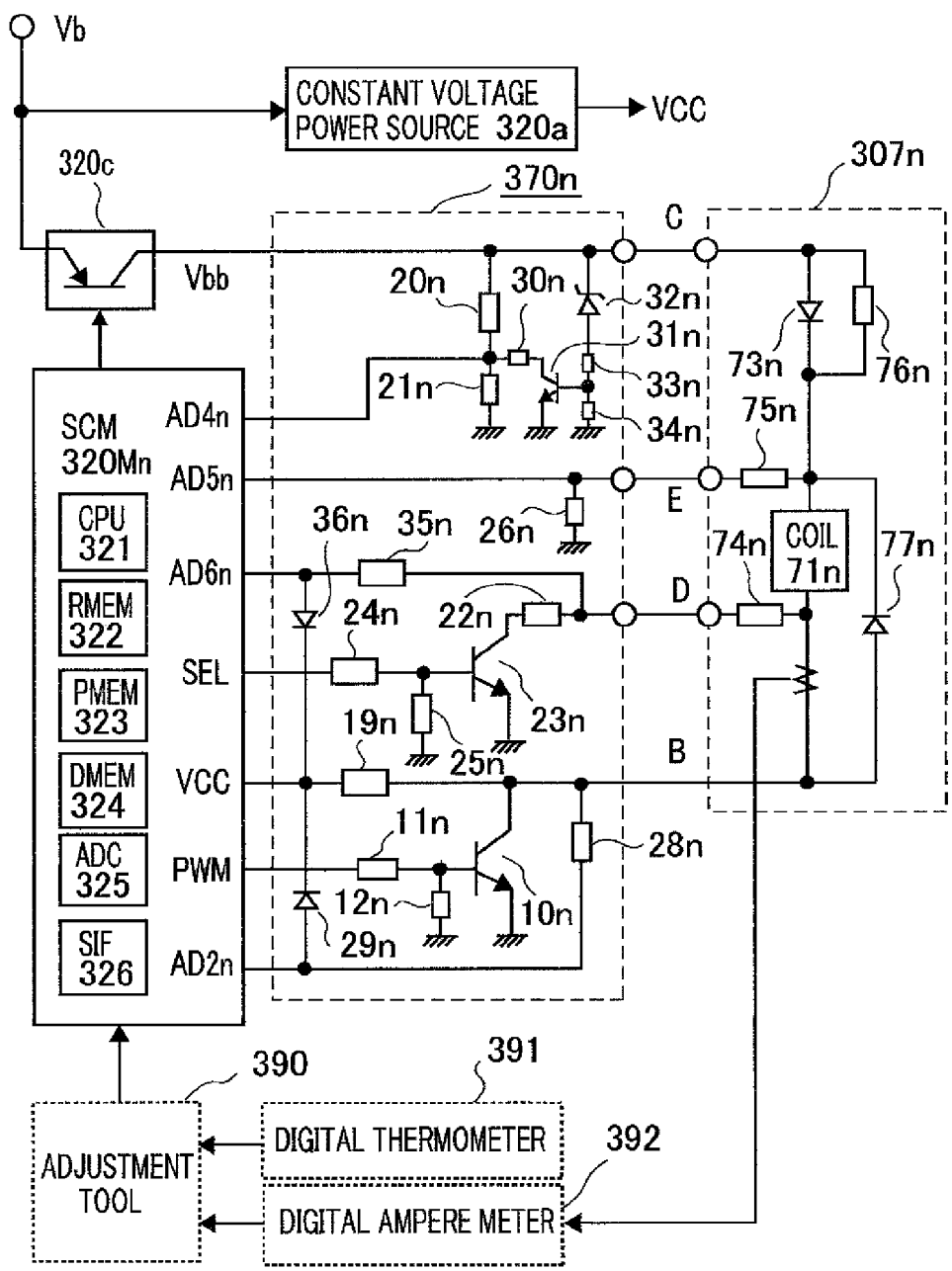
FIG. 18 is a circuit diagram of a driving circuit unit in a transmission control apparatus according to Embodiment 3 of the present invention.

Next, the detail of the driving circuit unit will be explained. FIG. 18 is a circuit diagram of the driving circuit unit in a transmission control apparatus according to Embodiment 3 of the present invention. In FIG. 18, the control module 320Mn is configured in the same manner as that in FIG. 12 or 13; however, the linear solenoid 307n is configured with an electromagnetic coil 71n with which a power supply diode 73n is connected in series, a label resistor 76n connected in parallel with a power supply diode 73n, a commutation diode 77n connected in parallel with the electromagnetic coil 71n, a temperature sensor 75n that is connected with the positive terminal of the electromagnetic coil 71n and detects the ambient temperature of the electromagnetic coil 71n, and an added label resistor 74n connected with the negative terminal of the electromagnetic coil 71n. The positive terminal of the power supply diode 73n is connected with the upstream side terminal C, and the negative terminal of the electromagnetic coil 71n is connected with the downstream side terminal B.

The other terminal of the temperature sensor 75n is connected with the driving circuit 370n by way of a connection terminal E, and the other terminal of the added label resistor 74n is connected with the driving circuit 370n by way of an added connection terminal D. Meanwhile, the current detection resistor 15n, the commutation diode 14n, and the differential amplifier 16n in FIG. 12 and the current detection resistor 27n and the differential amplifier 16n in FIG. 13 are not connected; instead of the commutation diode 14n, the commutation diode 77n is utilized. The reverse-flow prevention diode 13n in FIG. 12 is not connected; the power supply diode 73n has the function of the reverse-flow prevention diode 13n.

Accordingly, when the power supply on/off device 320c and the control on/off device 10n are closed, an excitation current Ic, which is represented by the equation (6) below, is supplied to the electromagnetic coil 71n by way of the power supply on/off device 320c, the power supply diode 73n, the electromagnetic coil 71n, and the control on/off device 10n.

$$Ic = Kd \times Vbb / Rt \qquad (6)$$

where Kd is the conductive duty of a command signal PWM generated by a microprocessor 321 and corresponds to the closing time/the on/off period of the control on/off device 10n. Rt is the resistance value of the electromagnetic coil 71n and is corrected with the value of the ambient temperature detected by the temperature sensor 75n.

In this situation, when the control on/off device 10n is opened, the excitation current that has been flowing in the electromagnetic coil 71n attenuates while flowing back thereto through the commutation diode 77n; the excitation current that attenuates while flowing back thereto through the commutation diode 77n does not flow to the downstream side terminal B. Accordingly, a digital ampere meter 392, which is outgoing-adjustment equipment, is connected with a temporary terminal provided at the downstream side of the electromagnetic coil 71n of the linear solenoid 307n, which is a standard sample for outgoing adjustment. As a result, the digital ampere meter 392 can directly measure the average current, of the electromagnetic coil 71n, that is duty-controlled by the control on/off device 10n.

The connection relationship between the driving circuit for the control on/off device 10n and the analogue input port AD2n, the connection relationship between the division resistors 20n and 21n and the analogue input port AD4n, and the connection relationship around the parallel transistor 31n are the same as those in FIGS. 12 and 13. The voltage across a series resistor 26n that connects the negative terminal of the temperature sensor 75n with the ground circuit is inputted to a multi-channel A/D converter 325 by way of the analogue input port AD5n. The resistance value R75n of the temperature sensor 75n is measured while the power supply on/off device 320c is closed and the vehicle is driven; the resistance value R75n is obtained by dividing the voltage across the temperature sensor 75n by the current flowing in the temperature sensor 75n.

The voltage across the temperature sensor 75n is obtained by subtracting the forward voltage of the power supply diode 73n and the input voltage AD5n to the analogue input port AD5n from the supply voltage; the value of the supply voltage Vbb is calculated by dividing the input voltage to the analogue input port AD4n by the combined division ratio of the division resistors 20n and 21n and the parallel resistor 30n. The value of the electric current that flows in the temperature sensor 75n can be obtained by dividing the input voltage Vad5 to the analogue input port AD5n by the resistance value R26n of the series resistor 26n.

The voltage across the series circuit of a series resistor 22n that connects the negative terminal of the added label resistor 74n with the ground circuit and a measurement transistor 23n is inputted to a multi-channel A/D converter 325 by way of an input resistor 35n and the analogue input port AD5n; the input terminal of the analogue input port AD6n is connected with the output terminal of the constant voltage power source 320a by way of a clip diode 36n. In the case where the logic level of a measurement command signal SEL generated by the microprocessor 321 is "H", the measurement transistor 23n is driven to be closed by way of a base resistor 24; in the case where the logic level thereof is "L", the measurement transistor 23n is securely opened by the open-circuit stabilizing resistor 25n connected between the base terminal and the emitter terminal.

The resistance value R74n of the added label resistor 74n is measured when both the power supply on/off device 320c and the control on/off device 10n are opened and the measurement transistor 23n is driven to be closed; the clip diode 36n prevents the input voltage to the analogue input port AD6n from becoming excessively high when the power supply on/off device 320c is closed and the control on/off device 10n is opened. The resistance value R74n of the added label resistor 74n is obtained by dividing the voltage across the added label resistor 74n by the current flowing in the added label resistor 74n. The voltage across the added label resistor 74n is obtained by subtracting the input voltage Vad6 to the analogue input port AD6n from the input voltage Vad2 to the analogue input port AD2n; the current flowing in the added label resistor 74n is obtained by dividing the input voltage Vad6 to the analogue input port AD6n by the resistance value R22n of the series resistor 22n.

Next, the detail of the label resistor will be explained. FIG. 19 is a configuration diagram illustrating a label resistor in a transmission control apparatus according to Embodiment 3 of the present invention. In FIG. 19, each of the label resistors 76n and 74n in the linear solenoid 307n is formed of laser-trimming resistors that are integrally molded with the sealing resin 50; the respective resistance values thereof are adjusted through adjusting windows 54a and 54b.

The laser-trimming resistor is a thin film resistor having a width of X, a length of Y, and a thickness of T; letting $\Delta X$ denote the transverse-direction cutting dimension and letting $\Delta Y$ denote the longitudinal-direction cutting dimension, the increased resistance value $\Delta R$, with respect to the initial resistance value R0, that is caused due to the cutting is calculated according to the equation (7) below.

$$\Delta R/R0=(\Delta Y/Y)\times \Delta X/(X-\Delta X) \tag{7}$$

Accordingly, adjustment of the cutting dimensions makes it possible to perform substantial resistance adjustment and a minute-diameter laser beam makes it possible to obtain a resistor that is accurately finished.

FIG. 20 is a set of characteristic graphs representing approximate straight lines of the pressure vs. current characteristics of a transmission control apparatus according to Embodiment 3 of the present invention; FIG. 20(A) represents an average pressure vs. current characteristic, at a reference temperature, among the pressure vs. current characteristic of a great number of samples; FIG. 20(B) represents the pressure vs. current characteristic, at the reference temperature, of the linear solenoid 307 to be shipped.

In FIG. 20(A), the average pressure vs. current characteristic, at a reference temperature, among the pressure vs. current characteristic of a great number of samples is approximated with a broken-line characteristic represented by a pair of straight lines 604a and 604b; the portion, of the broken-line characteristic, where the pair of straight lines 604a and 604b cross each other is arc-interpolated with a predetermined curvature radius. The straight line 604a is specified by a first data (A10, P10, θ10), and the straight line 604b is specified by a second data (A20, P20, θ20). P10 denotes the adjustment hydraulic pressure at a time when the supply current is A10; P20 denotes the adjusted hydraulic pressure at a time when the supply current is A20; θ10 and θ20 denote the respective gradients of the straight lines 604a and 604b.

In FIG. 20(B), the pressure vs. current characteristic, at a reference temperature, of a linear solenoid 307n to be shipped, i.e., the actual characteristic is approximated with a broken-line characteristic represented by a pair of straight lines 605a and 605b; the portion, of the broken-line characteristic, where the pair of straight lines 605a and 605b cross each other is arc-interpolated with a predetermined curvature radius determined based on the standard characteristic in FIG. 20(A). The straight line 605a is specified by a first data (A10, P1n, θ1n), and the straight line 605b is specified by a second data (A20, P2n, θ2n). Pin denotes the adjustment hydraulic pressure at a time when the supply current is A10; P2n denotes the adjusted hydraulic pressure at a time when the supply current is A20; θ1n and θ2n denote the respective gradients of the straight lines 605a and 605b.

Accordingly, the hydraulic-pressure adjustment coefficient is P1n/P10 or P2n/P20, and the hydraulic-pressure gradient coefficient is θ1n/θ10 or θ2n/θ20.

(2) Detailed Description of Operation

Figure 21:
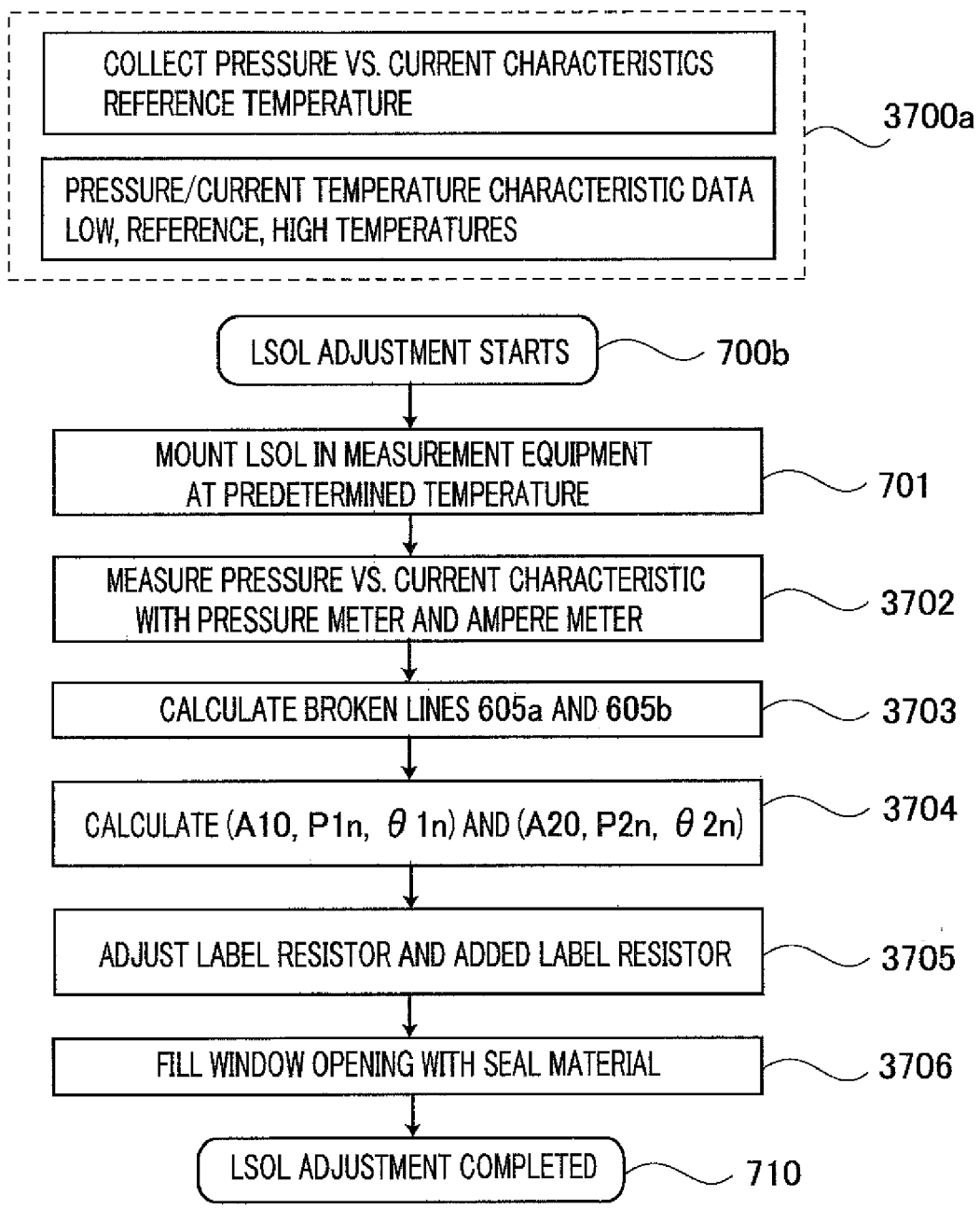
FIG. 21 is a flowchart representing adjustment work for a linear solenoid in a transmission control apparatus according to Embodiment 3 of the present invention.
Figure 22:
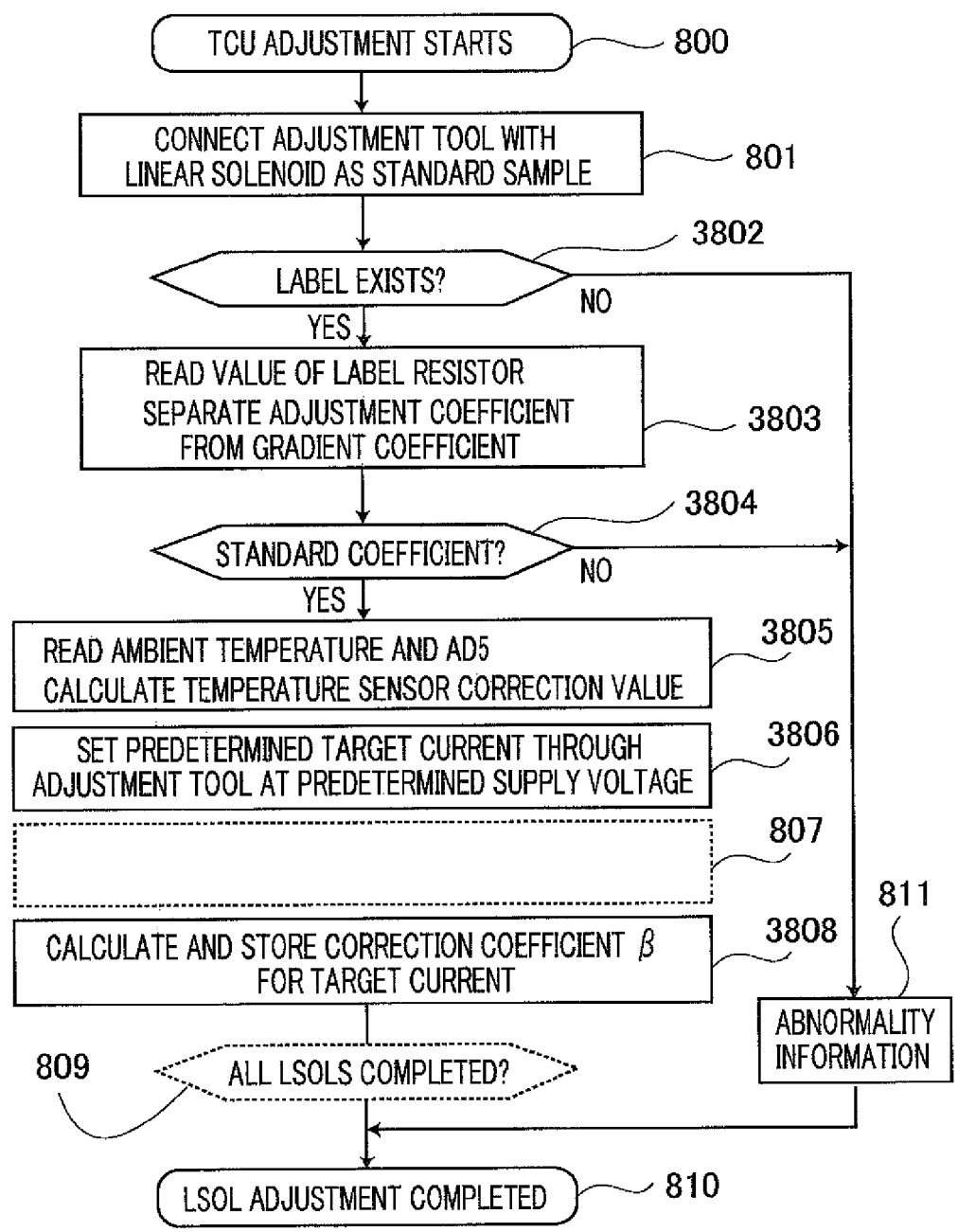
FIG. 22 is a flowchart representing the adjustment operation of a supply current control apparatus in a transmission control apparatus according to Embodiment 3 of the present invention.
Figure 23A:
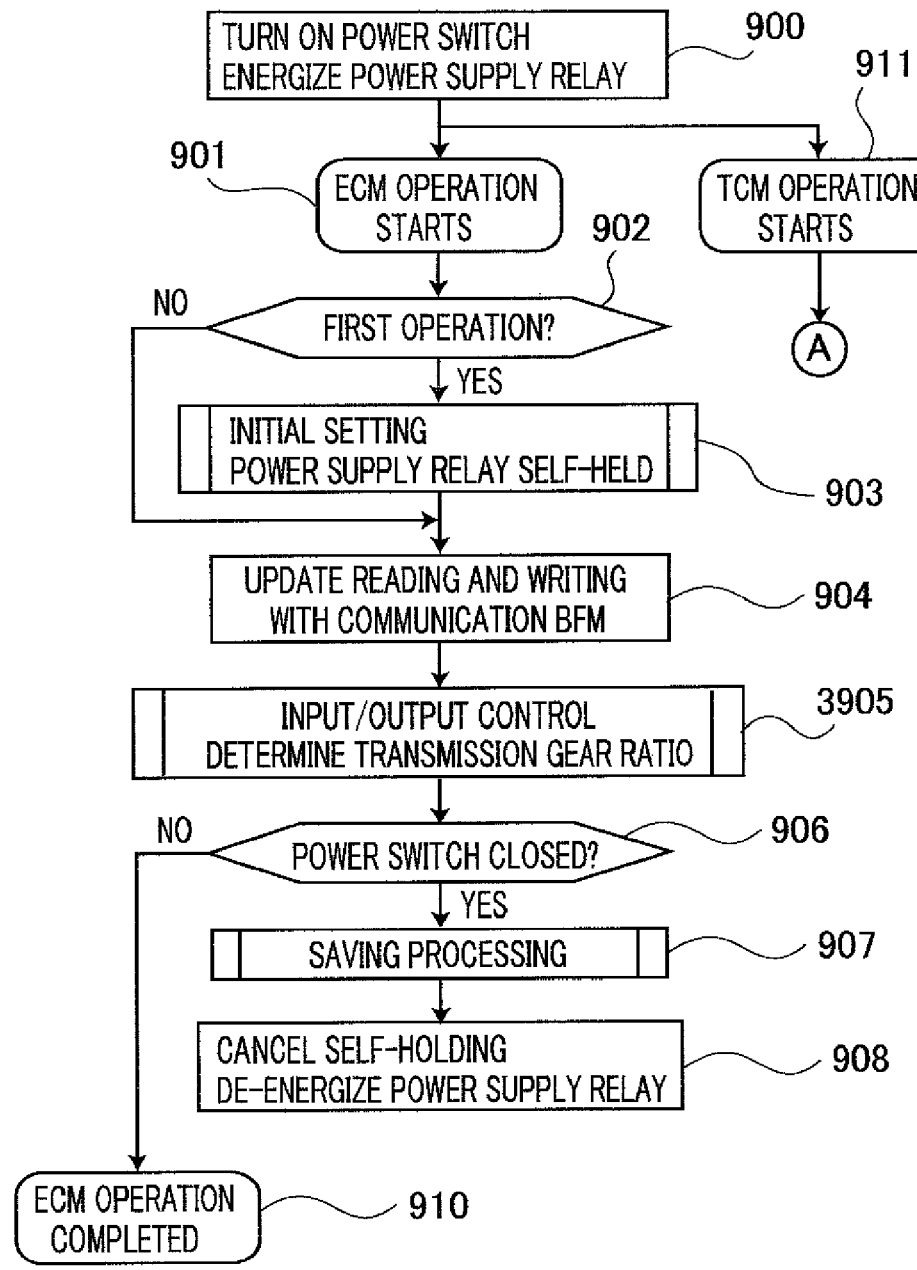
FIGS. 23A and 23B are a set of flowcharts representing the driving operation of a transmission control apparatus according to Embodiment 3 of the present invention.
Figure 23B:
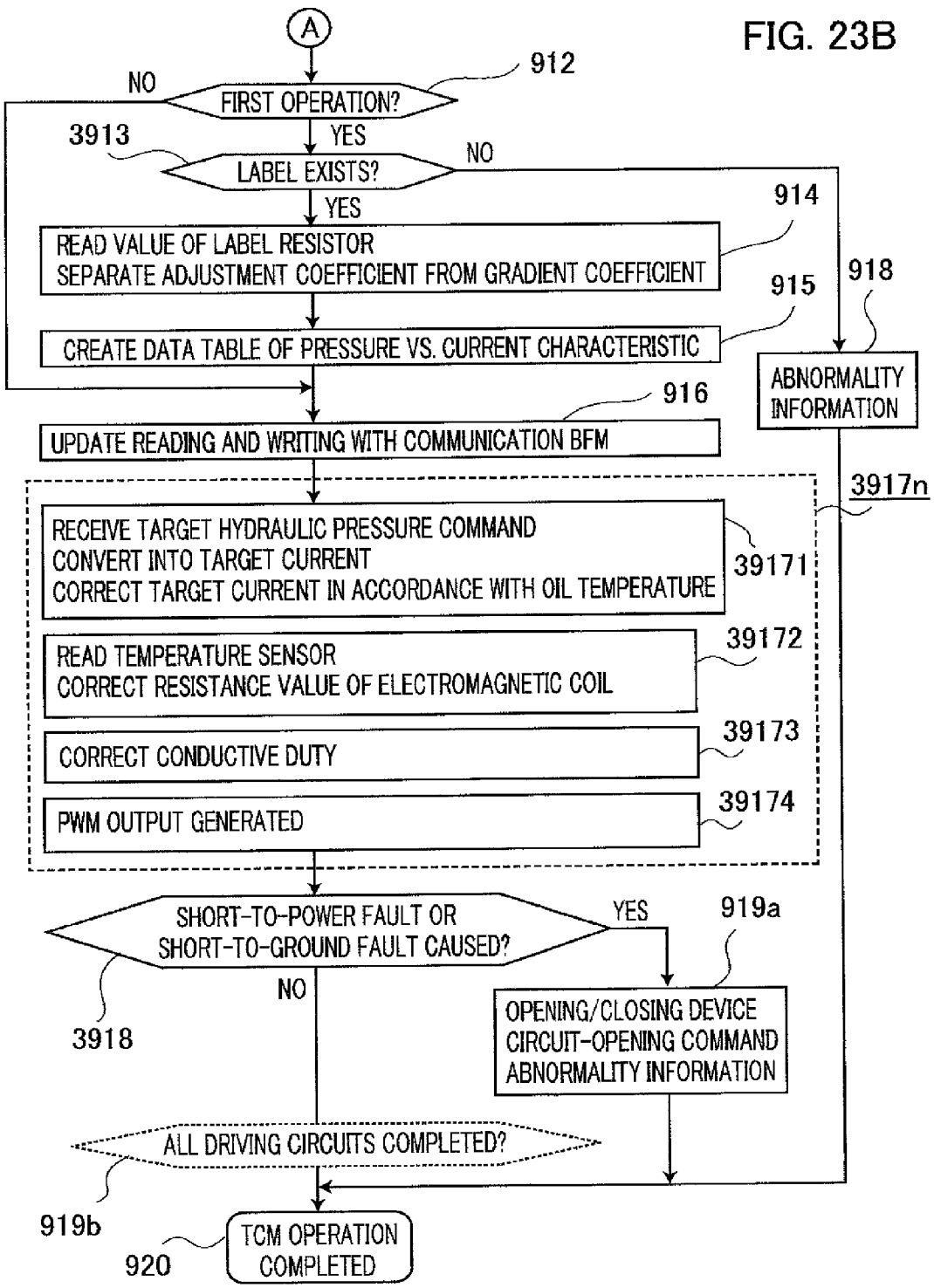

Hereinafter, there will be explained a transmission control apparatus according to Embodiment 3 of the present invention. FIG. 21 is a flowchart representing adjustment work for a linear solenoid in the transmission control apparatus according to Embodiment 3 of the present invention; FIG. 22 is a flowchart representing adjustment work for a supply current control apparatus in the transmission control apparatus according to Embodiment 3 of the present invention; FIGS. 23A and 23B are a set of flowcharts representing the driving operation of the transmission control apparatus according to Embodiment 3 of the present invention. In FIGS. 21 through 23A/23B, the steps in which the same operation items as those in FIGS. 7 through 9 are performed are designated by the same reference characters, and the steps in which different operation items are performed are designated by reference characters in the 3000 s; in the following explanation, the operation items of the steps in the 3000 s will be described.

At first, in FIG. 21 which is a flowchart of outgoing adjustment work for a linear solenoid, in the working step $3700a$ in which experimental measurement is performed, the pressure vs. current characteristics of a great number of samples are measured at a reference oil temperature so that the standard characteristic represented in FIG. 20(A) is created. At this time, the ampere meter 392 is temporarily connected with the negative terminal of the electromagnetic coil $71n$, as represented in FIG. 18.

Next, the oil temperature is adjusted to a low temperature and then to a high temperature, for example, to $-25°$ C. and then to $+75°$ C., and at the low temperature and the high temperature, the respective pressure vs. current characteristics of a standard sample having a characteristic near to the standard characteristic are measured, so that the low temperature characteristic graph and the high temperature characteristic graph are obtained. Based on the low temperature characteristic graph and the high temperature characteristic graph, approximate straight lines similar to those in the standard characteristic graph are created; then, there is created a data table related to the changing rates that indicate how the adjusted hydraulic pressure and the straight-line gradient change in accordance with the oil temperature. The characteristic data created in such a way as described above is transferred to the design department of the supply current control apparatus and then is preliminarily stored in the program memory 323 or the data memory 324.

Next, in the step 3702 related to the item to be shipped, the pressure vs. current characteristic of the item to be shipped is measured by use a pressure meter and an ampere meter; however, the ampere meter cannot be connected with the downstream terminal of the electromagnetic coil $71n$; therefore, it is required that the ampere meter is connected with a point outside the downstream side terminal B, and that the current for the electromagnetic coil $71n$ is adjusted not by performing duty control through an opening/closing device but by increasing/decreasing the applied voltage so that commutation to the commutation diode $77n$ is not caused.

In the step 3703, the pair of straight lines $605a$ and $605b$ in FIG. 20(B) are created; in the step 3704, there are calculated the first data (A10, P1$n$, θ1$n$) and the second data (A20, P2$n$, θ2$n$) for representing the pair of straight lines $605a$ and $605b$, respectively. In the step 3705, the resistance values of the label resistor $76n$ and the added label resistor $74n$ are adjusted in accordance with FIG. 6(E), and in the step 3706, the adjusting windows $54a$ and $54b$ are sealed with a seal material.

When the label resistor is adjusted, trimming is performed so that a predetermined resistance value is obtained, while the resistance value read by the supply current control apparatus 220U is digitally displayed on the screen of the adjustment tool.

Next, in FIG. 22 which is a flowchart of adjustment operation for the supply current control apparatus 320U$n$, only a single linear solenoid is connected with the supply current control apparatus 320U$n$; therefore, the step 809 in FIG. 8 is removed.

In FIG. 22, in the step 3802, the resistance values of the label resistor $76n$ and the added label resistor $74n$ provided in the linear solenoid $307n$ are read, and it is determined whether or not resistance values within predetermined ranges can be read; in the case where the result of the determination is "YES", the resistance values of the label resistor $76n$ and the added label resistor $74n$ are read. In the step 3803, the adjustment coefficient and the gradient coefficient of the pair of straight lines $605a$ and $605b$ are separated. In the step 3804, it is determined whether or not the adjustment coefficient and the gradient coefficient separated in the step 3803 are standard coefficients, i.e., whether or not the adjustment coefficient and the gradient coefficient are not abnormal values out of the predetermined ranges. In the step 3805, based on the ambient temperature of the electromagnetic coil $71n$ measured by a thermometer 391, the resistance value, at the reference temperature, of the temperature sensor $75n$ is corrected, and the resistance value Rt at the present temperature is calculated.

In the step 3806, as illustrated in FIG. 18, the ampere meter 392 is connected with the downstream terminal of the electromagnetic coil $71n$; an actual measurement current Ifn is measured when the control on/off device $10n$ is duty-controlled according to the equation (6) with the predetermined supply voltage Vbb and the predetermined target current Isn (=Ic). In the step 3808, the correction coefficient β (=Isn/Ifn) is calculated and is stored in the program memory 323 or the data memory 324.

Because no current detection resistor is provided in Embodiment 3, the step 807 in FIG. 8 is omitted.

Next, the driving operation of a transmission control apparatus according to Embodiment 3 of the present invention will be explained. FIGS. 23A and 23B are a set of flowcharts representing the driving operation of the transmission control apparatus according to Embodiment 3 of the present invention. In FIG. 23A, in the step 3905 which is an input/output control step in the engine control apparatus 310U, the first group of electric loads 305 is driven and controlled in response to the operation state of the first group of sensors 304 and the contents of an input/output control program stored in the program memory 313, and the transmission gear ratio is determined in response to the selection position of the gearshift lever, the accelerator-pedal depressing degree, and the vehicle speed; and a pressure setting command signal for any one of the plurality of linear solenoids $307a$ through $307n$ is generated and is transmitted to any one of the supply current control apparatuses 320Ua through 320Un, through the communication line 309.

In the steps 911 through 920 related to a specific supply current control apparatus 320Un among the supply current control apparatuses 320Ua through 320Un, the step $919b$ in FIG. 9B is removed.

In the step 3913, as is the case with the step 3802 in FIG. 22, the values of the label resistor $76n$ and the added label resistor $74n$ provided in the linear solenoid $307n$ is read, and it is determined whether or not resistance values within predetermined ranges can be read.

In the step block $3917n$ consisting of steps 39171 through 39174, the step 39171 is a step that functions as a setting means for a first correction target current Isn in which based on the target hydraulic pressure command value received from the engine control apparatus 310U and with reference to the data table created in the step 915, the target hydraulic pressure is converted into a target current corresponding to a target hydraulic pressure at the reference oil temperature, and in which based on the temperature characteristic data on the pressure vs. current preliminarily stored in the program memory 323 or the data memory 324 and the oil temperature detected by the temperature sensor 380, the target current is further corrected to a target current corresponding to the present oil temperature.

In the step 39172, the resistance value R75$n$ of the temperature sensor 75$n$ for detecting the ambient temperature of the electromagnetic coil 71$n$ is calculated, and a correction coefficient γ (=Rt/R0), which is the proportion of the resistance value Rt, at the present temperature, of the electromagnetic coil 71$n$ to the resistance value R0 thereof at the reference temperature, is calculated from the resistance value vs. temperature characteristic of the electromagnetic coil 71$n$ that is preliminarily stored in the program memory 323. The step 39173 is a step in which a control error caused in the driving circuit 370$n$ is corrected and in which the duty Kd of the control command signal PWM generated by the microprocessor 321 according to the equation (6) is determined according to the equation (8) below.

$$Kd = \beta \times Isn \times Rt/Vbb = \beta \times \gamma \times Isn \times R0/Vbb \qquad (8)$$

In this situation, the supply voltage Vbb is calculated according to the equation (9), letting Vad4 denote the input voltage to the analogue input port AD4$n$, letting R20$n$ and R21$n$ denote the resistance values of the upstream division resistor 20$n$ and the downstream division resistor 21$n$, letting R30$n$ denote the resistance value of the parallel resistor 30$n$, and letting (R21$n$//R30) denote the combined parallel resistance value of the resistance value R21$n$ and the resistance value R30$n$.

$$Vbb = Vad4 \times \{R20n + R21n//R30n\}/(R21n//R30n) \qquad (9)$$

The correction coefficient β is calculated and stored in the step 3808.

In the step 39174, the control command signal PWM for the control on/off device 10$n$ is generated based on the equations (8) and (9); then, the step 39174 is followed by the step 3918. The step 3918 is a step that functions as a wiring abnormality detection means in which it is determined whether or not there exists a short-to-power abnormality of the positive line or a short-to-power abnormality of the negative line, i.e., a phenomenon that the positive or negative power-supply line for the electromagnetic coil 71$n$ makes contact with the power source line, a short-to-ground abnormality of the positive line or a short-to-ground abnormality of the negative line, i.e., a phenomenon that the positive or negative power-supply line makes contact with the ground circuit, or a load short-circuit abnormality, i.e., a phenomenon that the positive and negative power-supply lines make contact with each other.

A wiring abnormality is detected as follows: Firstly, a short-to-ground abnormality of the positive line is detected by the fact that when the power supply on/off device 320$c$ is closed, the input voltage to the analogue input port AD4$n$ is excessively low. The short-to-power abnormality of the negative line is detected by the fact that when both the control on/off device 10$n$ and the power supply on/off device 320$c$ are opened, the input voltage to the analogue input port AD2$n$ is excessively high. The load short-circuit abnormality is detected by the fact that when both the control on/off device 10$n$ and the power supply on/off device 320$c$ are closed, the input voltage to the analogue input port AD2$n$ is excessively high or the input voltage to the analogue input port AD4$n$ is excessively low. Furthermore, a short-to-power abnormality of the positive line is detected by the fact that when the power supply on/off device 320$c$ is opened, the input voltage to the analogue input port AD4$n$ is excessively high. A short-to-ground abnormality of the negative line is detected by the fact that when the control on/off device 10$n$ is opened and the power supply on/off device 320$c$ is closed, the input voltage to the analogue input port AD2$n$ is excessively low.

In the foregoing explanation, the temperature sensor 380 for detecting the oil temperature is connected with the engine control apparatus 310U and the initial correction of the oil temperature is performed in the engine control apparatus 310U; then, during driving, the oil temperature is transmitted to the supply current control apparatuses 320Ua through 320Un while being monitored by the engine control apparatus 310U. However, the temperature sensor can also be utilized in such a way that the output thereof is directly inputted to the respective supply current control apparatuses 320Ua through 320Un and the initial correction is performed in the supply current control apparatuses 320Ua through 320Un. The same method applies to the temperature sensor 280 in FIG. 10.

In the case where the temperature sensor 17$n$ for the current detection resistor 15$n$ in FIG. 12 or 27$n$ in FIG. 13 and the temperature sensor 75$n$ for the electromagnetic coil 71$n$ in FIG. 18 are provided at positions that are immersed in the lubricant in the gear boxes 207 or 307, the oil temperature can indirectly be estimated by use of the temperature sensor 17$n$ or 75$n$. In this case, the oil temperature may be estimated in such a way that temperature rise caused by the self-heating in the current detection resistors 15$n$ or 27$n$ or in the electromagnetic coil 71$n$ is estimated and then the temperature corresponding to the self-heating is subtracted from the present detected temperature.

In FIG. 18, as illustrated in FIG. 3, the label resistor can be connected with ground circuit, instead of being connected in parallel with the power supply diode 73$n$. In addition, the power supply on/off device 320$c$ may be the output contact of a power-supply electromagnetic relay provided outside the engine control apparatus 310U.

In the foregoing explanation, as the correction coefficients, the adjustment coefficient and the gradient coefficient are utilized; however, a single straight line can also be specified by determining two comparison coordinates and utilizing a pair of adjustment coefficients. It has been described that each of the adjustment coefficient and the gradient coefficient is a proportion of the inherent characteristic to the standard characteristic and that the inherent characteristic can be obtained by multiplying the standard characteristic by the adjustment coefficient or the gradient coefficient. However, the inherent characteristic can also be obtained in such a manner that instead of the adjustment coefficient or the gradient coefficient, a bias adjustment value or a gradient adjustment value, which is a deviation value obtained by subtracting the standard characteristic from the inherent characteristic, and the bias adjustment value or the gradient adjustment value is algebraically added to the standard characteristic. For example, letting K (=θn/θ0) denote the gradient coefficient, the inherent gradient angle θn is calculated according to the equation "θn=K×θ0", when the standard gradient angle θ0 is known. Similarly, letting Δθ (=θn−θ0) denote the gradient coefficient, the inherent gradient angle □n is calculated according to the equation "θn=θ0+Δθ=θ0×(1+Δθ/θ0)", when the standard gradient angle θ0 is known. Addition of the deviation value Δθ corresponds to multiplication by (1+Δθ/θ0), as a coefficient. Therefore, the concept of the correction coefficient is represented assuming that the correction coefficient includes these algebraically added values.

(3) Gist and Feature of Embodiment 3

As is clear from the foregoing explanation, the transmission control apparatus (300a through 300n) according to Embodiment 3 of the present invention includes the linear solenoid (307a through 307n) that acts on the hydraulic pressure adjustment valve incorporated in a vehicle transmission and generates an adjusted hydraulic pressure output corresponding to a supply current, and the supply current control apparatus (320Ua through 320Un) for the linear solenoid; in the linear solenoid, the electromagnetic coil 71n and the label resistor 76n (or 72n) having a resistance value that serves as parameter data for correcting an inherent variation in the performance characteristics of the linear solenoid are integrated with each other. The supply current control apparatus includes the driving circuit (370a through 370n) that operates with the supply voltage Vbb, which is the output voltage of the power supply on/off device 320c connected between the vehicle battery 102 and all the plurality of linear solenoids or between the vehicle battery 102 and each of the linear solenoids, and the control voltage Vcc, which is the output voltage of the constant voltage power source 320a that is supplied with electric power from the vehicle battery 102; the control module (320Ma through 320Mn); and the control on/off device 10n that is included in the driving circuit and is connected in series with the other terminal of the linear solenoid. The driving circuit is provided with the measurement circuit 19n for energizing the label resistor 76n (or 72n) and measuring the resistance value of the label resistor; the control module includes the microprocessor 321 that generates a command signal for controlling the conduction state of the control on/off device 10n, the program memory 323 that collaborates with the microprocessor, the nonvolatile data memory 324 that is provided in part of the region of the program memory or is provided in such a way as to be separated from the program memory, and the multi-channel A/D converter 325 to which, as a reference voltage, the control voltage Vcc is applied.

The program memory 323 is provided with control programs that function as the correction control constant storage means 3808 and the label resistor reading and conversion means 915; and the correction control constant storage means 3808 collaborates with the adjustment tool 390, which is externally connected, so as to measure the current control constant for the driving circuit (370a through 370n), calculates a correction coefficient for the supply current that coincides with the target current even when there exists the inherent variation of a circuit component, and stores the correction coefficient in the program memory 323 or the data memory 324. The label resistor reading and conversion means 915 calculates the resistance value of the label resistor 76n (or 72n) based on the proportion of the measured current that flows from the measurement circuit 19n to the label resistor 76n (or 72n) to the measured voltage applied to the label resistor 76n (or 72n), calculates or selectively determines, based on the calculated resistance value, parameter data for correcting the inherent variations of the linear solenoids, and stores the parameter data in the data memory 324 or the RAM memory 322. The label resistor reading and conversion means 915 is implemented at an operation start timing when the power switch is turned on; even when the linear solenoids are replaced for maintenance, the supply current can be controlled in accordance with the resistance value of the label resistor added to the replaced linear solenoid.

The label resistor 76n is sealed in an airtight manner with a sealing resin 50; as the label resistor 76n, there is utilized a laser-trimming resistor whose resistance value is adjusted through the adjusting window 54a provided in the sealing resin.

As described above, while the resistance value of the label resistor is measured, laser trimming is performed through the adjusting window. Accordingly, there is demonstrated a feature that through post-processing after air-tight mounting of the label resistor, adjustment for a label resistor having a high-accuracy resistance value can be performed.

The digital conversion value of the label resistor 76n (or 72n) measured by the control module (320Ma through 320Mn) is utilized in such a way as to be divided into a group of high-order bits and a group of low-order bits; any one of the group of high-order bits and the group of low-order bits of the label resistor 76n (or 72n) is a first parameter for selecting the adjustment coefficient, which is the proportion of the pressure corresponding to a predetermined current of the linear solenoid (307a through 307n) to the reference pressure; the other one is a second parameter for selecting the gradient coefficient, which is the proportion of the gradient of the current vs. hydraulic pressure characteristic to the reference gradient.

The power supply diode 73n with which the label resistor 76n (or 72n) is connected in parallel is connected in series with the electromagnetic coil 71n of the linear solenoid 307n; one terminal of the series circuit is connected with the upstream side terminal C, and the other terminal thereof is connected with the downstream side terminal B; the upstream side terminal C is connected with the positive terminal of the vehicle battery 102 by way of the power supply on/off device 320c, and the downstream side terminal B thereof is connected with the control on/off device 10n. The driving circuit 370n includes the power-supply resistor 19n, which functions as the measurement circuit that energizes the label resistor 76n (or 72n) from the constant voltage power source 320a by way of the downstream side terminal B; and the upstream division resistor 20n and the downstream division resistor 21n that are connected with the output of the power supply on/off device 320c. When the power supply on/off device 320c and the control on/off device 10n are opened, the control voltage Vcc is applied to the label resistor 76n (or 72n) from the constant voltage power source 320a by way of the power-supply resistor 19n, the electromagnetic coil 71n, and the upstream division resistor 20n and the downstream division resistor 21n; the voltage at the output side of the power-supply resistor 19n and the voltage across the downstream division resistor 21n are inputted to the multi-channel A/D converter 325 by way of the analogue input ports AD2n and AD4n, respectively.

The resistance value R76n (or R72n) of the label resistor 76n (or 72n) is calculated by the microprocessor 321, based on the following equation (2) or (3), letting R19n denote the resistance value of the power-supply resistor 19n, letting R20n and R21n denote the resistance values of the upstream division resistor 20n and the downstream division resistor 21n, respectively, and letting Vad2 and Vad4 denote the input voltages of the analogue input ports AD2n and AD4n, respectively.

$$R76n \text{ (or } R72n) = \{Vad2 - Vad4 \times (R20n + R21n)/R21n\}/\{(Vcc - Vad2)/R19n\} = R19n \times \{(Vad2/Vcc) - (Vad4/Vcc) \times (R20n + R21n)/R21n\}/(1 - Vad2/Vcc) \quad (2)$$

$$R76n \text{ (or } R72n) = \{Vad2 - Vad4 \times (R20n + R21n)/R21n\}/(Vad4/R21n) = R21n \times Vad2/Vad4 - (R20n + R21n) \quad (3)$$

The resistance value of the electromagnetic coil 71n is smaller than the value of the minimum unit of the digital conversion value of the label resistor 76n (or 72n); the resistance value R19n of the power-supply resistor 19n, the resistance values R20n and R21n of the upstream division resistor 20n and the downstream division resistor 21n, respectively, that are utilized in the foregoing equations (2) and (3) are known fixed constants that are preliminarily stored in the program memory 323 or the data memory 324.

The added label resistor 74n is connected between the downstream side terminal B of the electromagnetic coil 71n and the added connection terminal D; the driving circuit 370n is provided with the power-supply resistor 19n that is connected between the constant voltage power source 320a and the downstream side terminal B and functions as the measurement circuit, and the series resistor 22n and the measurement transistor 23n that are connected between the added connection terminal D and the ground circuit; the output voltage of the power-supply resistor 19n is inputted to the multi-channel A/D converter 325 by way of the analogue input port AD2n; the voltage between the added connection terminal D and the ground circuit is inputted to the multi-channel A/D converter 325 by way of the analogue input port AD6n; the measurement transistor 23n is on/off-driven by a measurement command signal SEL generated by the microprocessor 321. The resistance value R74n of the added label resistor 74n is measured when the power supply on/off device 320c and the control on/off device 10n are opened and the measurement transistor 23n is closed, and is calculated by the microprocessor 321, based on the following equation (4), letting R22n denote the resistance value of the series resistor 22n and letting Vad6 denote the input voltage of the analogue input port AD6n.

$$R74n=(Vad2-Vad6)/(Vad6/R22n)=R22\times(Vad2/Vad6-1) \quad (4)$$

The resistance value R22 of the series resistor 22n is preliminarily written, as a known fixed control constant, in the program memory 323 or the data memory 324; while the supply current control apparatus 320U is operated, the power supply on/off device 320c is closed and the measurement transistor 23n is opened.

As described above, there is provided an added label resistor connected with the downstream side terminal of the electromagnetic coil in the linear solenoid; the resistance value of the added label resistor is measured when the power supply on/off device and the control on/off device are opened and the measurement transistor is closed. Accordingly, there is demonstrated a feature that a plurality kinds of parameters can be obtained without either producing any leakage current to the electromagnetic coil during driving or causing power loss by the added label resistor. Moreover, there is demonstrated a feature that because the measurement transistor provided in the added label resistor measurement circuit is a small-signal type and causes a minute voltage drop, the resistance value can accurately be measured. In the case where the label resistor and the added label resistor are concurrently utilized, there is demonstrated a feature that by approximating the current vs. hydraulic pressure characteristic with two broken lines and setting the adjustment coefficient and the gradient coefficient in a large current region and the adjustment coefficient and the gradient coefficient in a small current region, a further accurate current vs. pressure characteristic can be obtained.

The driving circuit 370n is further provided with the parallel transistor 31n for connecting the parallel resistor 30n in parallel with the downstream division resistor 21n when the power supply on/off device 320c is closed; the parallel transistor 31n does not close when the power supply on/off device 320c is opened and a voltage the same as or lower than the control voltage Vcc is applied thereto by way of the power-supply resistor 19n.

The label resistor 76n (or 72n) is connected in parallel with the power supply diode 73n, and one end of the temperature sensor 75n is connected with the connection point between the power supply diode 73n and the electromagnetic coil 71n; the other end of the temperature sensor 75n is connected with the connection terminal E. The driving circuit 370n is provided with the series resistor 26n connected between the connection terminal E and the ground circuit; the voltage across the power-supply resistor 26n is inputted to the multi-channel A/D converter 325 by way of the analogue input port AD5n. The resistance value R75n of the temperature sensor 75n is measured while the power supply on/off device 320c is closed to generate the supply voltage Vbb and the vehicle is driven; the resistance value R75n is calculated by the microprocessor 321 according to the equation (5) below, letting R26n denote the resistance value of the series resistor 26n, letting ΔVd (<<Vbb) denote the forward voltage drop of the power supply diode 73n, letting Vad5 denote the input voltage to the analogue input port AD5n, letting R21n//R30n denote the parallel resistor of the parallel resistor 30n and the downstream division resistor 21n, and letting Kn denote the voltage division ratio (=(R21n//R30n)/{R20+(R21n//R30n)}).

$$R75n=(Vbb-\Delta Vd-Vad5)/(Vad5/R26n)\approx(Vbb/Vad5-1)\times R26n=[\{Vad4/Kn\}/Vad5-1]\times R26n \quad (5)$$

The value of the voltage division ratio Kn and the resistance value R26n of the series resistor 26n are preliminarily written in the program memory 323 or the data memory 324; the temperature sensor 75n measures the ambient temperature of the electromagnetic coil 71n or the oil temperature in the vicinity of the linear solenoid 307n.

As described above, the linear solenoid includes a temperature sensor that can detect the oil temperature during driving or the temperature of the electromagnetic coil. Accordingly, there is demonstrated a feature that an offset error in the current control can be reduced by adjusting the target current in response to a change in the oil temperature or by measuring the resistance value of the electromagnetic coil.

The upstream side terminal C of the linear solenoid (307a through 307n) is connected with the positive terminal of the vehicle battery 102 by way of the power supply on/off device 320c, and the downstream side terminal B thereof is connected with the control on/off device 10n; the electromagnetic coil 71n is provided with the commutation diode 77n connected in parallel therewith and the power supply diode 73n connected in series therewith, and one terminal of the series circuit is connected with the upstream side terminal C and the other terminal thereof is connected with the downstream side terminal B; the label resistor 76n (or 72n) is connected in parallel with the power supply diode 73n and one end of the temperature sensor 75n is connected with the connection point between the power supply diode 73n and the electromagnetic coil 71n, and the other end of the temperature sensor 75n is connected with the connection terminal E.

When the supply current control apparatus 320Un is operated, the temperature sensor 75n measures the ambient temperature of the electromagnetic coil 71n, and based on the measured ambient temperature, the present resistance value of the electromagnetic coil 71n is estimated; the supply voltage Vbb is estimated from the signal voltage inputted to the analogue input port AD4n, and the conductive duty for obtaining a target supply current is calculated from the estimated present resistance value and supply voltage Vbb or is determined by use of a predetermined data table; based on the conductive duty, the microprocessor 321 generates a command signal so as to on/off-control the control on/off device 10*n*.

As described above, a power supply diode is connected in series with the electromagnetic coil with which a commutation diode is connected in parallel in the linear solenoid, and a label resistor is connected in parallel with the power supply diode; the linear solenoid includes a temperature sensor for detecting the temperature of the electromagnetic coil; the conductive duty is controlled based on the estimated present resistance value of the electromagnetic coil and the estimated supply voltage, so that open-loop control is performed so that the supply current for the electromagnetic coil becomes equal to a predetermined target current. Accordingly, there is demonstrated a feature that because the ripple fluctuation in the supply current becomes smaller than that in the feedback control method through current detection, a stable supply current can be obtained. There is demonstrated a feature that because when the wiring leads are connected the other way around to the positive and negative electrodes of the vehicle battery, it is prevented by the power supply diode that the power supply on/off device and the control on/off device become reversely conductive and hence a power-source shortcircuit is caused through the commutation diode, it is not requires to externally provide a reverse-flow prevention diode, and hence the number of circuit components can be reduced and superfluous heat generation can be prevented.

Two or more voltage signals among the second and third voltage signals proportional to the terminal voltage at one or the other terminal of the electromagnetic coil 71*n* are inputted to the analogue input ports AD2*n* and AD4*n* of the control module (320Ma through 320Mn); the program memory 323 includes a control program that functions as the wiring abnormality detection means 3918; based on the voltage signals inputted to the plurality of analogue input ports AD2*n* or AD4*n*, the microprocessor 321 detects a mutual-shorting abnormality in which the positive and negative wiring leads connected to the linear solenoid (307*a* through 307*n*) make contact with each other, a short-to-power abnormality in which any one of the wiring leads makes contact with the power line, or a short-to-ground abnormality in which any one of the wiring leads makes contact with the vehicle body; when the abnormality is detected, the microprocessor 221 issues a circuit-opening command to the power supply on/off device 320*c* and the control on/off device 10*n*.

Each of the supply current control apparatuses 320Ua through 320Un collaborates with the engine control apparatus 310U provided outside the gearbox so as to perform communication of input/output signals with each other; the engine control apparatus 310U selectively determines the linear solenoids 307*a* through 307*n* to be energized, sets a target hydraulic pressure for the selected linear solenoid, and transmits the set target hydraulic pressure to the supply current control apparatuses 320Ua through 320Un; the supply current control apparatuses 320Ua through 320Un are integrated with the respective linear solenoids 307*a* through 307*n* through connectors, and each of the supply current control apparatuses 320Ua through 320Un includes the respective control modules 320Ma through 320Mn that generate command signals for obtaining a target hydraulic pressure commanded by the engine control apparatus 310U and driving circuits 370*a* through 370*n* that supply driving currents to the respective linear solenoids 307*a* through 307*n*.

The linear solenoids 307*a* through 307*n* drive the relief valve 43*b* in an opening/closing manner, by use of the plunger 43*a* on which electromagnetic force produced by the electromagnetic coil 71*n* and repulsive force caused by the spring 44 are exerted; at a predetermined oil temperature, there is obtained a predetermined hydraulic pressure corresponding to the supply current for the electromagnetic coil 71*n*; at a predetermined oil temperature, the label resistor 76*n* (or 72*n*) has a resistance value corresponding to a correction coefficient for correcting the difference between the actual characteristic of the supply current for the electromagnetic coil 71*n* vs. the pressure of the activation oil 49*b* decompressed by the relief valve 43*b* and the standard characteristic and setting a supply current corresponding to a target hydraulic pressure; the temperature sensor 380 for estimating the temperature of oil in the transmission is connected with each of the plurality of supply current control apparatuses 320Ua through 320Un or with the engine control apparatus 310U; the standard data related to the characteristic of the pressure vs. oil temperature inside the transmission of the activation oil 49*b* is preliminarily stored in the program memory 323 or the data memory 324; the microprocessor 321 corrects the value of the supply current for obtaining a target hydraulic pressure, in accordance with the oil temperature estimated by the temperature sensor 380.

Various modifications and alterations of this invention will be apparent to those skilled in the art without departing from the scope and spirit of this invention, and it should be understood that this is not limited to the illustrative embodiments set forth herein.

What is claimed is:

1. A transmission control apparatus comprising:
a plurality of linear solenoids, each of which acts on a hydraulic pressure adjustment valve incorporated in a vehicle transmission and generates an adjusted hydraulic pressure output corresponding to a supply current; and
a supply current control apparatus that controls the supply current for the linear solenoid,
wherein the linear solenoid is configured with a label resistor having a resistance value that serves as parameter data for correcting an inherent variation in the performance characteristic of the linear solenoid and an electromagnetic coil that are integrated with each other,
wherein the supply current control apparatus includes a driving circuit that operates with a supply voltage, which is the output voltage of a power supply on/off device connected between a vehicle battery and all the plurality of linear solenoids or between the vehicle battery and each of the linear solenoids, and with a control voltage, which is the output voltage of a constant voltage power source that is supplied with electric power from the vehicle battery; a control module; and a control on/off device that is included in the driving circuit and is individually connected in series with the other terminal of the linear solenoid,
wherein the driving circuit is provided with a measurement circuit for energizing the label resistor and measuring the resistance value of the label resistor,
wherein the control module includes a microprocessor that generates a command signal for controlling the conduction state of the control on/off device, a program memory that collaborates with the microprocessor, a nonvolatile data memory that is provided in part of the region of the program memory or is provided in such a way as to be separated from the program memory, and a multi-channel A/D converter to which, as a reference voltage, the control voltage is applied, wherein the program memory is provided with control programs that function as a correction control constant storage means and a label resistor reading and conversion means, wherein the correction control constant storage means collaborates with an adjustment tool, which is externally connected, so as to measure a current control constant for the driving circuit, calculates a correction coefficient for obtaining a supply current that coincides with a target current even when there exists the inherent variation of a circuit component, and stores the correction coefficient in the program memory or the data memory, and wherein the label resistor reading and conversion means operates in such a way as to calculate the resistance value of the label resistor based on the proportion of a measured current that flows from the measurement circuit to the label resistor to a measured voltage applied to the label resistor, in such a way as to calculate or selectively determine parameter data for correcting the inherent variation of the linear solenoid, based on the calculated resistance value, and in such a way as to store the parameter data in the data memory or a RAM memory; said operation is implemented at an operation start timing when a power switch is turned on;

and even when the linear solenoid is replaced for maintenance, the supply current is controlled in accordance with the resistance value of the label resistor added to the replaced linear solenoid.

2. The transmission control apparatus according to claim 1, wherein the label resistor includes a plurality of first resistors that are connected in series with one another; and a plurality of second resistors, each of which has a resistance value that is twice as large as the resistance value of the first resistor, one end of each of which is connected with the starting position of a series circuit in which the plurality of first resistors are connected in series with one another, the ending position thereof, or a connection position where the first resistors are connected with each other, the other ends of which are selectively connected with one another by way of shorting/opening terminals, and that configure a ladder circuit along with the plurality of first resistors, and wherein the shorting/opening terminal is disposed at a window opening in a sealing resin that seals the plurality of first resistors and the plurality of second resistors in an airtight manner.

3. The transmission control apparatus according to claim 1, wherein the label resistor is sealed in an airtight manner with a sealing resin and is formed of laser-trimming resistors, the resistance value of each of which can be adjusted through an adjusting window provided in the sealing resin.

4. The transmission control apparatus according to claim 1, wherein a digital conversion value of the resistance value of the label resistor measured by the control module is utilized in such a way as to be divided into a group of high-order bits and a group of low-order bits; any one of the group of high-order bits and the group of low-order bits of the label resistor is a first parameter for selecting an adjustment coefficient, which is the proportion of the pressure corresponding to a predetermined current of the linear solenoid to a reference pressure; and the other one is a second parameter for selecting a gradient coefficient, which is the proportion of the gradient of a current vs. hydraulic pressure characteristic to a reference gradient.

5. The transmission control apparatus according to claim 1, wherein the supply current control apparatus and the linear solenoid are fixed on a common conductive member, which is a ground circuit, wherein the upstream side terminal of the electromagnetic coil is connected with the positive terminal of the vehicle battery by way of the power supply on/off device, and the downstream side terminal thereof is connected with the control on/off device, wherein one terminal of the label resistor is connected with the downstream side terminal of the electromagnetic coil, and the other terminal thereof is connected with a ground terminal, wherein the driving circuit includes a power-supply resistor, which functions as the measurement circuit that energizes the label resistor from the constant voltage power source by way of the downstream side terminal, wherein when the power supply on/off device and the control on/off device are opened, the control voltage is applied from the constant voltage power source to the label resistor by way of the power-supply resistor, and the voltage across the label resistor is inputted to the multi-channel A/D converter by way of an analogue input port AD2, wherein the resistance value R72$n$ (or R76$n$) of the label resistor is calculated by the microprocessor, based on the following equation (1), letting Vcc denote the control voltage, letting R72$n$ (or R76$n$) denote the resistance value of the label resistor, letting R19$n$ denote the resistance value of the power-supply resistor, and letting Vad2 denote the input voltage to the analogue input port AD2$n$, $$R72n(\text{or } R76n)=Vad2/\{(Vcc-Vad2)/R19n\}=R19n\times(Vad2/Vcc)/\{1-(Vad2/Vcc)\} \quad (1)$$

wherein the minimum resistance value of the label resistor is larger than the maximum resistance value of the electromagnetic coil, and is limited to a value with which the linear solenoid is not caused to erroneously operate by a leakage current that flows from the vehicle battery to the ground circuit by way of the power supply on/off device, the upstream side terminal of the electromagnetic coil, the electromagnetic coil, and the label resistor when the control on/off device is opened, and wherein the resistance value R19$n$ of the power-supply resistor is a known fixed constant that is preliminarily stored in the program memory 123 or the data memory.

6. The transmission control apparatus according to claim 1, wherein the electromagnetic coil in the linear solenoid is connected in series with a power supply diode with which the label resistor is connected in parallel, wherein one end of the series circuit consisting of the electromagnetic coil and the power supply diode is connected with the upstream side terminal of the linear solenoid and the other end thereof is connected with the downstream side terminal of the linear solenoid, wherein the upstream side terminal is connected with the positive terminal of the vehicle battery by way of the power supply on/off device, and the downstream side terminal is connected with the control on/off device, wherein the driving circuit includes a power-supply resistor, which functions as the measurement circuit that energizes the label resistor from the constant voltage power source by way of the downstream side terminal, and an upstream division resistor and a downstream division resistor that are connected with the output of the power supply on/off device, wherein when the power supply on/off device and the control on/off device are opened, the control voltage is applied from the constant voltage power source to the label resistor by way of the power-supply resistor, the electromagnetic coil, and the upstream and downstream division resistors, and the voltage at the output side of the power-supply resistor and the voltage across the downstream division resistor are inputted to the multi-channel A/D converter by way of the analogue input port AD2$n$ and an analogue input port AD4$n$, respectively, wherein the resistance value R72$n$ (or R76$n$) of the label resistor is calculated by the microprocessor, based on the following equation (2) or (3), letting Vcc denote the control voltage, letting R72$n$ (or R76$n$) denote the resistance value of the label resistor, letting R19$n$ denote the resistance value of the power-supply resistor, letting R20$n$ denote the resistance value of the upstream division resistor, letting R21$n$ denote the resistance value of the downstream division resistor, letting Vad2 denote the input voltage to the analogue input port AD2$n$, and letting Vad4 denote the input voltage to the analogue input port AD4$n$, $$R72n \text{ (or } R76n) = \{Vad2 - Vad4 \times (R20n + R21n)/R21n\}/\{(Vcc - Vad2)/R19n\} = R19n \times \{(Vad2/Vcc) - (Vad4/Vcc) \times (R20n + R21n)/R21n\}/ (1 - Vad2/Vcc) \quad (2)$$

$$R72n \text{ (or } R76n) = \{Vad2 - Vad4 \times (R20n + R21n)/R21n\}/(Vad4/R21n) = R21n \times Vad2/Vad4 - (R20n + R21n) \quad (3)$$

wherein the resistance value of the electromagnetic coil is smaller than the value of the minimum unit of the digital conversion value of the label resistor, and wherein the resistance value R19$n$ of the power-supply resistor, the resistance values R20$n$ and R21$n$ of the upstream and downstream division resistors, respectively, that are utilized in the foregoing equations (2) and (3) are known fixed constants that are preliminarily stored in the program memory or the data memory.

7. The transmission control apparatus according to claim 1, wherein an added label resistor (74*n*) is connected between the downstream side terminal of the electromagnetic coil and an added connection terminal, wherein the driving circuit includes a power-supply resistor that is connected between the constant voltage power source and the downstream side terminal and functions as the measurement circuit, a series resistor connected between the added connection terminal and the ground circuit, and a measurement transistor, wherein the output voltage of a power-supply resistor is inputted to the multi-channel A/D converter by way of the analogue input port AD2$n$, wherein the voltage between the added connection terminal and the ground circuit is inputted to the multi-channel A/D converter 325 by way of the analogue input port AD6$n$, wherein the measurement transistor is on/off-driven by a measurement command signal generated by the microprocessor, wherein the resistance value (R74*n*) of the added label resistor, which is measured when the power supply on/off device and the control on/off device are opened and the measurement transistor is closed, is calculated by the microprocessor, based on the following equation (4), letting R22$n$ denote the resistance value of the series resistor and letting Vad6 denote the input voltage to the analogue input port AD6$n$, $$R74n = (Vad2 - Vad6)/(Vad6/R22n) = R22 \times (Vad2/Vad6 - 1) \quad (4)$$

wherein the resistance value (R22) of the series resistor is preliminarily written, as a known fixed control constant, in the program memory or the data memory, and wherein while the supply current control apparatus is operated, the power supply on/off device is closed and the measurement transistor is opened.

8. The transmission control apparatus according to claim 6, wherein the driving circuit is further provided with a parallel transistor for connecting a parallel resistor with the downstream division resistor when the power supply on/off device is closed; and the parallel transistor does not close when the power supply on/off device is opened and a voltage the same as or lower than the control voltage is applied thereto by way of the power-supply resistor.

9. The transmission control apparatus according to claim 8, wherein the power supply diode is connected in parallel with the label resistor; one end of a temperature sensor is connected with the connection point where the power supply diode and the electromagnetic coil are connected with each other; and the other end of the temperature sensor is connected with a connection terminal, wherein the driving circuit is provided with a series resistor connected between the connection terminal and the ground circuit; and the voltage across the series resistor is inputted to the multi-channel A/D converter by way of the analogue input port AD5$n$, wherein the resistance value (R75*n*) of the temperature sensor, which is measured when the power supply on/off device is operated to close and generate a supply voltage Vcc, is calculated by the microprocessor, based on the following equation (5), letting R26$n$ denote the resistance value of the series resistor, letting $\Delta$Vd (<<Vbb) denote the forward voltage drop of the power supply diode, letting Vad5 denote the input voltage to the analogue input port AD5$n$, letting R21$n$//R30$n$ denote the parallel resistor of the parallel resistor and the downstream division resistor, and letting Kn denote the voltage division ratio (=(R21$n$//R30$n$)/{R20+(R21$n$//R30$n$)}), $$R75n = (Vbb - \Delta Vd - Vad5)/(Vad5/R26n) \approx (Vbb/Vad5 - 1) \times R26n = [\{Vad4/Kn\}/Vad5 - 1] \times R26n \quad (5)$$

wherein the value of the voltage division ratio Kn and the resistance value R26$n$ of the series resistor are preliminarily written in the program memory or the data memory, and wherein the temperature sensor measures the ambient temperature of the electromagnetic coil or the oil temperature in the vicinity of the linear solenoid.

10. The transmission control apparatus according to claim 9, wherein the upstream side terminal of the linear solenoid is connected with the positive terminal of the vehicle battery by way of the power supply on/off device, and the downstream side terminal thereof is connected with the control on/off device, wherein the electromagnetic coil is provided with a free wheel diode connected in parallel therewith and a power supply diode connected in series therewith; and one end of the series circuit consisting of the free wheel diode and the power supply diode is connected with the upstream side terminal and the other end thereof is connected with the downstream side terminal, wherein the power supply diode is connected in parallel with the label resistor; one end of a temperature sensor is connected with the connection point where the power supply diode and the electromagnetic coil are connected with each other; and the other end of the temperature sensor is connected with a connection terminal, Wherein when the supply current control apparatus is operated, the temperature sensor measures the ambient temperature of the electromagnetic coil, and based on the measured ambient temperature, the present resistance value of the electromagnetic coil is estimated; and the supply voltage Vbb is estimated from a signal voltage inputted to the analogue input port AD4$n$, and a conductive duty for obtaining a target supply current is calculated from the estimated present resistance value and the supply voltage Vbb or is determined by use of a predetermined data table, and wherein based on the conductive duty, the microprocessor generates a command signal so as to on/off-control the control on/off device.

11. The transmission control apparatus according to claim 1, wherein the upstream side terminal of the linear solenoid is connected with the positive terminal of the vehicle battery by way of the power supply on/off device, and the downstream side terminal thereof is connected with the control on/off device by way of a current detection resistor, wherein the electromagnetic coil is connected in series with a power supply diode with which the label resistor is connected in parallel; one end of the series circuit consisting of the electromagnetic coil and the power supply diode is connected with the upstream side terminal and the other end thereof is connected with the downstream side terminal, wherein the voltage across the current detection resistor is inputted to the multi-channel A/D converter by way of a differential amplifier and the analogue input port AD1$n$, wherein there is provided a free wheel diode that is connected in parallel with the series circuit consisting of the power supply diode, the electromagnetic coil, and the current detection resistor by way of the power supply on/off device, wherein with reference to the value of a supply current inputted to the analogue input port AD1$n$, the microprocessor calculates an average current over the opened and closed period of the control on/off device and generates a command signal for controlling the conduction state of the control on/off device so that the average becomes equal to a target supply current, and wherein a reverse-flow prevention diode is connected in series with the power supply on/off device or the control on/off device.

12. The transmission control apparatus according to claim 1, wherein the upstream side terminal of the linear solenoid is connected with the positive terminal of the vehicle battery by way of the power supply on/off device, and the downstream side terminal thereof is connected with the control on/off device by way of a current detection resistor; there are provided a free wheel diode connected in parallel with the electromagnetic coil and a power supply diode connected in series with the electromagnetic coil; one end of the series circuit consisting of the commutation diode and the power supply diode is connected with the upstream side terminal and the other end thereof is connected with the downstream side terminal; the label resistor is connected in parallel with the power supply diode; and the voltage across the current detection resistor is inputted to the multi-channel A/D converter by way of a differential amplifier and the analogue input port AD1$n$, and wherein with reference to the value of a supply current inputted to the analogue input port AD1$n$ when the control on/off device is closed, the microprocessor estimates an attenuated excitation current at a time when the control on/off device is opened and the excitation current for the electromagnetic coil is return through the free wheel diode, calculates an average current over the opened and closed period, and generates a command signal for controlling the conduction state of the control on/off device so that the average current becomes equal to a target supply current.

13. The transmission control apparatus according to claim 11, wherein a temperature sensor is disposed in the vicinity of the current detection resistor; the temperature sensor is connected with the constant voltage power source by way of a series resistor; and the voltage across the temperature sensor or the series resistor is inputted to the multi-channel A/D converter by way of the analogue input port AD3$n$, wherein the adjustment tool collaborates with the microprocessor so as to calculate a conversion resistance value obtained by converting the resistance value of the temperature sensor at a measurement ambient temperature into a resistance value at the reference temperature or a correction coefficient obtained by dividing the conversion resistance value by a reference resistance value, and stores it in the program memory or the data memory, wherein a temperature coefficient for calculating the value of resistance change, caused by a temperature rise, from the resistance value of the current detection resistor at the reference temperature, and the resistance value R18$n$ of the series resistor are preliminarily written, as known fixed control constants, in the program memory or the data memory, and wherein while the supply current control apparatus is operated, the digital conversion value of a detected current value inputted to the analogue input port AD1$n$ or the setting value corresponding to the target current is corrected, based on the ambient temperature of the current detection resistor; and the correction is controlled in such a way that even when a temperature change causes a change in the resistance value of the current detection resistor, a target supply current can be obtained.

14. The transmission control apparatus according to claim 12, wherein a temperature sensor is disposed in the vicinity of the current detection resistor; the temperature sensor is connected with the constant voltage power source by way of a series resistor; and the voltage across the temperature sensor or the series resistor is inputted to the multi-channel A/D converter by way of the analogue input port (AD3$n$), wherein the adjustment tool collaborates with the microprocessor so as to calculate a conversion resistance value obtained by converting the resistance value of the temperature sensor at a measurement ambient temperature into a resistance value at the reference temperature or a correction coefficient obtained by dividing the conversion resistance value by a reference resistance value, and stores it in the program memory or the data memory, wherein a temperature coefficient for calculating the value of resistance change, caused by a temperature rise, from the resistance value of the current detection resistor at the reference temperature, and the resistance value R$18n$ of the series resistor are preliminarily written, as known fixed control constants, in the program memory or the data memory, and wherein while the supply current control apparatus is operated, the digital conversion value of a detected current value inputted to the analogue input port or the setting value corresponding to the target current is corrected, based on the ambient temperature of the current detection resistor; and the correction is controlled in such a way that even when a temperature change causes a change in the resistance value of the current detection resistor, a target supply current can be obtained.

15. The transmission control apparatus according to claim 1, wherein a plurality of voltage signals among a first voltage signal proportional to the voltage across the current detection resistor connected in series with the electromagnetic coil, a second voltage signal proportional to the voltage at one terminal of the electromagnetic coil, and a third voltage signal proportional to the voltage at the other terminal of the electromagnetic coil are inputted to the analogue input ports of the control module, wherein the program memory includes a control program that functions as a wiring abnormality detection means, and wherein based on the voltage signals inputted to the plurality of analogue input ports, the microprocessor detects a mutual-shorting abnormality in which the positive and negative wiring leads connected to the linear solenoid make contact with each other, a short-to-power abnormality in which any one of the wiring leads makes contact with the power line, or a short-to-ground abnormality in which any one of the wiring leads makes contact with the vehicle body; and when the abnormality is detected, the microprocessor issues a circuit-opening command to the power supply on/off device and the control on/off device.

16. The transmission control apparatus according to claim 1, wherein the supply current control apparatus and an engine control apparatus, which are provided separately from each other, collaborate with each other and perform communication of input/output signals with each other; and the supply current control apparatus is provided on the external wall of the case of a transmission or on the internal wall of the case, wherein the plurality of linear solenoids provided inside the transmission case are connected with the supply current control apparatus through a connector, and wherein the supply current control apparatus includes a single control module that selectively determines the linear solenoid to be energized, sets a target hydraulic pressure for the selected linear solenoid, and generates a command signal for obtaining the set target hydraulic pressure, and a driving circuit that supplies a driving current to the corresponding linear solenoid.

17. The transmission control apparatus according to claim 1, wherein the supply current control apparatus and an engine control apparatus provided outside a gearbox collaborate with each other so as to perform communication of input/output signals with each other, wherein the engine control apparatus selectively determines the linear solenoid to be energized, sets a target hydraulic pressure for the selected linear solenoid, and transmits the set target hydraulic pressure to the supply current control apparatus, and wherein the supply current control apparatus includes a control module that is provided in the transmission case in such a way as to be integrated with corresponding one of the plurality of linear solenoids through connector connection and generates a command signal for obtaining the target hydraulic pressure commanded by the engine control apparatus, and a driving circuit that supplies a driving current' to the linear solenoid.

18. The transmission control apparatus according to claim 16, wherein the linear solenoid drives a relief valve in an opening/closing manner by use of a plunger on which electromagnetic force produced by the electromagnetic coil and repulsive force caused by a spring are exerted, so that at a predetermined oil temperature, a predetermined hydraulic pressure corresponding to a supply current for the electromagnetic coil is obtained, wherein at a predetermined oil temperature, the label resistor has a resistance value corresponding to a correction coefficient for correcting the difference between the actual characteristic of the supply current for the electromagnetic coil vs. the pressure of activation oil decompressed by the relief valve and the standard characteristic and setting a supply current corresponding to a target hydraulic pressure, wherein a temperature sensor for estimating the temperature of oil in the transmission is connected with one of the supply current control apparatus and the engine control apparatus, wherein standard data related to the activation-oil characteristic of the pressure vs. oil temperature inside the transmission is preliminarily stored in the program memory or the data memory, and wherein the microprocessor corrects the value of a supply current for obtaining a target hydraulic pressure, in accordance with the oil temperature estimated by the temperature sensor.

19. The transmission control apparatus according claim 17, wherein the linear solenoid drives a relief valve in an opening/closing manner by use of a plunger on which electromagnetic force produced by the electromagnetic coil and repulsive force caused by a spring are exerted, so that at a predetermined oil temperature, a predetermined hydraulic pressure corresponding to a supply current for the electromagnetic coil is obtained, wherein at a predetermined oil temperature, the label resistor has a resistance value corresponding to a correction coefficient for correcting the difference between the actual characteristic of the supply current for the electromagnetic coil vs. the pressure of activation oil decompressed by the relief valve and the standard characteristic and setting a supply current corresponding to a target hydraulic pressure, wherein a temperature sensor for estimating the temperature of oil in the transmission is connected with one of the supply current control apparatus or the engine control apparatus, wherein standard data related to the activation-oil characteristic of the pressure vs. oil temperature inside the transmission is preliminarily stored in the program memory or the data memory, and wherein the microprocessor corrects the value of a supply current for obtaining a target hydraulic pressure, in accordance with the oil temperature estimated by the temperature sensor.

* * * * *